(12) United States Patent
Xiong

(10) Patent No.: US 12,192,934 B2
(45) Date of Patent: Jan. 7, 2025

(54) TIME SYNCHRONIZATION METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 374 days.

(21) Appl. No.: 17/675,531

(22) Filed: Feb. 18, 2022

(65) Prior Publication Data

US 2022/0174631 A1 Jun. 2, 2022

Related U.S. Application Data

(63) Continuation of application No. PCT/CN2021/075424, filed on Feb. 5, 2021.

(30) Foreign Application Priority Data

Mar. 23, 2020 (CN) .......................... 202010210082.8

(51) Int. Cl.
*H04W 56/00* (2009.01)
*H04W 76/10* (2018.01)
*H04W 76/30* (2018.01)

(52) U.S. Cl.
CPC ....... *H04W 56/0015* (2013.01); *H04W 76/10* (2018.02); *H04W 76/30* (2018.02)

(58) Field of Classification Search
CPC ........... H04J 3/12; H04J 3/0638; H04J 3/0658
USPC ........................................................ 370/350
See application file for complete search history.

(56) References Cited

U.S. PATENT DOCUMENTS

2020/0267529 A1* 8/2020 Jing ...................... H04L 67/142

FOREIGN PATENT DOCUMENTS

| CN | 110192428 A | 8/2019 |
| CN | 110213007 A | 9/2019 |
| CN | 110268760 A | 9/2019 |
| CN | 110366219 A | 10/2019 |

(Continued)

OTHER PUBLICATIONS

3GPP TR 23.700-20 V0.3.0 (Jan. 2020) [Technical Specification Group Services and System Aspects; Study on enhanced support of Industrial Internet of Things (IIoT) in the 5G System (5GS) (Release 17) ] (Year: 2020).*

(Continued)

*Primary Examiner* — Maharishi V Khirodhar
(74) *Attorney, Agent, or Firm* — Crowell & Moring LLP

(57) ABSTRACT

A time synchronization process may include receiving a time sensitive network (TSN) configuration creation request that includes an identifier of a target user equipment (UE) and a trigger condition. The request is transmitted by an application function entity (AF). A TSN authorization request is transmitted to a unified data management entity (UDM) and is used for requesting the UDM to transmit, after confirming authorization, a TSN activation request to an access and mobility management function entity (AMF) registered by the target UE. Control signaling used for performing a TSN time synchronization operation is transmitted to the target UE.

10 Claims, 17 Drawing Sheets

(56) References Cited

FOREIGN PATENT DOCUMENTS

| CN | 110611924 A | 12/2019 |
|---|---|---|
| CN | 110771220 A | 2/2020 |
| CN | 111490842 A | 8/2020 |
| WO | WO 2019/098623 A1 | 5/2019 |
| WO | WO/2020/035130 A | 2/2020 |
| WO | WO 2020/043315 A1 | 3/2020 |

OTHER PUBLICATIONS

Office Action issued in Chinese application 202010210082.8 dated Mar. 1, 2024, 13 pages.
Extended European Search Report received for Application No. EP 21774646.0 dated Nov. 10, 2022 (14 pages).
Tencent: "AF Requested TSN Synchronization Activation and Deactivation", 3GPP Draft; S2-2001662, 3rd Generation Partnership Project (3GPP), Mobile Competence Centre ; 650, Route Des Lucioles ; F-06921 Sophia-Antipolis Cedex ; France, vol. SA WG2, No. Lncheon; Jan. 13, 2020-Jan. 17, 2020, Jan. 20, 2020, , XP051844733, retrieved from the Internet: url:https://FTP.3GPP.Org/Tsg_Sa/Wg2_Arch/Tsg2_ 136ah_Lncheon/Docs/ S2-2001662.Zip (4 pp.).
Okia et al.: "Addition of Pscell Information in Pou Session Modification", 3gpp Draft; SP-200081, 3rd Generation Partnership Project (3GPP), Mobile Competence Centre; 650, Route Des Lucioles ; F-06921 Sophia-Antipolis Cedex ; France, vol. SA WG2, No. E-meeting; Feb. 24, 2020-Feb. 27, 2020, Mar. 9, 2020 XP051862557, Retrieved from the Internet: url:https://ftp.3GPP.org/3guInternal/3GPP_Ultimate_CRPacks/ SP-200081.zip23502_CR2162r1 _(Rel-16)_S2-2002424 (was 2275 23.502 PSCell ID)_r05.docx (11 pp.).
International Search Report and Written Opinion received for Application No. PCT/CN2021/075424 mailed Apr. 26, 2021 (English and Chinese languages) (10 pages).
Tencent, "AF Requested TSN Synchronization Activation and Deactivation," *SA WG2 Meeting #S2-136AH S2-20016602*, Jan. 17, 2020, section 6.X.1-6-X-3.

* cited by examiner

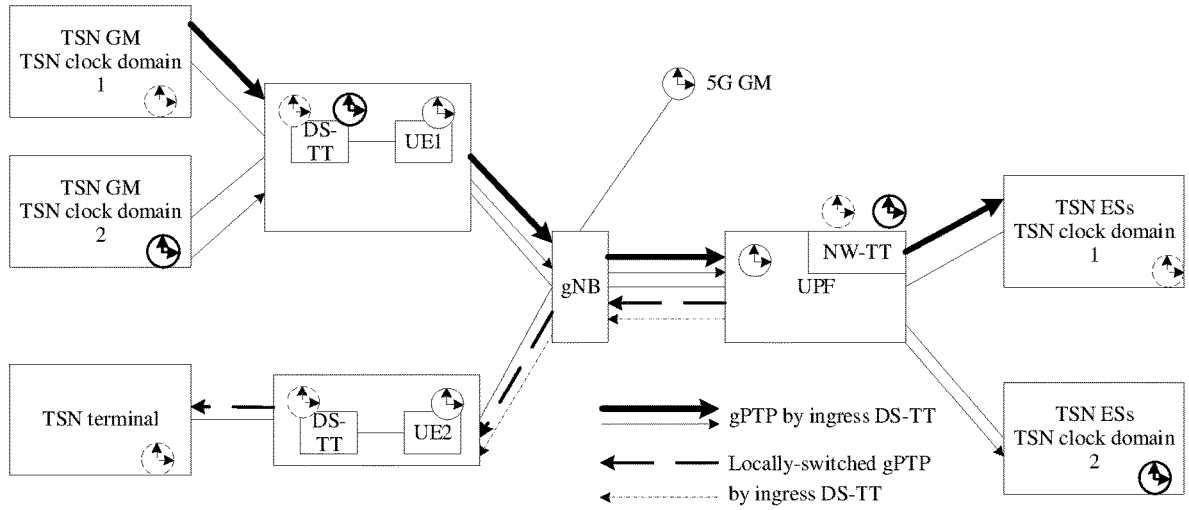

FIG. 3

| Receive a TSN configuration creation request transmitted by an AF, the TSN configuration creation request including an identifier of a target user equipment and first information used for indicating a TSN time synchronization trigger condition | S410 |

| Transmit a TSN authorization request to a UDM, the TSN authorization request being used for requesting the UDM to transmit, after confirming authorization, a TSN activation request including the first information to an AMF registered by the target user equipment, to transmit, through the AMF, control signaling used for performing a TSN time synchronization operation to the target user equipment | S420 |

FIG. 4

TIME SYNCHRONIZATION METHOD AND APPARATUS, COMPUTER-READABLE MEDIUM, AND ELECTRONIC DEVICE

RELATED APPLICATION

This application claims priority to PCT Application No. PCT/CN2021/075424, filed on Feb. 5, 2021, published as WO 2021/190180 A1, entitled "TIME SYNCHRONIZATION METHOD AND APPARATUS, COMPUTER-READABLE MEDIUM, AND ELECTRONIC DEVICE", which further claims priority to Chinese Patent Application No. 202010210082.8, entitled "TIME SYNCHRONIZATION METHOD AND APPARATUS, COMPUTER-READABLE MEDIUM, AND ELECTRONIC DEVICE" and filed with the China National Intellectual Property Administration on Mar. 23, 2020, both of which are incorporated herein by reference in their entirety.

FIELD OF THE TECHNOLOGY

This application relates to the field of computer and communication technologies, and specifically, to a time synchronization method and apparatus, a computer-readable medium, and an electronic device.

BACKGROUND OF THE DISCLOSURE

Time sensitive communication (TSC) in time sensitive networking (TSN) is introduced into R16 (Release16) of the 5th Generation mobile communication technology (5G) system, to enable the 5G system to support industrial automation and manufacturing applications of precision time control.

SUMMARY

Embodiments of this application provide a time synchronization method and apparatus, a computer-readable medium, and an electronic device, to control a time synchronization operation of a user equipment (UE).

According to one embodiment, a time synchronization method is provided, including: receiving a time sensitive network (TSN) configuration creation request transmitted by an application function entity (AF), the TSN configuration creation request including an identifier of a target UE and first information used for indicating a TSN time synchronization trigger condition; and transmitting a TSN authorization request to a unified data management entity (UDM), the TSN authorization request being used for requesting the UDM to transmit, after confirming authorization, a TSN activation request including the first information to an access and mobility management function entity (AMF) registered by the target UE, to transmit, through the AMF, control signaling used for performing a TSN time synchronization operation to the target UE.

According to one embodiment, a time synchronization method is provided, including: receiving a TSN authorization request, the TSN authorization request being used for requesting to update user subscription data of a target UE; and after confirming that update of the user subscription data of the target UE is authorized, transmitting, according to TSN activation subscription data included in the updated user subscription data, a TSN activation request to an AMF registered by the target UE, to instruct the AMF to transmit control signaling used for performing a TSN time synchronization operation to the target UE, the TSN activation request including first information used for indicating a TSN time synchronization trigger condition.

According to one embodiment, a time synchronization method is provided, including: receiving a TSN activation request transmitted by a UDM, the TSN activation request including first information used for indicating a TSN time synchronization trigger condition; and transmitting control signaling to a target UE corresponding to a current AMF based on the first information, to control the target UE to perform a TSN time synchronization operation.

According to one embodiment, a time synchronization method is provided, including: receiving control signaling transmitted by an AMF, the control signaling including first information used for indicating a TSN time synchronization trigger condition; and performing a TSN time synchronization operation based on the control signaling and the first information.

According to one embodiment, a time synchronization apparatus is provided, including: a first receiving unit, configured to receive a time sensitive network (TSN) configuration creation request transmitted by an application function entity (AF), the TSN configuration creation request including an identifier of a target UE and first information used for indicating a TSN time synchronization trigger condition; and a first transmitting unit, configured to transmit a TSN authorization request to a unified data management entity (UDM), the TSN authorization request being used for requesting the UDM to transmit, after confirming authorization, a TSN activation request including the first information to an access and mobility management function entity (AMF) registered by the target UE, to transmit, through the AMF, control signaling used for performing a TSN time synchronization operation to the target UE.

According to one embodiment, a time synchronization apparatus is provided, including: a second receiving unit, configured to receive a TSN authorization request, the TSN authorization request being used for requesting to update user subscription data of a target UE; and a second transmitting unit, configured to, after confirming that update of the user subscription data of the target UE is authorized, transmit, according to TSN activation subscription data included in the updated user subscription data, a TSN activation request to an AMF registered by the target UE, to instruct the AMF to transmit control signaling used for performing a TSN time synchronization operation to the target UE, the TSN activation request including first information used for indicating a TSN time synchronization trigger condition.

According to one embodiment, a time synchronization apparatus is provided, including: a third receiving unit, configured to receive a TSN activation request transmitted by a UDM, the TSN activation request including first information used for indicating a TSN time synchronization trigger condition; and a third transmitting unit, configured to transmit control signaling to a target UE corresponding to a current AMF based on the first information, to control the target UE to perform a TSN time synchronization operation.

According to one embodiment, a time synchronization apparatus is provided, including: a fourth receiving unit, configured to receive control signaling transmitted by an AMF, the control signaling including first information used for indicating a TSN time synchronization trigger condition; and a processing unit, configured to perform a TSN time synchronization operation based on the control signaling and the first information.

According to one embodiment, a computer-readable medium is provided, storing a computer program, the computer program, when executed by a processor, implementing the time synchronization method in the foregoing embodiments.

According to one embodiment, an electronic device is provided, including: one or more processors; and a storage apparatus, configured to store one or more programs, the one or more programs, when executed by the one or more processors, causing the one or more processors to implement the time synchronization method according to the foregoing embodiments.

In technical solutions provided in some embodiments of this application, an AF transmits a TSN configuration creation request to a network exposure function (NEF), the NEF transmits a TSN authorization request to a UDM, the UDM transmits a TSN activation request to an AMF, and the AMF transmits control signaling to a target UE, so that the target UE can be controlled to perform a TSN time synchronization operation based on a related condition triggered by the TSN, to effectively control a time synchronization operation of one UE or a group of UEs.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into the specification and constitute a part of this specification, show embodiments that conform to this application, and are used for describing a principle of this application together with this specification. Apparently, the accompanying drawings described below are merely some embodiments of this application, and a person of ordinary skill in the art may further obtain other accompanying drawings according to the accompanying drawings without creative efforts. In the accompanying drawings:

FIG. 3 is a schematic architectural diagram of a time synchronization requirement proposed in the 5G R17 standard.

FIG. 4 is a flowchart of a time synchronization method according to an embodiment of this application.

DESCRIPTION OF EMBODIMENTS

Figure 1:
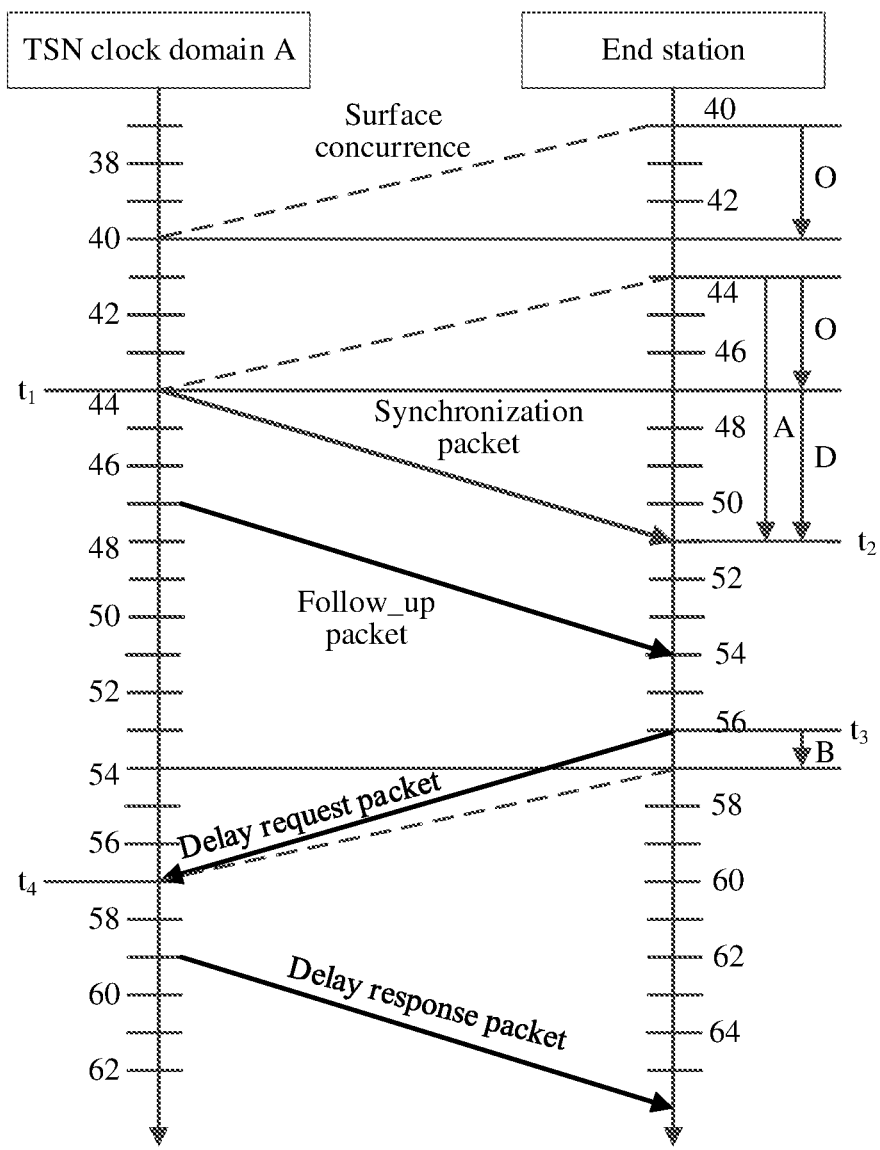
FIG. 1 is a schematic diagram of a time synchronization procedure.

Exemplary implementations will now be described more thoroughly with reference to the accompanying drawings. However, the exemplary implementations may be implemented in various forms, and are not to be understood as being limited to the examples described herein. Instead, the implementations are provided to make this application more thorough and complete and fully convey the idea of the exemplary implementations to a person skilled in the art.

In addition, the described features, structures or characteristics may be combined in one or more embodiments in any appropriate manner. In the following descriptions, details are provided to give a comprehensive understanding of the embodiments of this application. However, a person of ordinary skill in the art is to be aware that, the technical solutions in this application may be implemented without one or more of the particular details, or another method, unit, apparatus, or step may be used. In other embodiments, well-known methods, apparatuses, implementations, or operations are not shown or described in detail, in order not to obscure the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses. The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

In the related art, the clock offset measurement may be implemented by using a precision time protocol (PTP, defined by an Institute of Electrical and Electronics Engineers (IEEE) 1588 protocol)/generalized precision time protocol (gPTP, defined by an IEEE 802.1AS protocol) message and algorithm.

In a time synchronization procedure shown in FIG. 1, a time data receiving party (which is assumed herein to be an end station (ES, being a device connected to a local area network or metropolitan area network, to serve as a source and/or destination for traffic borne on the local area network or metropolitan area network)) measures, based on a method defined by an IEEE 1588v2 protocol, a clock offset (abbreviated to 0 below) and a delay (abbreviated to D below) relative to a TSN clock domain A through a received data packet.

The clock offset and the delay are implemented through some procedures and algorithms, which involves the following formulas:

$$O=\text{Offset}=(t_2+t_3-t_1-t_4)/2;$$

$$t_2=t_1+D+O;$$

$$A=t_2-t_1=D+O;$$

$$B=t_4-t_3=D-O;$$

$$\text{Delay } D=(A+B)/2;$$

$$\text{Offset } O=(A-B)/2; \text{ and}$$

$$t_4=t_3-O+D.$$

In the foregoing formulas, A and B are intermediate variables; $t_1$ is a time value of the TSN clock domain A carried in a Sync (synchronization packet) message or Follow_up (follow_up packet) message; $t_2$ and $t_3$ are time values of local clocks of the ES, $t_2$ indicates a time value of a local clock corresponding to a case that the ES receives the Sync message, and $t_3$ indicates a time value of a local clock corresponding to a case that the ES transmits a Delay_Req (delay request packet) message; D indicates a transmission delay value of transmitting the Sync message from the TSN clock domain A to the ES; and $t_4$ is a time value of the TSN clock domain A corresponding to a case that the TSN clock domain A receives the Delay_Req message.

After any one of a clock offset between the local clock of the ES and the TSN clock domain A, and the delay is measured, the ES may use any one of the parameters to set its time, thereby implementing time synchronization between a local time of the ES and a master clock of the TSN clock domain A, which is an algorithm of performing time synchronization between the ES and the master clock of the TSN clock domain A.

After a period of time, the time of the ES and the time of the master clock of the clock domain A may have an increasingly large difference. To ensure time precision stability of the ES, the foregoing measurement procedure may be periodically repeatedly performed, to ensure that the time of the ES and the time of the master clock of the clock domain A have a difference within a range. There are a large quantity of ESs in one clock domain. Therefore, when each ES performs such bidirectional signaling interaction with the master clock, implementation costs of the master clock are greatly increased, and stability and precision of the clock thereof are affected. Moreover, to simplify this measurement procedure, the master clock may periodically transmit a Sync (or optionally, further transmit Follow_up) message whose destination address is a multicast address, and does not perform bidirectional signaling interaction with the ES anymore, and a network transmitting these messages precisely calculates a transmission delay of the Sync (or optionally, further including Follow_up) message from the master clock to the ES. In this way, the ES may implement time synchronization with the master clock according to the delay provided by the network and a time value of the master clock on the Sync (or optionally, further including Follow_up) message. For an example implementation, reference may be made to the IEEE 802.1AS protocol.

Figure 2:
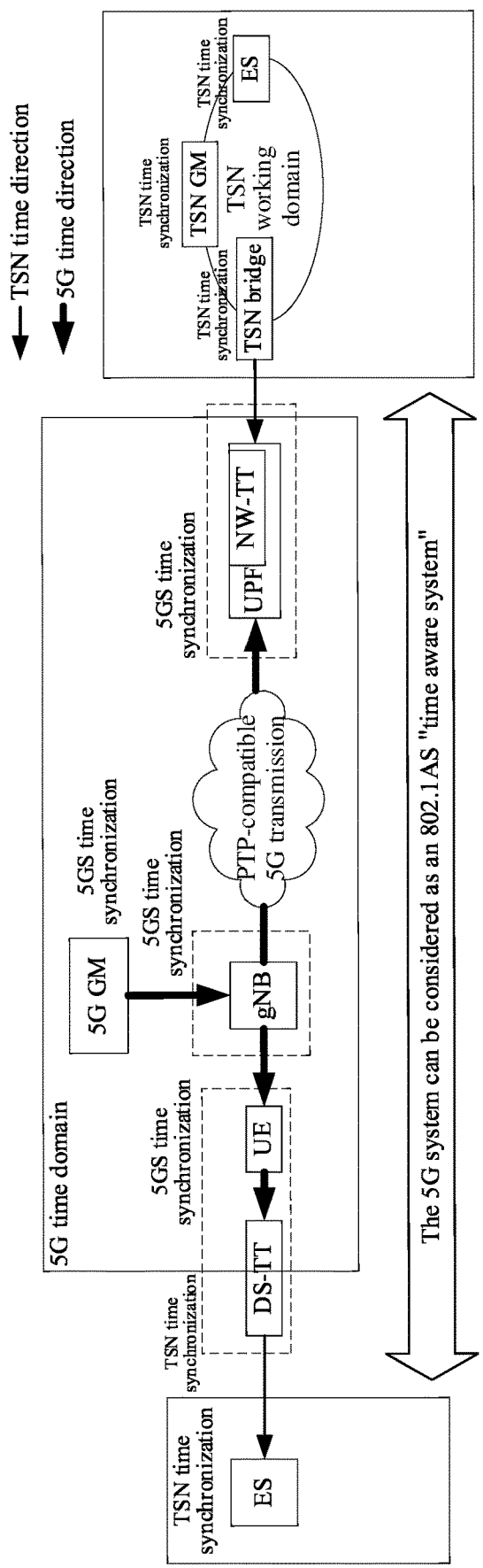
FIG. 2 is a schematic architectural diagram of a 5G system supporting time synchronization in external time domain.

FIG. 2 is a schematic architectural diagram of a 5G system supporting time synchronization in external time domain.

As shown in FIG. 2, the 5G system as a TSN bridge is integrated in a TSN system. This "logic" TSN bridge includes a TSN translator, used for interaction of a user plane between the TSN system and the 5G system. 5GS (5G system) TSN translator functionality includes a DS-TT (device side TSN translator) and an NW-TT (network TSN translator). A UE in the 5G system is connected to one or more ESs in a TSN data network (DN) outside the 5G system by the DS-TT. A user plane function (UPF) is connected to one or more ESs in the TSN DN by the NW-TT.

To implement a TSN synchronization mechanism, the entire end-to-end 5G system may be considered as an IEEE 802.1AS time aware system. As shown in FIG. 2, there are two time synchronization domains being respectively a 5G time domain and a TSN time domain. The 5G system has its own time system (for example, GPS (Global Positioning System) time), and in FIG. 2, a 5G GM (5G Grand Master) is used to indicate a clock domain of the 5G system (that is, 5G time domain).

The gNB in FIG. 2 indicates a 5G base station. Devices in the 5G system are all synchronized to the 5G clock domain. The devices in the 5G system include: a UPF, an SMF, a UE, a DS-TT, an NW-TT, an NG RAN (NG Radio Access Network, 5G radio access network), and the like, where an NG interface is an interface between the radio access network and a 5G core network.

As shown in FIG. 2, a clock source of the external TSN Time Domain is outside the UPF. The UE side device, namely the ES of the TSN is connected to the UE by the DS-TT, accesses a 5G network, and then accesses an external TSN network through the UPF and the NW-TT on the UPF, to perform time synchronization with the clock source of the TSN.

In FIG. 2, a time synchronization message may be transmitted by the TSN GM through downlink (DL) data, that is, through a user plane of the UE, and the downlink data including the time synchronization message of the TSN GM first reaches the NW-TT/UPF, enters the 5G system, then reaches the UE and the DS-TT thereof, and finally reaches the UE side ES.

The TSN GM identifies a current time thereof on an originTimestamp field of the time synchronization message transmitted by the TSN GM. While the user plane of the UE transfers this time synchronization message, the NW-TT marks (labels) this time synchronization message with a receiving time of receiving this downlink data, and a CorrectionField field value in this data packet is updated to an original CorrectionField field value plus a transmission delay value between the NW-TT and an Ethernet bridge port transmitting this message to the NW-TT, where the transmission delay between the NW-TT and this port may be obtained through the method shown in FIG. 1 or in another manner. Before the DS-TT forwards the downlink data to the ES, the receiving time added by the NW-TT to the downlink data is subtracted from the current time thereof, thereby obtaining a transmission delay value of this time synchronization message in the entire 5G system. This delay value and the previous transmission time (on the CorrectionField field of the received time synchronization message) from the TSN master clock to the NW-TT are added, to obtain an updated transmission delay value, and the CorrectionField field of the time synchronization message (that is, a total transmission delay of this message) is marked with this updated transmission delay value. Meanwhile, the receiving time with which the NW-TT previously performs marking is deleted. Then, this modified time synchronization message is transmitted to the ES.

The ES may obtain, by directly adding the delay value on the time synchronization message to the transmission delay between the DS-TT and the ES (the transmission delay between the ES and the DS-TT may be obtained through the method shown in FIG. 1 or in another manner) according to the delay value with which the DS-TT marks the time synchronization message (that is, the CorrectionField field value on the time synchronization message), a total transmission delay of this time synchronization message from the TSN master clock to the ES, a calculated time value may be obtained by adding this total transmission delay to the originTimestamp field value on the time synchronization message, and then a clock thereof is set to this calculated time value, thereby implementing time synchronization between the UE side ES and the TSN GM.

FIG. 3 is a schematic architectural diagram of a time synchronization requirement proposed in the 5G R17 standard.

In FIG. 2, the UE side ES needs to synchronize time to the TSN GM on the UPF/NW-TT side. However, in a new 5G standard to be formulated, as shown in FIG. 3, a TSN GM (that is, a master clock of a TSN) is on a UE1 side. Therefore, an ES on a UPF/NW-TT side and an ES on another UE (for example, UE2 in FIG. 3) need to perform time synchronization with the TSN GM on this UE1 side. That is, the TSN GM transmits a time synchronization message through an uplink method by using a user plane of the UE1, and then the time synchronization message reaches the UPF.

For a TSN ES outside the UPF, the time synchronization message is transmitted to the TSN ES through the NW-TT. For the ES on the UE2 in the lower left corner in FIG. 3, the UPF transmits the time synchronization message to the UE2 through downlink data of the UE2, and then transmits the time synchronization message to the TSN ES through the DS-TT of the UE2.

In FIG. 3, the DS-TT of the UE1 records a receiving time in which the UE1 receives an uplink (UL) data packet transmitted by the TSN GM and including the time synchronization message, and marks the UL time synchronization message data packet with the receiving time; meanwhile, a CorrectionField field value in this data packet is updated to an original CorrectionField field value plus a transmission delay value between the DS-TT and the TSN GM, where the transmission delay between the DS-TT and the TSN GM may be obtained through the method shown in FIG. 1 or in another manner. The NW-TT subtracts, from the time in which the NW-TT receives this UL data packet, the receiving time with which the DS-TT of the UE1 marks the packet, to obtain a transmission delay value of the entire UL data packet in the 5G system, and this delay value and the previous transmission time from the TSN GM to the UE1 DS-TT (on the CorrectionField field of the received time synchronization message) are added, to obtain an updated transmission delay value; and marks the CorrectionField field of this UL synchronization message data packet with the updated transmission delay value, simultaneously deletes a receiving time label with which the DS-TT of the UE1 performs marking, and then transmits this UL data packet to TSN ESs connected to the right NW-TT (including TSN ESs of the TSN time domain 1 and the TSN time domain 2). According to the method introduced in FIG. 2, a TSN ES connected to the right NW-TT may obtain, by directly adding the delay value on the time synchronization message to the transmission delay between the NW-TT and the TSN ES according to the delay value with which the NW-TT marks the time synchronization message (that is, the CorrectionField field value on the time synchronization message), a total transmission delay of this synchronization message from the TSN GM to the TSN ES connected to the NW-TT, a calculated time value may be obtained by adding this total transmission delay to the originTimestamp field value on the time synchronization message, and then a clock thereof is set to this calculated time value, thereby implementing time synchronization between the TSN ES on the NW-TT side and the TSN GM on the UE1 side.

When the time synchronization message needs to be transmitted to the TSN ES of the UE2, the UPF simultaneously transmits the time synchronization message to the UE2 through the user plane of the UE2, and then the time synchronization message reaches the DS-TT of the UE2. Similarly, the DS-TT of the UE2 subtracts, from the time in which the DS-TT receives the downlink data packet including the time synchronization message, the receiving time with which the DS-TT of the UE1 marks the downlink synchronization message data packet, to obtain a transmission delay value of the entire data packet including the time synchronization message in the 5G system, and this transmission delay value and the previous transmission time from the TSN GM to the UE1 DS-TT (on the CorrectionField field of the received time synchronization message) are added, to obtain an updated transmission delay value; and marks the CorrectionField field of this DL data packet including the time synchronization message with the updated transmission delay value, simultaneously deletes a receiving time label with which the DS-TT of the UE1 performs marking, and then transmits this DL data packet to the TSN ES on the UE2 DS-TT. Similarly, according to the foregoing introduced method, the TSN ES on the UE2 DS-TT may implement time synchronization with the TSN GM on the UE1 side.

In FIG. 3, a solid arrow indicates gPTP by ingress DS-TT; and a dashed arrow indicates locally-switched gPTP by ingress DS-TT.

Because of diversified deployment, the DS-TT of the UE1 in FIG. 3 is simultaneously connected to the TSN GM Domain 1 and the TSN GM Domain 2, but it may be likely that the DS-TT of the UE1 is connected to the TSN GM Domain 1 and a DS-TT of a UE X is connected to the TSN GM Domain 2. Moreover, the DS-TT of the UE2 in FIG. 3 is connected to only one End Station of a TSN GM Domain, but it may be likely that the DS-TT of the UE2 may be connected to a plurality of End Stations and all the End Stations respectively correspond to different TSN GM Domains. In sum, a DS-TT of a UE may be connected to a GM or an End Station of one or more different TSN GM Domains; and a DS-TT of a UE may be connected to a GM of a TSN GM Domain X and simultaneously connected to an End Station of a TSN GM Domain Y, or be in another connection manner.

Under the foregoing technology background, how to enable a particular UE or a particular group of UEs or all UEs to be immediately (simultaneously) synchronized to a time domain, or how to enable a particular UE or a particular group of UEs or all UEs to be synchronized to a time domain in a particular time (simultaneously) is an urgent technical problem that needs to be resolved. Therefore, an embodiment of this application proposes that an AF transmits a TSN configuration creation request to an NEF, the NEF transmits a TSN authorization request to a UDM, the UDM transmits a TSN activation request to an AMF, the AMF transmits control signaling to a target UE, to trigger the UE to perform a TSN time synchronization activation or deactivation operation; meanwhile, a time requirement for the UE to perform TSN time synchronization may be added to a trigger condition.

The implementation details of the technical solutions in the embodiments of this application are described below in detail.

FIG. 4 is a flowchart of a time synchronization method according to an embodiment of this application. The time synchronization method may be performed by an NEF. Referring to FIG. 4, the time synchronization method includes at least step S410 and step S420. A detailed description is as follows:

Step S410. Receive a time sensitive network (TSN) configuration creation request transmitted by an application function entity (AF), the TSN configuration creation request including an identifier of a target UE and first information used for indicating a TSN time synchronization trigger condition.

In an embodiment of this application, the target UE is a UE that needs to perform TSN time synchronization. The first information used for indicating the TSN time synchronization trigger condition may include the following information: a TSN clock domain identifier, first field information used for indicating uplink TSN synchronization or downlink TSN synchronization, second field information used for indicating an activation operation or a deactivation operation, network slice information, and a data network name.

The TSN clock domain identifier is used for identifying a TSN clock domain to which synchronization needs to be performed; the first field information is used for indicating uplink TSN synchronization or downlink TSN synchronization, for example, a first value of the first field information indicates uplink TSN synchronization and a second value of the first field information indicates downlink TSN synchronization; the second field information is used for indicating an activation operation or a deactivation operation, for example, a first value of the second field information indicates an activation operation and a second value of the second field information indicates a deactivation operation; the network slice information may be Single Network Slice Selection Assistance Information (S-NSSAI), used for identifying a network slice; and the data network name is abbreviated to DNN.

When the first information used for indicating the TSN time synchronization trigger condition further includes TSN activation time information, the TSN activation time information is used for indicating that a TSN time synchronization operation is performed immediately, or used for indicating that a TSN time synchronization operation is performed after a predetermined time, or used for indicating that a TSN time synchronization operation is performed at a designated time point; and when the first information does not include the TSN activation time information, the first information is used for indicating that a TSN time synchronization operation is performed immediately.

Step S420. Transmit a TSN authorization request to a UDM, the TSN authorization request being used for requesting the UDM to transmit, after confirming authorization, a TSN activation request including the first information to an access and mobility management function entity (AMF) registered by the target UE, to transmit, through the AMF, control signaling used for performing a TSN time synchronization operation to the target UE.

In an embodiment of this application, before the NEF transmits the TSN authorization request to the UDM, the identifier of the target UE may be translated from an external identifier into a network identifier, and when the identifier of the target UE includes an external identifier of a single UE, the external identifier of the single UE is translated into a network identifier of the single UE; and when the identifier of the target UE includes an external group identifier corresponding to a plurality of UEs, the external group identifier is translated into a network identifier list of the plurality of UEs.

For example, the external identifier of the UE may be a mobile phone number. For example, the network identifier of the UE may be an IMSI (International Mobile Subscriber Identity), a GPSI (Generic Public Subscription Identifier), or an SUPI (Subscription Permanent Identifier).

In an embodiment of this application, when the identifier of the target UE includes an external group identifier corresponding to a plurality of UEs, because a network identifier list of the plurality of UEs is obtained after translation, when transmitting the TSN authorization request to the UDM, the NEF needs to transmit the TSN authorization request to the UDM for each UE in the network identifier list.

The embodiment shown in FIG. 4 is described from the perspective of the NEF, and a time synchronization method of an embodiment of this application is described below from the perspective of a UDM with reference to FIG. 5.

Figure 5:
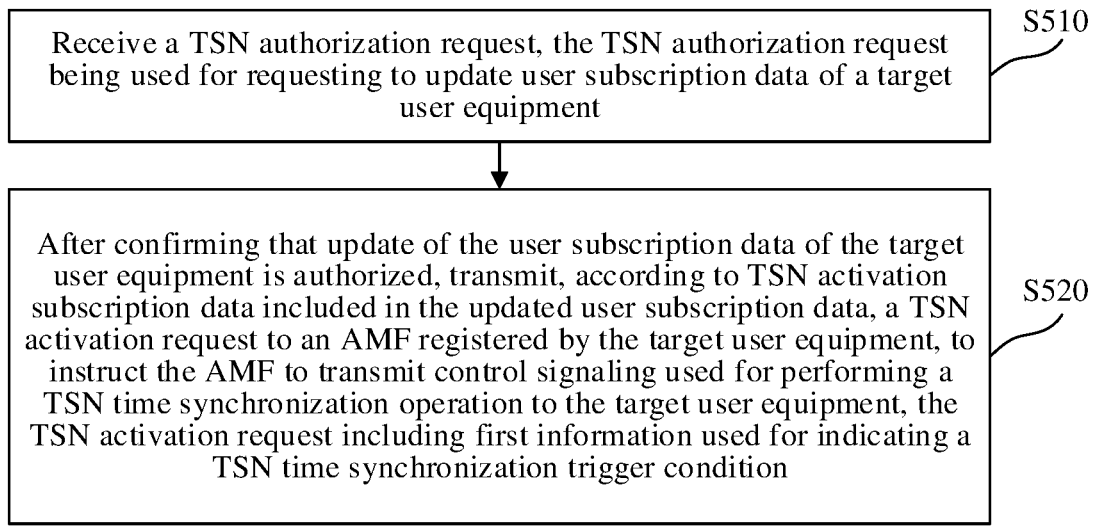
FIG. 5 is a flowchart of a time synchronization method according to an embodiment of this application.

Referring to FIG. 5, the time synchronization method may be performed by a UDM, and includes at least the following step S510 and step S520. A detailed description is as follows:

Step S510. Receive a TSN authorization request, the TSN authorization request being used for requesting to update user subscription data of a target UE.

In an embodiment of this application, the UDM may receive the TSN authorization request transmitted by an NEF, and for a procedure in which the NEF transmits the TSN authorization request, reference may be made to the technical solution of the foregoing embodiments. After receiving the TSN authorization request, the UDM may determine whether to allow the NEF to request to add or modify subscription data of a UE (target UE); if yes, the UE subscription data may be added. The UE subscription data may include a TSN clock domain identifier, first field information used for indicating uplink TSN synchronization or downlink TSN synchronization, second field information used for indicating an activation operation or a deactivation operation, network slice information, and a data network name. Then, the UDM may perform TSN activation and deactivation operations on the target UE based on information about this UE subscription data.

Step S520. After confirming that update of the user subscription data of the target UE is authorized, transmit, according to TSN activation subscription data included in the updated user subscription data, a TSN activation request to an AMF registered by the target UE, to instruct the AMF to transmit control signaling used for performing a TSN time synchronization operation to the target UE, the TSN activation request including first information used for indicating a TSN time synchronization trigger condition.

In an embodiment of this application, the first information included in the TSN activation request comes from the TSN authorization request transmitted by the NEF, but an initial source is a TSN configuration creation request transmitted by an AF. Similar to the foregoing embodiments, the target UE is a UE that needs to perform TSN time synchronization. The first information may include the following information: a TSN clock domain identifier, first field information used for indicating uplink TSN synchronization or downlink TSN synchronization, second field information used for indicating an activation operation or a deactivation operation, network slice information, and a data network name.

In an embodiment of this application, the UDM may control, by controlling an occasion of transmitting the TSN activation request to the AMF registered by the target UE, the time of performing the TSN time synchronization operation by the target UE. Details are as follows:

1). When TSN activation time information included in the TSN authorization request indicates that a TSN time synchronization operation is performed immediately or the TSN authorization request does not include the TSN activation time information, immediately transmit the TSN activation request to the AMF registered by the target UE.

That the TSN authorization request does not include the TSN activation time information may include the following several embodiments: A case is that when transmitting the TSN authorization request to the UDM, the NEF has performed time control. In one embodiment, none of the UDM, the AMF, and the target UE needs to perform time control, and when receiving the TSN authorization request, the UDM immediately transmits the TSN activation request to the AMF registered by the target UE. Another case is that none of the NEF, the UDM, the AMF, and the target UE performs time control. In one embodiment, after receiving the TSN configuration creation request transmitted by the AF and performing processing (for example, performing translation on the identifier of the target UE), the NEF directly transmits the TSN authorization request to the UDM, and when receiving the TSN authorization request, the UDM immediately transmits the TSN activation request to the AMF registered by the target UE.

2). When TSN activation time information included in the TSN authorization request indicates that a TSN time synchronization operation is performed after a predetermined time, the UDM transmits, after the predetermined time after receiving the TSN authorization request, the TSN activation request to the AMF registered by the target UE.

3). When TSN activation time information included in the TSN authorization request indicates that a TSN time synchronization operation is performed at a designated time point, the UDM transmits, when a current time reaches the designated time point, the TSN activation request to the AMF registered by the target UE.

4). When TSN activation time information included in the TSN authorization request indicates that a TSN time synchronization operation is performed after a predetermined time but a current time has exceeded the designated time point, the UDM immediately transmits the TSN activation request to the AMF registered by the target UE.

In an embodiment of this application, the UDM may alternatively not control the occasion on which the target UE performs the TSN time synchronization operation. That is, after receiving the TSN authorization request, the UDM immediately generates the TSN activation request, and transmits the TSN activation request to the AMF registered by the target UE. In one embodiment, the TSN activation request transmitted by the UDM to the AMF may include the TSN activation time information, and the TSN activation time information comes from the TSN authorization request transmitted by the NEF to the UDM, but an initial source is a TSN configuration creation request transmitted by an AF to an NEF.

In an embodiment of this application, one target UE (to facilitate differentiating, a target UE registering a plurality of AMFs with the UDM is referred to as a first target UE) may register a plurality of AMFs with the UDM, such as a first AMF whose access network conforms to a 3GPP standard (for example, 2G, 3G, 4G, or 5G), and a second AMF whose access network does not conform to a 3GPP standard (for example, Wi-Fi). In one embodiment, when transmitting the TSN activation request to the first AMF registered by the target UE, the UDM may first transmit the TSN activation request to the first AMF whose access network conforms to the 3GPP standards, and when an activation response fed back by the first AMF indicates unsuccessful activation or a protocol data unit (PDU) session registration message fed back by an SMF for the first target UE is not received, then transmit the TSN activation request to the second AMF whose access network does not conform to the 3GPP standards. Alternatively, the UDM may simultaneously transmit the TSN activation request to the plurality of AMFs, and when an activation response fed back by each of the plurality of AMFs indicates unsuccessful activation or a PDU session registration message fed back by an SMF for the first target UE is not received in a set time, transmit the TSN activation request to the plurality of AMFs again.

The embodiment shown in FIG. 5 is described from the perspective of the UDM, and a time synchronization method of an embodiment of this application is described below from the perspective of an AMF with reference to FIG. 6.

Figure 6:
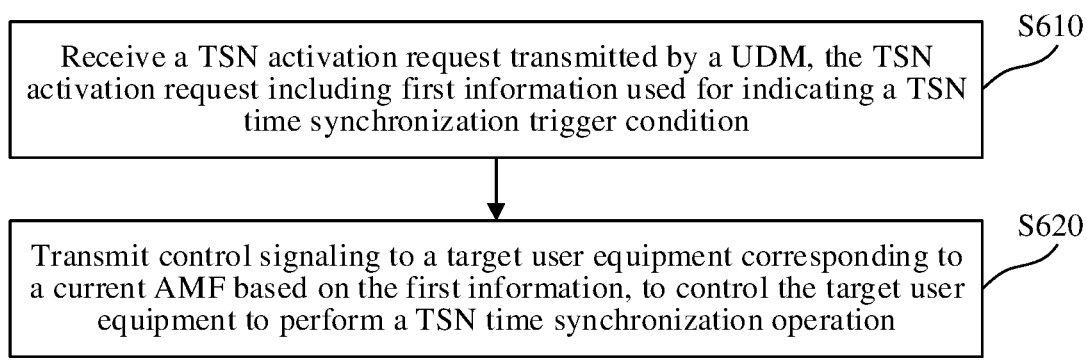
FIG. 6 is a flowchart of a time synchronization method according to an embodiment of this application.

Referring to FIG. 6, the time synchronization method may be performed by an AMF, and includes at least the following step S610 and step S620. A detailed description is as follows:

Step S610. Receive a TSN activation request transmitted by a UDM, the TSN activation request including first information used for indicating a TSN time synchronization trigger condition.

In an embodiment of this application, for a procedure in which the UDM transmits the TSN activation request, reference may be made to the technical solution of the foregoing embodiments. The first information included in the TSN activation request comes from the TSN authorization request transmitted by the NEF to the UDM, but an initial source is a TSN configuration creation request transmitted by an AF to an NEF. The first information may include the following information: a TSN clock domain identifier, first field information used for indicating uplink TSN synchronization or downlink TSN synchronization, second field information used for indicating an activation operation or a deactivation operation, network slice information, and a data network name.

Step S620. Transmit control signaling to a target UE corresponding to a current AMF based on the first information, to control the target UE to perform a TSN time synchronization operation.

In an embodiment of this application, the target UE corresponding to the current AMF may be a target UE in signaling connection to the current AMF, or a target UE previously establishing signaling connection to the current AMF.

In an embodiment of this application, when transmitting control signaling to the target UE corresponding to the current AMF, the AMF needs to first detect whether signaling connection between the target UE and the network is in the connection management idle state (CM-IDLE state), and when detecting that the target UE is in the connection management idle state, the AMF needs to initiate a network triggered service request procedure, to establish signaling connection to the target UE; and when detecting that the target UE is in a connection management connected state (CM-CONNECTED state), the AMF transmits control signaling to the target UE corresponding to the current AMF. When second field information used for indicating an activation operation or a deactivation operation and included in the first information indicates an activation operation, the control signaling transmitted by the AMF to the corresponding target UE may be a PDU session establishment instruction; and when second field information indicates a deactivation operation, the control signaling transmitted by the AMF to the corresponding target UE may be a PDU session release instruction or PDU session modification instruction.

In a 5GS network architecture, CM (connection management) states of a UE include: CM-IDLE (that is, idle state) and CM-CONNECTED (that is, connected state), and the CM states reflect signaling connection characteristics of the UE. In the idle state (CM-IDLE), no NAS (Non-Access Stratum) signaling connection exists between the UE and the network, for example, neither Radio Resource Control (RRC) connection nor N1-AMF connection is included; and in the connected state (CM-CONNECTED), NAS signaling connection including RRC connection and N1-AMF connection exists between the UE and the network.

In this embodiment of this application, the first information included in the TSN activation request may indicate an activation operation, or may indicate a deactivation operation, and detailed descriptions are made below for such two embodiments as activation and deactivation respectively:

In an embodiment of this application, when second field information indicates an activation operation, the control signaling transmitted by the AMF to the corresponding target UE is a PDU session establishment instruction, and transmitting manners may include the following examples:

1). When the first information includes TSN activation time information, the TSN activation time information indicates that the TSN time synchronization operation is performed immediately, and the second field information indicates an activation operation, the AMF immediately transmits a PDU session establishment instruction to the target UE, to instruct the target UE to establish a PDU session.

2). When the first information includes TSN activation time information, the TSN activation time information indicates that the TSN time synchronization operation is performed after a predetermined time, and the second field information indicates an activation operation, the AMF transmits a PDU session establishment instruction to the target UE after the predetermined time after receiving the TSN activation request, to instruct the target UE to establish a PDU session.

In one embodiment, when a time after the TSN activation request is received by the AMF has not reached the predetermined time but the target UE registers a new AMF or a new AMF is selected for the target UE in a network switching procedure, the original AMF may transmit context information of TSN synchronization activation to the new AMF, to cause the new AMF to transmit a PDU session establishment instruction to the target UE after a TSN remaining activation time is reached. The context information includes: a TSN clock domain identifier, first field information used for indicating uplink TSN synchronization or downlink TSN synchronization, second field information used for indicating an activation operation, network slice information, a data network name, and TSN activation time information. A time value indicated by the TSN activation time information is a TSN remaining activation time, and the TSN remaining activation time is a difference between the predetermined time and an elapsed time (a time that has elapsed after the TSN activation request is received by the original AMF). Through the technical solution in this embodiment, during the TSN time synchronization processing, even if the target UE registers a new AMF or a new AMF is selected for the target UE in a network switching procedure, it can still be ensured that the TSN time synchronization processing is normally performed.

When the target UE registers a new AMF, the original AMF may transmit context information of TSN synchronization activation to the new AMF through a UE context transfer message (Namf_Communication_UEContextTransfer); and when a new AMF is selected for the target UE in a network switching procedure, the original AMF may transmit the context information of TSN synchronization activation to the new AMF through a create UE context request (Namf_Communication_CreateUEContext Request).

3). When the first information includes TSN activation time information, the TSN activation time information indicates that the TSN time synchronization operation is performed at a designated time point, and the second field information indicates an activation operation, the AMF transmits a PDU session establishment instruction to the target UE when the current time reaches the designated time point, to instruct the target UE to establish a PDU session.

In one embodiment, when the current time has not reached the designated time point but the target UE registers a new AMF or a new AMF is selected for the target UE in a network switching procedure, the original AMF may transmit context information of TSN synchronization activation to the new AMF, to cause the new AMF to transmit a PDU session establishment instruction to the target UE when the current time reaches the designated time point. The context information includes: a TSN clock domain identifier, first field information used for indicating uplink TSN synchronization or downlink TSN synchronization, second field information used for indicating an activation operation, network slice information, a data network name, and TSN activation time information. A value indicated by the TSN activation time information is the designated time point. Through the technical solution in this embodiment, similarly, during the TSN time synchronization processing, even if the target UE registers a new AMF or a new AMF is selected for the target UE in a network switching procedure, it can still be ensured that the TSN time synchronization processing is normally performed.

Similarly, when the target UE registers a new AMF, the original AMF may transmit context information of TSN synchronization activation to the new AMF through a UE context transfer message (Namf_Communication_UEContextTransfer); and when a new AMF is selected for the target UE in a network switching procedure, the original AMF may transmit the context information of TSN synchronization activation to the new AMF through a create UE context request (Namf_Communication_CreateUEContext Request).

4). When the first information includes TSN activation time information, the TSN activation time information indicates that the TSN time synchronization operation is performed at a designated time point, and the second field information indicates an activation operation, but the current time has exceeded the designated time point, the AMF immediately transmits a PDU session establishment instruction to the target UE, to instruct the target UE to establish a PDU session.

5). When the first information does not include TSN activation time information and the second field information indicates an activation operation, the AMF immediately transmits a PDU session establishment instruction to the target UE, to instruct the target UE to establish a PDU session.

That the first information in the TSN activation request does not include the TSN activation time information may include the following several embodiments: A case is that when transmitting the TSN authorization request to the UDM, the NEF has performed time control. In one embodiment, none of the UDM, the AMF, and the target UE needs to perform time control; and when receiving the TSN authorization request, the UDM immediately transmits the TSN activation request to the AMF registered by the target UE, and after receiving the TSN activation request, the AMF immediately transmits control signaling to the corresponding target UE. Another case is that the NEF does not perform time control, while the UDM performs time control. In one embodiment, the UDM decides, according to the TSN activation time information included in the received TSN authorization request, when to transmit the TSN activation request to the AMF, and after receiving the TSN activation request, the AMF immediately transmits control signaling to the corresponding target UE. Sill another case is that none of the NEF, the UDM, the AMF, and the target UE performs time control. In one embodiment, after receiving the TSN configuration creation request transmitted by the AF and performing processing (for example, performing translation on the identifier of the target UE), the NEF directly transmits the TSN authorization request to the UDM; and when receiving the TSN authorization request, the UDM immediately transmits the TSN activation request to the AMF registered by the target UE, and after receiving the TSN activation request, the AMF immediately transmits control signaling to the corresponding target UE.

In an embodiment of this application, the PDU session establishment instruction transmitted by the AMF may include the following parameters: a TSN clock domain identifier, first field information used for indicating uplink TSN synchronization or downlink TSN synchronization, second field information used for indicating an activation operation, network slice information, and a data network name. These parameters and values of the parameters come from the first information included in the TSN activation request received by the AMF.

In an embodiment of this application, when the second field information indicates an activation operation, the AMF may alternatively transmit the PDU session establishment instruction including the TSN activation time information to the corresponding target UE, and the value of the TSN activation time information comes from the first information included in the TSN activation request received by the AMF. In this embodiment, the AMF does not perform a time control operation, but transmits the PDU session establishment instruction including the TSN activation time information to the target UE, to instruct the target UE to initiate a PDU session establishment procedure at a corresponding time.

In an embodiment of this application, when second field information indicates a deactivation operation, the control signaling transmitted by the AMF to the corresponding target UE is a PDU session release instruction or PDU session modification instruction, and transmitting manners may include the following examples:

1). When the first information includes TSN activation time information, the TSN activation time information indicates that the TSN time synchronization operation is performed immediately, and the second field information indicates a deactivation operation, the AMF immediately transmits a PDU session release instruction or PDU session modification instruction to the target UE, to instruct the target UE to initiate a PDU session release procedure or PDU session modification procedure.

2). When the first information includes TSN activation time information, the TSN activation time information indicates that the TSN time synchronization operation is performed after a predetermined time, and the second field information indicates a deactivation operation, the AMF transmits a PDU session release instruction or PDU session modification instruction to the target UE after the predetermined time after receiving the TSN activation request, to instruct the target UE to initiate a PDU session release procedure or PDU session modification procedure.

In one embodiment, when a time after the TSN activation request is received by the AMF has not reached the predetermined time but the target UE registers a new AMF or a new AMF is selected for the target UE in a network switching procedure, the original AMF may transmit context information of TSN synchronization activation to the new AMF, to cause the new AMF to transmit a PDU session release instruction or PDU session modification instruction to the target UE after a TSN remaining activation time is reached. The context information includes: a TSN clock domain identifier, first field information used for indicating uplink TSN synchronization or downlink TSN synchronization, second field information used for indicating a deactivation operation, network slice information, a data network name, and TSN activation time information. A time value indicated by the TSN activation time information is a TSN remaining activation time, and the TSN remaining activation time is a difference between the predetermined time and an elapsed time (a time that has elapsed after the TSN activation request is received by the original AMF). Through the technical solution in this embodiment, during the TSN time synchronization processing, even if the target UE registers a new AMF or a new AMF is selected for the target UE in a network switching procedure, it can still be ensured that the TSN time synchronization processing is normally performed. For signaling of transmitting context information, reference may be made to the technical solution of the foregoing embodiments 3). When the first information includes TSN activation time information, the TSN activation time information indicates that the TSN time synchronization operation is performed at a designated time point, and the second field information indicates a deactivation operation, the AMF transmits a PDU session release instruction or PDU session modification instruction to the target UE when the current time reaches the designated time point, to instruct the target UE to initiate a PDU session release procedure or PDU session modification procedure.

In one embodiment, when the current time has not reached the designated time point but the target UE registers a new AMF or a new AMF is selected for the target UE in a network switching procedure, the original AMF may transmit context information of TSN synchronization activation to the new AMF, to cause the new AMF to transmit a PDU session release instruction or PDU session modification instruction to the target UE when the current time reaches the designated time point. The context information includes: a TSN clock domain identifier, first field information used for indicating uplink TSN synchronization or downlink TSN synchronization, second field information used for indicating a deactivation operation, network slice information, a data network name, and TSN activation time information. A time value indicated by the TSN activation time information is the designated time point. For signaling of transmitting context information, reference may be made to the technical solution of the foregoing embodiments 4). When the first information includes TSN activation time information, the TSN activation time information indicates that the TSN time synchronization operation is performed at a designated time point, and the second field information indicates a deactivation operation, but the current time has exceeded the designated time point, the AMF immediately transmits a PDU session release instruction or PDU session modification instruction to the target UE, to instruct the target UE to initiate a PDU session release procedure or PDU session modification procedure.

5). When the first information does not include TSN activation time information and the second field information indicates a deactivation operation, immediately transmit a PDU session release instruction or PDU session modification instruction to the target UE, to instruct the target UE to initiate a PDU session release procedure or a PDU session modification procedure.

In an embodiment of this application, the PDU session release instruction or PDU session modification instruction may include the following parameters: a TSN clock domain identifier, first field information used for indicating uplink TSN synchronization or downlink TSN synchronization, second field information used for indicating a deactivation operation, network slice information, and a data network name. These parameters and values of the parameters come from the first information.

In the foregoing embodiment, after the AMF transmits the PDU session release instruction or PDU session modification instruction to the corresponding target UE, the target UE initiates the PDU session release procedure or PDU session modification procedure.

In another embodiment of this application, the AMF may alternatively directly initiate the PDU session release procedure or modification procedure. Details are as follows:

1). When the first information includes TSN activation time information, the TSN activation time information indicates that the TSN time synchronization operation is performed immediately, and the second field information indicates a deactivation operation, the AMF immediately initiates a PDU session release procedure or PDU session modification procedure. The PDU session release procedure or PDU session modification procedure refers to a PDU session release procedure or PDU session modification procedure related to the target UE. The following similarities are the same 2). When the first information includes TSN activation time information, the TSN activation time information indicates that the TSN time synchronization operation is performed after a predetermined time, and the second field information indicates a deactivation operation, the AMF initiates a PDU session release procedure or PDU session modification procedure after the predetermined time after receiving the TSN activation request.

In one embodiment, when a time after the TSN activation request is received by the AMF has not reached the predetermined time but the target UE registers a new AMF or a new AMF is selected for the target UE in a network switching procedure, the original AMF may transmit context information of TSN synchronization activation to the new AMF, to cause the new AMF to initiate a PDU session release procedure or PDU session modification procedure after a TSN remaining activation time is reached. The context information includes: a TSN clock domain identifier, first field information used for indicating uplink TSN synchronization or downlink TSN synchronization, second field information used for indicating a deactivation operation, network slice information, a data network name, and TSN activation time information. A time value indicated by the TSN activation time information is a TSN remaining activation time, and the TSN remaining activation time is a difference between the predetermined time and an elapsed time (a time that has elapsed after the TSN activation request is received by the original AMF). For signaling of transmitting context information, reference may be made to the technical solution of the foregoing embodiments 3). When the first information includes TSN activation time information, the TSN activation time information indicates that the TSN time synchronization operation is performed at a designated time point, and the second field information indicates a deactivation operation, the AMF initiates a PDU session release procedure or PDU session modification procedure when the current time reaches the designated time point.

In one embodiment, when the current time has not reached the designated time point but the target UE registers a new AMF or a new AMF is selected for the target UE in a network switching procedure, the original AMF may transmit context information of TSN synchronization activation to the new AMF, to cause the new AMF to initiate a PDU session release procedure or PDU session modification procedure after the current time reaches the designated time point. The context information includes: a TSN clock domain identifier, first field information used for indicating uplink TSN synchronization or downlink TSN synchronization, second field information used for indicating a deactivation operation, network slice information, a data network name, and TSN activation time information. A time value indicated by the TSN activation time information is the designated time point. For signaling of transmitting context information, reference may be made to the technical solution of the foregoing embodiments 4). When the first information includes TSN activation time information, the TSN activation time information indicates that the TSN time synchronization operation is performed at a designated time point, and the second field information indicates a deactivation operation, but the current time has exceeded the designated time point, the AMF immediately initiates a PDU session release procedure or PDU session modification procedure.

5). When the first information does not include TSN activation time information and the second field information indicates a deactivation operation, the AMF immediately initiates a PDU session release procedure or a PDU session modification procedure.

In an embodiment of this application, the initiating, by the AMF, a PDU session release procedure or PDU session modification procedure may be generating PDU session update information. The PDU session update information includes an identifier of a to-be-deactivated target TSN clock domain. Then, the AMF transmits the PDU session update information to an SMF, to cause the SMF to instruct a user plane function entity to stop forwarding TSN time synchronization data of the target TSN clock domain to the target UE.

In an embodiment of this application, a PDU session established by the UE supports a time synchronization operation of a plurality of TSN clock domains. In one embodiment, when a to-be-deactivated target TSN clock domain, network slice information, and a data network name that are included in the first information are respectively matched with a TSN clock domain, network slice information, and a data network name of the PDU session established by the target UE and the to-be-deactivated target TSN clock domain is not a last TSN clock domain in the PDU session, the AMF may initiate a PDU session modification procedure; or when a to-be-deactivated target TSN clock domain, network slice information, and a data network name that are included in the first information are respectively matched with a TSN clock domain, network slice information, and a data network name of the PDU session established by the target UE and the to-be-deactivated target TSN clock domain is a last TSN clock domain in the PDU session, the AMF may initiate a PDU session release procedure.

In an embodiment of this application, when the second field information indicates a deactivation operation, the AMF may alternatively transmit the PDU session release instruction or PDU session modification instruction including the TSN activation time information to the corresponding target UE, and the value of the TSN activation time information comes from the first information included in the TSN activation request received by the AMF. In this embodiment, the AMF does not perform a time control operation, but transmits the PDU session release instruction or PDU session modification instruction including the TSN activation time information to the target UE, to instruct the target UE to initiate a PDU session release procedure or PDU session modification procedure at a corresponding time.

The embodiment shown in FIG. 6 is described from the perspective of the AMF, and a time synchronization method of an embodiment of this application is described below from the perspective of a UE (target UE) with reference to FIG. 7.

Figure 7:
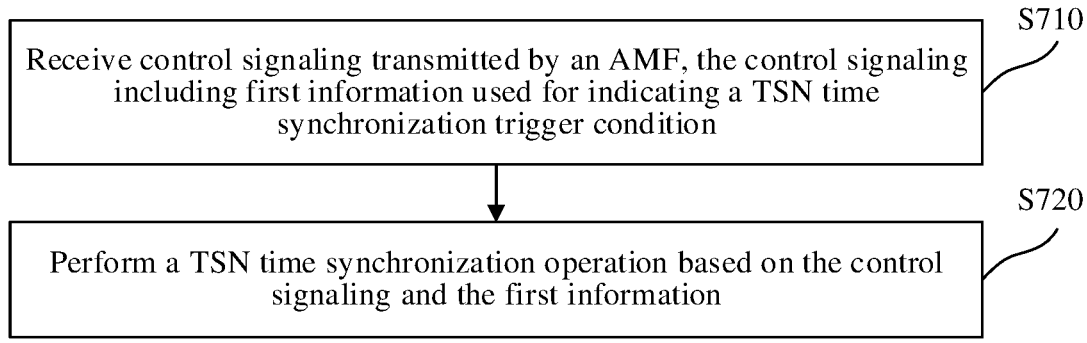
FIG. 7 is a flowchart of a time synchronization method according to an embodiment of this application.

Referring to FIG. 7, the time synchronization method may be performed by a UE, and includes at least the following step S710 and step S720. A detailed description is as follows:

Step S710. Receive control signaling transmitted by an AMF, the control signaling including first information used for indicating a TSN time synchronization trigger condition.

In an embodiment of this application, for a procedure in which the AMF transmits the control signaling, reference may be made to the technical solution of the foregoing embodiments. The control signaling may include a PDU session establishment instruction, a PDU session release instruction, and a PDU session modification instruction. The first information included in the control signaling comes from a TSN activation request transmitted by a UDM to the AMF, but an initial source is a TSN configuration creation request transmitted by an AF to an NEF The first information may include the following information: a TSN clock domain identifier, first field information used for indicating uplink TSN synchronization or downlink TSN synchronization, second field information used for indicating an activation operation or a deactivation operation, network slice information, and a data network name.

Step S720. Perform a TSN time synchronization operation based on the control signaling and the first information.

In this embodiment of this application, when the second field information included in the first information indicates an activation operation, the control signaling is the PDU session establishment instruction. In one embodiment, the procedure of performing a TSN time synchronization operation based on the control signaling and the first information may include the following several embodiments:

1). When the first information does not include TSN activation time information and the PDU session establishment instruction is received, the UE immediately establishes a PDU session to perform a TSN time synchronization operation. For the PDU session establishment procedure initiated by the UE when establishing the PDU session, reference may be made to chapter 4.3.2 of 3GPP protocol TS23.502. A PDU session establishment request transmitted by the UE when establishing the PDU session may include the following parameters, and the following parameters and values of the parameters come from the first information: a TSN clock domain identifier, first field information used for indicating uplink TSN synchronization or downlink TSN synchronization, second field information used for indicating an activation operation, network slice information, and a data network name.

That the first information in the control signaling does not include the TSN activation time information may include the following several embodiments: A case is that when transmitting the TSN authorization request to the UDM, the NEF has performed time control. In one embodiment, none of the UDM, the AMF, and the UE needs to perform time control; and when receiving the TSN authorization request, the UDM immediately transmits the TSN activation request to the AMF registered by the UE, and after receiving the TSN activation request, the AMF immediately transmits the PDU session establishment instruction to the corresponding UE. Another case is that the NEF does not perform time control, while the UDM performs time control. In one embodiment, the UDM decides, according to the TSN activation time information included in the received TSN authorization request, when to transmit the TSN activation request to the AMF, and after receiving the TSN activation request, the AMF immediately transmits the PDU session establishment instruction to the corresponding UE. Still another case is that neither the NEF nor the UDM performs time control, while the AMF performs time control. In one embodiment, the AMF decides, according to the TSN activation time information included in the received TSN activation request, when to transmit the PDU session establishment instruction to the UE, and the UE immediately establishes the PDU session to perform the TSN time synchronization operation after receiving the PDU session establishment instruction. Yet another case is that none of the NEF, the UDM, the AMF, and the UE performs time control. In one embodiment, after receiving the TSN configuration creation request transmitted by the AF and performing processing (for example, performing translation on the identifier of the UE), the NEF directly transmits the TSN authorization request to the UDM; and when receiving the TSN authorization request, the UDM immediately transmits the TSN activation request to the AMF registered by the UE, and after receiving the TSN activation request, the AMF immediately transmits the PDU session establishment instruction to the corresponding UE.

2). When the first information includes TSN activation time information and the TSN activation time information instructs a UE to immediately perform a TSN time synchronization operation after receiving the PDU session establishment instruction, the UE immediately establishes a PDU session to perform the TSN time synchronization operation.

3). When the first information includes TSN activation time information and the TSN activation time information instructs a UE to perform a TSN time synchronization operation after a predetermined time after receiving the PDU session establishment instruction, the UE establishes a PDU session after the predetermined time after receiving the PDU session establishment instruction to perform the TSN time synchronization operation.

4). When the first information includes TSN activation time information and the TSN activation time information instructs a UE to perform a TSN time synchronization operation at a designated time point, the UE establishes a PDU session when a current time reaches the designated time point to perform the TSN time synchronization operation.

5). When the first information includes TSN activation time information and the TSN activation time information instructs a UE to perform a TSN time synchronization operation at a designated time point, but a current time has exceeded the designated time point, the UE immediately establishes a PDU session to perform the TSN time synchronization operation.

In an embodiment of this application, when the second field information indicates an activation operation, and the TSN activation time information in the first information instructs the UE to perform a TSN time synchronization operation after a predetermined time after receiving the PDU session establishment instruction, after the predetermined time after the UE receives the PDU session establishment instruction, it may be first detected whether the UE is in the connection management idle state. A service request procedure is performed when the UE is in the connection management idle state, to establish signaling connection to the AMF. After the signaling connection is established, the UE may establish the PDU session to perform the TSN time synchronization operation; or when the UE is in a connection management connected state, the PDU session may be directly established to perform the TSN time synchronization operation.

In an embodiment of this application, when the second field information indicates an activation operation, and the TSN activation time information in the first information instructs the UE to perform a TSN time synchronization operation after a predetermined time after receiving the PDU session establishment instruction, the UE establishes, when a time at which the UE receives the PDU session establishment instruction has not reached the predetermined time and the UE registers a new AMF or a new AMF is selected for the UE in a network switching procedure, a PDU session based on the new AMF after the predetermined time after receiving the PDU session establishment instruction to perform the TSN time synchronization operation. That is, the registering, by the UE, a new AMF or selecting a new AMF for the UE during network switching does not affect the UE in performing the TSN time synchronization operation.

Similarly, when the second field information indicates an activation operation, and the TSN activation time information in the first information instructs the UE to perform a TSN time synchronization operation at a designated time point, it may be first detected, when the current time reaches the designated time point, whether the UE is in a connection management idle state. A service request procedure is performed when the UE is in the connection management idle state, to establish signaling connection to the AMF. After the signaling connection is established, the UE may establish the PDU session to perform the TSN time synchronization operation; or when the UE is in a connection management connected state, the PDU session may be directly established to perform the TSN time synchronization operation.

When the first information includes TSN activation time information and the TSN activation time information instructs a UE to perform a TSN time synchronization operation at a designated time point, the UE establishes, when the current time has not reached the designated time point and the UE registers a new AMF or a new AMF is selected for the UE in a network switching procedure, a PDU session based on the new AMF when a current time reaches the designated time point to perform the TSN time synchronization operation.

In this embodiment of this application, when the second field information included in the first information indicates a deactivation operation, the control signaling is the PDU session release instruction or PDU session modification instruction. In one embodiment, the procedure of performing a TSN time synchronization operation based on the control signaling and the first information includes the following several embodiments:

1). When the first information does not include TSN activation time information and the PDU session release instruction or PDU session modification instruction is received, the UE immediately initiates a PDU session release procedure or a PDU session modification procedure. For the PDU session release procedure initiated by the UE, reference may be made to chapter 4.3.4.2 of 3GPP protocol TS23.502; and for the PDU session modification procedure initiated by the UE, reference may be made to chapter 4.3.2.2 of 3GPP protocol TS23.502.

2). When the first information includes TSN activation time information and the TSN activation time information instructs a UE to immediately perform the TSN time synchronization operation when receiving the PDU session release instruction or PDU session modification instruction, the UE immediately initiates a PDU session release procedure or a PDU session modification procedure.

3). When the first information includes TSN activation time information and the TSN activation time information instructs a UE to immediately perform the TSN time synchronization operation after a predetermined time after receiving the PDU session release instruction or PDU session modification instruction, the UE initiates a PDU session release procedure or a PDU session modification procedure after the predetermined time after receiving the PDU session release instruction or PDU session modification instruction.

4). When the first information includes TSN activation time information and the TSN activation time information instructs a UE to perform a TSN time synchronization operation at a designated time point, the UE initiates a PDU session release procedure or PDU session modification procedure when a current time reaches the designated time point.

5). When the first information includes TSN activation time information and the TSN activation time information instructs a UE to perform a TSN time synchronization operation at a designated time point, but a current time has exceeded the designated time point, the UE immediately initiates a PDU session release procedure or PDU session modification procedure.

In an embodiment of this application, when the UE initiates a PDU session modification procedure, a PDU session modification request generated by the UE includes an identifier of a target TSN clock domain that needs to be deactivated, and then after the PDU session modification request is transmitted to the SMF, the SMF may be caused to instruct a user plane function entity to stop forwarding TSN time synchronization data of the target TSN clock domain to the UE transmitting the PDU session modification request.

In an embodiment of this application, a PDU session established by the UE may support a time synchronization operation of a plurality of TSN clock domains. In one embodiment, when a to-be-deactivated target TSN clock domain, network slice information, and a data network name that are included in the first information are respectively matched with a TSN clock domain, network slice information, and a data network name of the PDU session established by the UE and the to-be-deactivated target TSN clock domain is not a last TSN clock domain in the PDU session, the UE initiates a PDU session modification procedure; or when a to-be-deactivated target TSN clock domain, network slice information, and a data network name that are included in the first information are respectively matched with a TSN clock domain, network slice information, and a data network name of the PDU session established by the UE and the to-be-deactivated target TSN clock domain is a last TSN clock domain in the PDU session, the UE initiates a PDU session release procedure.

In an embodiment of this application, when the second field information indicates a deactivation operation, and the TSN activation time information in the first information instructs the UE to perform a TSN time synchronization operation after a predetermined time after receiving the PDU session release instruction or PDU session modification instruction, the UE initiates, when a time at which the UE receives the PDU session release instruction or PDU session modification instruction has not reached the predetermined time and the UE registers a new AMF or a new AMF is selected for the UE in a network switching procedure, the PDU session release procedure or PDU session modification procedure based on the new AMF after the predetermined time after receiving the PDU session release instruction or PDU session modification instruction.

When the second field information indicates a deactivation operation, and the TSN activation time information in the first information instructs the UE to perform a TSN time synchronization operation at a designated time point, the UE initiates, when the current time has not reached the designated time point and the UE registers a new AMF or a new AMF is selected for the UE in a network switching procedure, the PDU session release procedure or PDU session modification procedure based on the new AMF when the current time reaches the designated time point. That is, the registering, by the UE, a new AMF or selecting a new AMF for the UE during network switching does not affect the UE in performing the TSN time synchronization operation.

The technical solutions of the embodiments of this application are described respectively from the perspectives of the NEF, the UDM, the AMF, and the UE in the foregoing embodiments. The implementation details of the technical solutions in the embodiments of this application are described below in detail from the perspective of interaction among entities with reference to FIG. 8 to FIG. 15.

Figure 8:
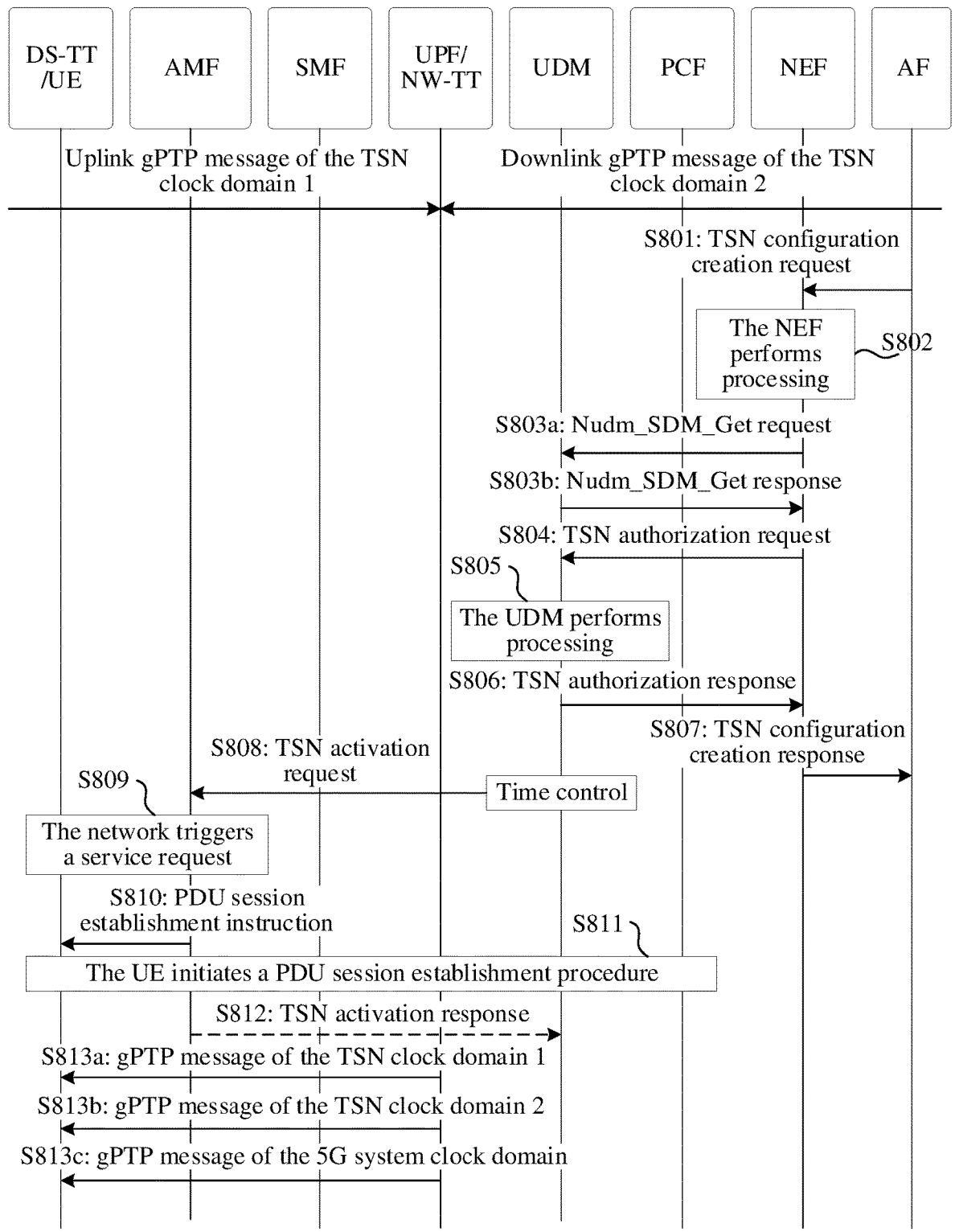
FIG. 8 is a flowchart of a UDM performing control to perform a TSN time synchronization activation operation according to an embodiment of this application.

In this embodiment of this application, the UDM, the AMF, and the UE may each control the occasion on which the UE performs the TSN time synchronization operation. Detailed descriptions are made below one by one:

1. An embodiment in which the UDM controls the occasion of performing the TSN time synchronization operation (divided into an activation procedure and a deactivation procedure):

As shown in FIG. 8, a procedure in which a UDM performs control to perform a TSN time synchronization activation operation according to an embodiment of this application includes the following steps:

Step S801. An AF transmits a TSN configuration creation request to an NEF. Before this step, a master clock of a TSN domain 1 may transmit an uplink gPTP message of the TSN clock domain 1 to a UPF/NW-TT through a UE (the UE is not the DS-TT/UE shown in FIG. 8), a master clock of a TSN field 2 may transmit a downlink gPTP message of the TSN clock domain 2 to the UPF/NW-TT through a terminal device (for example, another UE), and these messages are respectively used for performing TSN time synchronization operations of different TSN time domains.

In an embodiment of this application, for an example procedure of step S801, reference may be made to step 1 in chapter 6.8.3.1 "procedure for AF Requested the TSN Synchronization Activation" in 3GPP protocol TS23.700-20V0.3.0. The TSN configuration creation request in this embodiment of this application includes a Target ID, a TSN Activation Time, a TSN Domain ID, UL or DL TSN Synchronization, an Activation/Deactivation Indicator, an S-NSSAI, and a DNN. Because the embodiment shown in FIG. 8 is the TSN time synchronization activation operation, a value of the Activation/Deactivation Indicator is Activation.

The Target ID refers to a particular UE, or a group of UEs. When the Target ID refers to a particular UE, the Target ID is usually an SUPI, an IMSI, a GPSI, or another external application identifier. When the Target ID refers to a group of UEs, the Target ID is usually an External Group ID. The TSN Activation Time is used for indicating whether to immediately perform the TSN time synchronization activation (or deactivation) operation, or perform the TSN time synchronization activation (or deactivation) operation after X seconds, or perform the TSN time synchronization activation (or deactivation) operation at a designated time point.

Step S802. The NEF performs processing. In an embodiment of this application, for an example procedure of step S802, reference may be made to step 2 in chapter 6.8.3.1 "procedure for AF Requested the TSN Synchronization Activation" in 3GPP protocol TS23.700-20V0.3.0.

Step S803a. The NEF transmits a Nudm_SDM_Get request to a UDM.

In an embodiment of this application, the Nudm_SDM_Get request may include the following parameters: Identifier Translation, a Target ID and, an AF Identifier.

Step S803b. The UDM transmits a Nudm_SDM_Get response to the NEF.

In an embodiment of this application, the Nudm_SDM_Get response may include the following parameters: an SUPI and an optional MSISDN (Mobile Station International Integrated Service Digital Network Number).

As described above, the Target ID may refer to a group of UEs. When the Target ID refers to a group of UEs, the Target ID is usually an External Group ID, and then a reply of step S803b is an SUPI list and an optional MSISDN list. In one embodiment, in the following steps S804 to S813, a similar operation needs to be performed on each SUPI (that is, each UE) in the list.

Step S804. The NEF transmits a TSN authorization request to the UDM. The TSN authorization request may include related parameters in the TSN configuration creation request, such as, the Target ID, the TSN Activation Time, the TSN Domain ID, the UL or DL TSN Synchronization, the Activation (indicating an activation operation), the S-NSSAI, and the DNN.

Step S805. The UDM performs processing.

In an embodiment of this application, after receiving the TSN authorization request, the UDM may determine whether to allow the NEF to request to add or modify subscription data of a UE; if yes, the UE subscription data may be added. The UE subscription data may include a TSN time domain identifier, first field information used for indicating uplink TSN synchronization or downlink TSN synchronization, second field information used for indicating an activation operation or a deactivation operation, network slice information, and a data network name. Then, the UDM may perform TSN activation and deactivation operations on the target UE based on information about this UE subscription data.

Step S806. The UDM returns a TSN authorization response to the NEF.

Step S807. The NEF returns a TSN configuration creation response to the AF.

In an embodiment of this application, for an example of step S804 to step S807, reference may be made to step 3 to step 6 in chapter 6.8.3.1 "procedure for AF Requested the TSN Synchronization Activation" in 3GPP protocol TS23.700-20V0.3.0.

Step S808. The UDM transmits a TSN activation request to an AMF.

In an embodiment of this application, the TSN activation request includes related parameters in the TSN authorization request, such as, the Target ID, the TSN Domain ID, the UL or DL TSN Synchronization, the Activation (indicating an activation operation), the S-NSSAI, and the DNN.

When the TSN Activation Time included in the TSN authorization request indicates that the TSN time synchronization operation is performed immediately, the UDM immediately transmits the TSN activation request to an AMF that an SUPI of a UE (only a single UE when the Target ID in step S801 refers to a single UE; or each UE when the Target ID in step S801 refers to a group identifier) registers with the UDM, where this TSN activation request may include the TSN Domain ID, the UL or DL TSN Synchronization, the Activation, the S-NSSAI, the DNN, and the like. In one embodiment, step S808, step S806, and step S807 may not be in sequential order.

When the TSN Activation Time indicates that the TSN time synchronization operation is performed after X seconds, the UDM transmits the TSN activation request after X seconds after receiving the TSN authorization request.

When the TSN Activation Time indicates that the TSN time synchronization operation is performed at a particular time point, the UDM transmits the TSN activation request at this particular time (when the particular time point is earlier than the current time point, the UDM immediately transmits the TSN activation request).

One UE may register a plurality of AMFs (usually a maximum of two) with the UDM. In one embodiment, the UDM may first transmit a message to the AMF whose RAT (Radio Access Technology) is 3GPP. When in step S811, a PDU session registration message transmitted by the SMF for the UE has not been received, or in step S812, the TSN activation response fed back by the AMF to the UDM indicates unsuccessful activation (the AMF may transmit, when determining that the PDU session is not established successfully, the TSN activation response indicating unsuccessful activation), a message may be transmitted again to the corresponding AMF whose RAT is Non-3GPP. Certainly, the UDM may simultaneously transmit the TSN activation request to the plurality of AMFs, and then when a TSN activation response fed back by each of the plurality of AMFs indicates unsuccessful activation or a PDU session registration message fed back by an SMF for the UE is not received in a set time, transmit the TSN activation request to the plurality of AMFs again.

Step S809. The AMF initiates a network triggered service request.

In an embodiment of this application, when the UE is in a CM-IDLE state, the AMF may initiate a network triggered service request procedure, to establish signaling connection between the UE and the AMF. When the UE is in a CM-CONNECTED state, the step does not need to be performed.

Step S810. The AMF transmits a PDU session establishment instruction to the UE.

In an embodiment of this application, the AMF may transmit an NAS message to the UE, to request the UE to establish a PDU session. The PDU session establishment instruction may include: the TSN Domain ID, the UL or DL TSN Synchronization, the Activation, the S-NSSAI, and the DNN.

Step S811. The UE initiates a PDU session establishment procedure.

In an embodiment of this application, for the PDU session establishment procedure initiated by the UE, reference may be made to chapter 4.3.2 of 3GPP protocol TS23.502. The PDU session establishment request in an N1 SM container initiated by the UE may include the following parameters: the TSN Domain ID, the UL or DL TSN Synchronization, the Activation, the S-NSSAI, and the DNN. The PDU session establishment request is transferred to the SMF through the AMF, and meanwhile the N1 message transmitted to the AMF includes the TSN Domain ID, the S-NSSAI, and the DNN. Then, in the PDU session establishment procedure, when registering with the UDM, the SMF provides the S-NSSAI, the DNN, and the TSN Domain ID, and therefore the UDM knows, by comparing the S-NSSAI, the DNN, and the TSN Domain ID, that the UE has successfully been triggered to perform the TSN activation procedure.

Step S812. The AMF feeds back a TSN activation response to the UDM. The step may be an optional step in some embodiments. When the step exists, the AMF may indicate, by feeding back the TSN activation response to the UDM, whether the TSN time synchronization is activated successfully.

Step S813a. When the TSN Domain ID is a TSN clock domain 1, the UPF/NW-TT transmits a gPTP message of the TSN clock domain 1 to the UE. Step S813b. When the TSN Domain ID is a TSN clock domain 2, the UPF/NW-TT transmits a gPTP message of the TSN clock domain 2 to the UE. Step S813c. When the TSN Domain ID indicates a 5G Time Domain, the UPF/NW-TT transmits a gPTP message of the 5G system clock domain to the UE.

In an embodiment of this application, for step S813a to step S813c, reference may be made to 3GPP protocol TR23.700-020. After the TSN time synchronization is activated successfully, the UPF/NW-TT forwards TSN synchronization related data in different directions according to the TSN Domain, to help the UE perform the TSN time synchronization processing.

Figure 9:
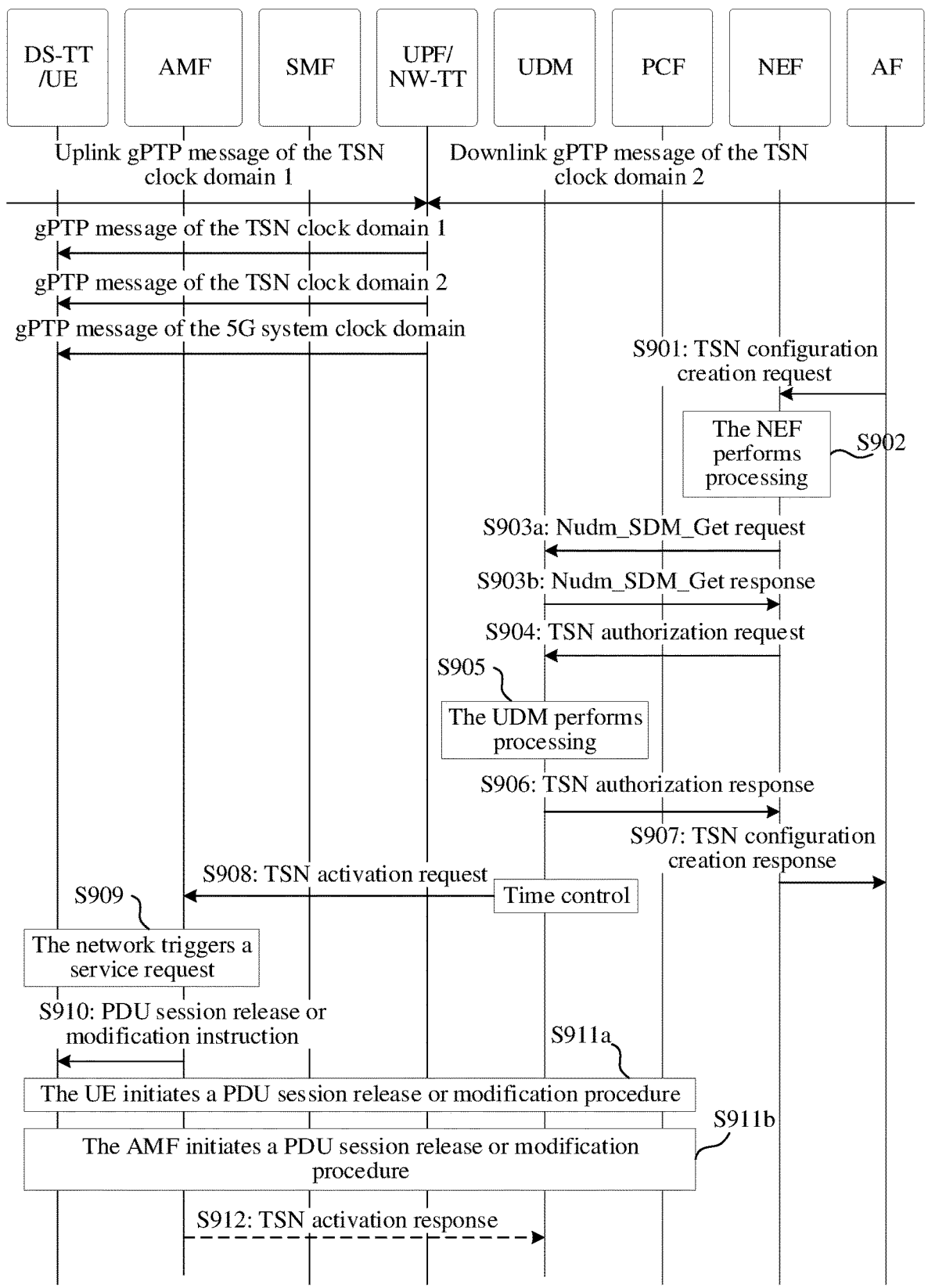
FIG. 9 is a flowchart of a UDM performing control to perform a TSN time synchronization deactivation operation according to an embodiment of this application.

As shown in FIG. 9, a procedure in which a UDM performs control to perform a TSN time synchronization deactivation operation according to an embodiment of this application includes the following steps:

Step S901. An AF transmits a TSN configuration creation request to an NEF. Before this step, a master clock of a TSN domain 1 may transmit an uplink gPTP message of the TSN clock domain 1 to a UPF/NW-TT through a UE (the UE is not the DS-TT/UE shown in FIG. 9); a master clock of a TSN field 2 may transmit a downlink gPTP message of the TSN clock domain 2 to the UPF/NW-TT through a terminal device (for example, another UE). The UPF/NW-TT transmits a gPTP message of the TSN clock domain 1 to the UE. The UPF/NW-TT transmits a gPTP message of the TSN clock domain 2 to the UE. When synchronization of a 5G time domain is performed, the UPF/NW-TT transmits a gPTP message of the 5G system clock domain to the UE. These messages are respectively used for performing TSN time synchronization operations of different TSN time domains.

In an embodiment of this application, an embodiment of step S901 is similar to that of step S801 in FIG. 8, but the embodiment shown in FIG. 9 is the TSN time synchronization deactivation operation, and therefore a value of the Activation/Deactivation Indicator is Deactivation.

Step S902. The NEF performs processing. One embodiment of this step is similar to that of step S802 in FIG. 8.

Step S903a. The NEF transmits a Nudm_SDM_Get request to a UDM. A processing procedure of this step is similar to that of step S803a shown in FIG. 8.

Step S903b. The UDM transmits a Nudm_SDM_Get response to the NEF. A processing procedure of this step is similar to that of step S803b shown in FIG. 8.

Similar to the foregoing embodiments, the Target ID may refer to a group of UEs. When the Target ID refers to a group of UEs, the Target ID is usually an External Group ID, and then a reply of step S903b is an SUPI list and an optional MSISDN list. In one embodiment, in the following steps S904 to S912, a similar operation needs to be performed on each SUPI (that is, each UE) in the list.

Step S904. The NEF transmits a TSN authorization request to the UDM. The TSN authorization request may include related parameters in the TSN configuration creation request, such as, the Target ID, the TSN Activation Time, the TSN Domain ID, the UL or DL TSN Synchronization, the Deactivation (indicating a deactivation operation), the S-NSSAI, and the DNN.

Step S905. The UDM performs processing. A processing procedure of this step is similar to that of step S805 shown in FIG. 8.

Step S906. The UDM returns a TSN authorization response to the NEF.

Step S907. The NEF returns a TSN configuration creation response to the AF.

In one embodiment of step S904 to step S907, reference may be made to step 3 to step 6 in chapter 6.8.3.1 "procedure for AF Requested the TSN Synchronization Activation" in 3GPP protocol TS23.700-20V0.3.0.

Step S908. The UDM transmits a TSN activation request to an AMF.

In an embodiment of this application, the TSN activation request may include related parameters in the TSN authorization request, such as, the Target ID, the TSN Domain ID, the UL or DL TSN Synchronization, the Deactivation (indicating a deactivation operation), the S-NSSAI, and the DNN.

When the TSN Activation Time included in the TSN authorization request received by the UDM indicates that the TSN time synchronization operation is performed immediately, the UDM immediately transmits the TSN activation request to an AMF that an SUPI of a UE (only a single UE when the Target ID in step S901 refers to a single UE; or each UE when the Target ID in step S901 refers to a group identifier) registers with the UDM, where this TSN activation request includes the TSN Domain ID, the UL or DL TSN Synchronization, the Deactivation, the S-NSSAI, the DNN, and the like. In one embodiment, step S908, step S906, and step S907 are not in sequential order.

When the TSN Activation Time indicates that the TSN time synchronization operation is performed after X seconds, the UDM transmits the TSN activation request after X seconds after receiving the TSN authorization request.

When the TSN Activation Time indicates that the TSN time synchronization operation is performed at a particular time point, the UDM transmits the TSN activation request at this particular time (when the particular time point is earlier than the current time point, the UDM immediately transmits the TSN activation request).

One UE may register a plurality of AMFs (usually a maximum of two) with the UDM. In one embodiment, the UDM may first transmit the TSN activation request to the AMF whose RAT is 3GPP. When in step S911a or step S911b, a PDU session update context message transmitted by the SMF for the UE has not been received, or in step S912, the TSN activation response fed back by the AMF to the UDM indicates unsuccessful deactivation (the AMF may transmit, when determining that the PDU session is not released or modified successfully, the TSN activation response indicating unsuccessful deactivation), a TSN activation request may be transmitted again to the corresponding AMF whose RAT is Non-3GPP. Certainly, the UDM may simultaneously transmit the TSN activation request to the plurality of AMFs, and then when a TSN activation response fed back by each of the plurality of AMFs indicates unsuccessful deactivation or a PDU session update context message fed back by an SMF for the UE is not received in a set time, transmit the TSN activation request to the plurality of AMFs again.

Step S909. The AMF initiates a network triggered service request.

In an embodiment of this application, when the UE is in a CM-IDLE state, the AMF may initiate a network triggered service request procedure, to establish signaling connection between the UE and the AMF. When the UE is in a CM-CONNECTED state, the step does not need to be performed.

When the AMF decides to let the UE initiate the PDU session release or modification procedure, steps S910 and S911a are performed, but step S911b is not performed. When the AMF decides to let the AMF itself initiate the PDU session release or modification procedure, step S911b is performed, but steps S910 and S911a are not performed.

Step S910. The AMF transmits a PDU session release or modification instruction to the UE.

In an embodiment of this application, the AMF may transmit an NAS message to the UE, to request the UE to release or modify a PDU session. The PDU session release or modification instruction includes: the TSN Domain ID, the UL or DL TSN Synchronization, the Deactivation, the S-NSSAI, and the DNN.

Step S911a. The UE initiates a PDU session release or modification procedure.

In an embodiment of this application, for the PDU session release procedure initiated by the UE, reference may be made to chapter 4.3.4.2 of 3GPP protocol TS23.502; and for the PDU session modification procedure initiated by the UE, reference may be made to chapter 4.3.2.2 of 3GPP protocol TS23.502.

A same PDU session may support different TSN Domains such as TSN Domains 1/2/3. Therefore, when a last TSN Domain is deleted, this PDU session needs to be deleted, and in one embodiment, the UE initiates the PDU session release procedure; and when only one of the TSN Domains is deleted, other TSN Domains exist, and in one embodiment, the UE initiates the PDU session modification procedure.

In an embodiment of this application, after a PDU session is released, the SMF releases functions of the UPF and the NW-TT related to the PDU session, that is, the UPF/NW-TT stops forwarding the TSN synchronization data of all the TSN Domains to the UE.

In an embodiment of this application, a message of PDU Session Modification initiated by the UE (N1 SM container (PDU Session Modification Request (Deactivation of TSN Domain ID))) includes a new parameter, that is, Deactivation of TSN Domain ID. After receiving this Deactivation of TSN Domain ID, the SMF instructs the UPF/the NW-TT not to forward the TSN synchronization data of this TSN Domain to this UE again.

In step S911a, in the PDU session deleting or PDU session modification procedure, the SMF registers with the UDM, to instruct to delete the TSN Domain ID corresponding to the S-NSSAI and the DNN, and therefore the UDM knows, by comparing the S-NSSAI, the DNN, and the TSN Domain ID, that the UE has successfully been triggered to perform the TSN deactivation procedure.

Step S911b. The AMF initiates a PDU session release or modification procedure. When the AMF decides to let the AMF itself initiate the PDU session release or modification procedure, steps S910 and S911a shown in FIG. 9 do not need to be performed. When the AMF decides to let the UE initiate the PDU session release or modification procedure, steps S910 and S911a shown in FIG. 9 are performed, while step S911b shown in the figure is not performed.

In an embodiment of this application, when the AMF initiates the PDU session release or modification procedure, a Nsmf_PDUSession_UpdateSMContext (PDU session-update session management context) message transmitted by the AMF to the SMF includes a new parameter, that is, deactivation of TSN Domain ID. After receiving this message of Deactivation of TSN Domain ID, the SMF instructs the UPF/the NW-TT not to forward the TSN synchronization data of this TSN Domain to this UE again.

In step S911b, in the PDU session deleting or PDU session modification procedure, the SMF registers with the UDM, to instruct to delete the TSN Domain ID corresponding to the S-NSSAI and the DNN, and therefore the UDM knows, by comparing the S-NSSAI, the DNN, and the TSN Domain ID, that the UE has successfully been triggered to perform the TSN deactivation procedure.

Step S912. The AMF feeds back a TSN activation response to the UDM. This may be optional in some embodiments. When the step exists, the AMF may indicate, by feeding back the TSN activation response to the UDM, whether the TSN time synchronization is deactivated successfully.

Figure 10:
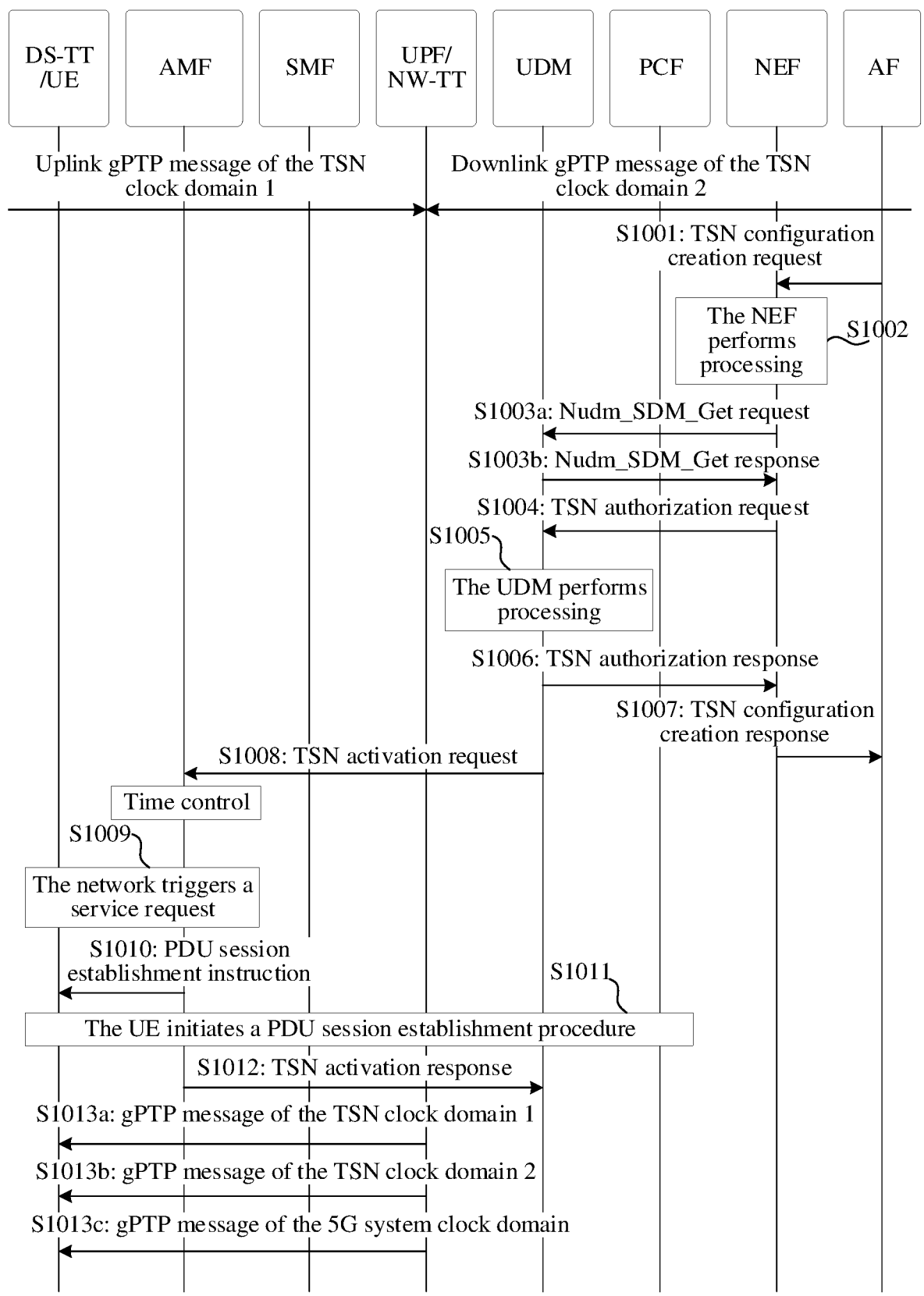
FIG. 10 is a flowchart of an AMF performing control to perform a TSN time synchronization activation operation according to an embodiment of this application.

2. An embodiment in which the AMF controls the occasion of performing the TSN time synchronization operation (divided into an activation procedure and a deactivation procedure):

As shown in FIG. 10, a procedure in which an AMF performs control to perform a TSN time synchronization activation operation according to an embodiment of this application includes the following steps:

Step S1001. An AF transmits a TSN configuration creation request to an NEF. Before this step, a master clock of a TSN domain 1 may transmit an uplink gPTP message of the TSN clock domain 1 to a UPF/NW-TT through a UE (the UE is not the DS-TT/UE shown in FIG. 10), a master clock of a TSN field 2 may transmit a downlink gPTP message of the TSN clock domain 2 to the UPF/NW-TT through a terminal device (for example, another UE), and these messages are respectively used for performing TSN time synchronization operations of different TSN time domains.

In one embodiment of step S1001 is similar to that of step S801 in FIG. 8. Because the embodiment shown in FIG. 10 is the TSN time synchronization activation operation, a value of the Activation/Deactivation Indicator is Activation.

Step S1002. The NEF performs processing. One embodiment of this step is similar to that of step S802 in FIG. 8.

Step S1003a. The NEF transmits a Nudm_SDM_Get request to a UDM. One embodiment of this step is similar to that of step S803a in FIG. 8.

Step S1003b. The UDM transmits a Nudm_SDM_Get response to the NEF. One embodiment of this step is similar to that of step S803b in FIG. 8.

Similar to the foregoing embodiments, the Target ID may refer to a group of UEs. When the Target ID refers to a group of UEs, the Target ID is usually an External Group ID, and then a reply of step S1003b is an SUPI list and an optional MSISDN list. In one embodiment, in the following steps S1004 to S1013, a similar operation needs to be performed on each SUPI (that is, each UE) in the list.

Step S1004. The NEF transmits a TSN authorization request to the UDM. The TSN authorization request includes related parameters in the TSN configuration creation request, such as, the Target ID, the TSN Activation Time, the TSN Domain ID, the UL or DL TSN Synchronization, the Activation (indicating an activation operation), the S-NSSAI, and the DNN.

Step S1005. The UDM performs processing. One embodiment of this step is similar to that of step S805 in FIG. 8.

Step S1006. The UDM returns a TSN authorization response to the NEF.

Step S1007. The NEF returns a TSN configuration creation response to the AF.

In one embodiment of step S1004 to step S1007, reference may be made to step 3 to step 6 in chapter 6.8.3.1 "procedure for AF Requested the TSN Synchronization Activation" in 3GPP protocol TS23.700-20V0.3.0.

Step S1008. The UDM transmits a TSN activation request to an AMF that an SUPI of a UE (only a single UE when the Target ID in step S1001 refers to a single UE; or each UE when the Target ID in step S1001 refers to a group identifier) registers with the UDM. The TSN activation request includes related parameters in the TSN authorization request, such as, the Target ID, the TSN Activation Time, the TSN Domain ID, the UL or DL TSN Synchronization, the Activation (indicating an activation operation), the S-NSSAI, and the DNN. Step S1008, step S1006, and step S1007 are not in sequential order.

One UE may register a plurality of AMFs (usually a maximum of two) with the UDM. In one embodiment, the UDM may first transmit a message to the AMF whose RAT is 3GPP. When in step S1011, a PDU session registration message transmitted by the SMF for the UE has not been received, or in step S1012, the TSN activation response fed back by the AMF to the UDM indicates unsuccessful activation (the AMF may transmit, when determining that the PDU session is not established successfully, the TSN activation response indicating unsuccessful activation), a message may be transmitted again to the corresponding AMF whose RAT is Non-3GPP. Certainly, the UDM may simultaneously transmit the TSN activation request to the plurality of AMFs, and then when a TSN activation response fed back by each of the plurality of AMFs indicates unsuccessful activation or a PDU session registration message fed back by an SMF for the UE is not received in a set time, transmit the TSN activation request to the plurality of AMFs again.

Step S1009. The AMF initiates a network triggered service request. One embodiment of this step is similar to that of step S809 in FIG. 8.

Step S1010. The AMF transmits a PDU session establishment instruction to the UE. The PDU session establishment instruction may include: the TSN Domain ID, the UL or DL TSN Synchronization, the Activation, the S-NSSAI, and the DNN.

In an embodiment of this application, when the TSN Activation Time in the TSN activation request received by the AMF indicates that the TSN time synchronization operation is performed immediately, the AMF immediately performs step S1009 and step S1010. When the TSN Activation Time indicates that the TSN time synchronization operation is performed after X seconds, the AMF performs step S1009 and step S1010 after X seconds after receiving the TSN activation request. When the TSN Activation Time indicates that the TSN time synchronization operation is performed at a particular time point, the AMF performs step S1009 and step S1010 at this particular time (when the particular time point is earlier than the current time point, the AMF immediately performs step S1009 and step S1010).

When the UE is in a CM-IDLE state, the AMF may initiate a network triggered service request procedure, to establish signaling connection between the UE and the AMF. When the UE is in a CM-CONNECTED state, step S1009 does not need to be performed.

In an embodiment of this application, when the TSN Activation Time indicates that activation is performed after X seconds or indicates that the TSN time synchronization operation is performed at a particular time point, but when the activation time has not been reached, if the UE moves to a new AMF, the old AMF needs to transfer the trigger condition to the new AMF, for example, how much time is left before activation is performed, or what is the particular time point. In this way, the new AMF may continue to perform step S1009 and subsequent steps.

Figure 14:
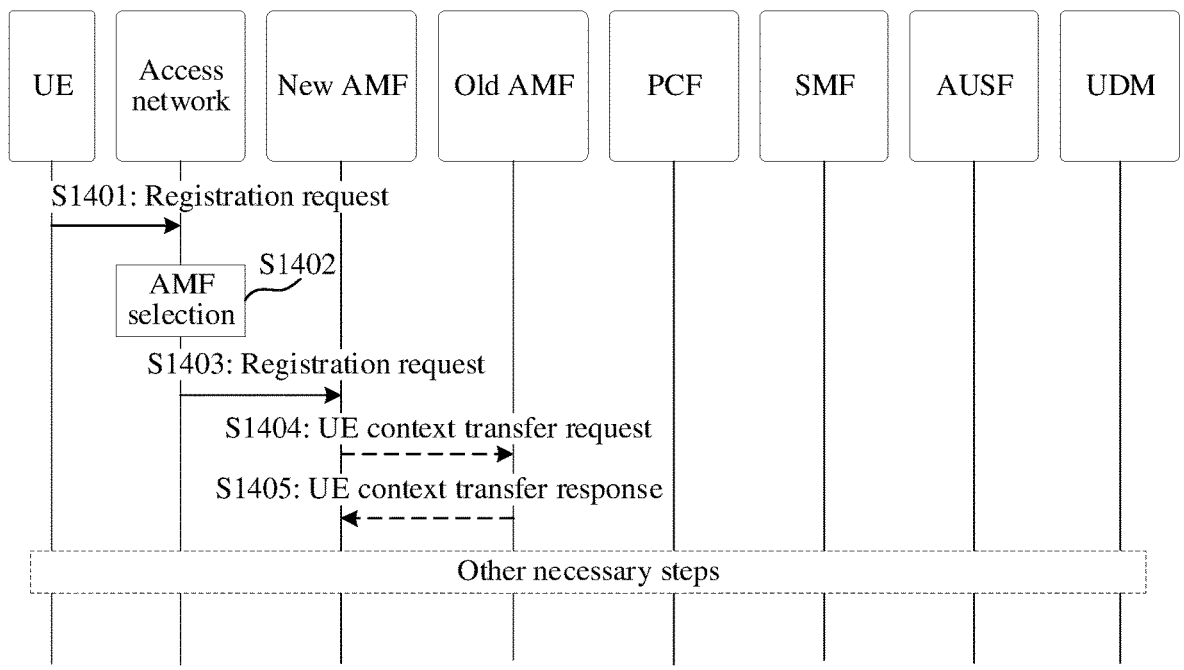
FIG. 14 is a flowchart of an old AMF transmitting context information to a new AMF in a procedure in which a UE registers the new AMF.

FIG. 14 is a flowchart of an old AMF transmitting context information to a new AMF in a procedure in which a UE registers the new AMF, which may include the following steps:

Step S1401. A UE initiates a registration request to an access network.

Step S1402. The access network selects an AMF.

Step S1403. The access network initiates a registration request to the new AMF.

Step S1404. The new AMF transmits a UE context transfer request (Namf_Communication_UEContextTransfer) to an old AMF.

Step S1405. The old AMF returns a UE context transfer response (Namf_Communication_UEContextTransfer response) to the new AMF.

FIG. 14 further includes some additional steps in some embodiments. For details, reference may be made to chapter 4.2.2.2 Registration procedures in 3GPP protocol TS23.502. The old AMF may transmit a trigger condition to the new AMF by returning the UE context transfer response to the new AMF in step S1405. The trigger condition may include: a TSN Domain ID, UL or DL TSN Synchronization, Activation, an S-NSSAI, a DNN, and a TSN Activation Time.

When the activation time is after X seconds, the time for transmission to the new AMF is not the time of initially receiving the TSN activation request, but a remaining time (that is, the time in the TSN activation request minus the elapsed time (a time that has elapsed after the TSN activation request is received by the old AMF)).

Figure 15:
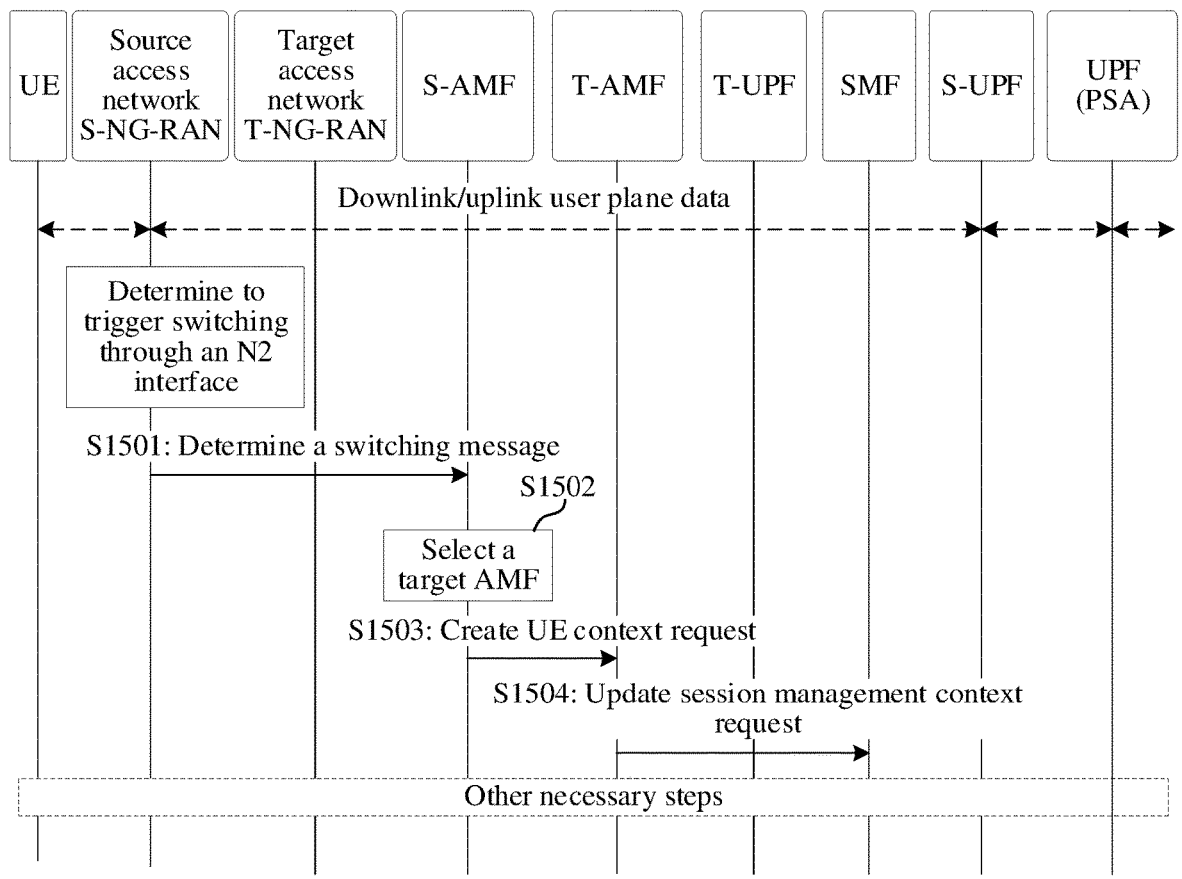
FIG. 15 is a flowchart of an old AMF transmitting context information to a new AMF during network switching.

FIG. 15 is a flowchart of an old AMF transmitting context information to a new AMF during network switching, which includes the following steps:

Step S1501. A source access network S-NG-RAN (that is, Source-NG-RAN) transmits, after determining to trigger switching through an N2 interface, a determined switching message to an S-AMF (Source-AMF).

Step S1502. The S-AMF selects a target AMF.

Step S1503. The S-AMF transmits a create UE context request (Namf_Communication_CreateUEContext request) to a T-AMF (Target-AMF).

Step S1504. The T-AMF transmits an update session management context request (Namf_PDUSession_UpdateSMContext Request) to the SMF.

FIG. 15 further includes other steps in some embodiments. For details, reference may be made to chapter 4.9.1.3.2 Preparation phase in 3GPP protocol TS23.502. The old AMF may transmit a trigger condition to the new AMF by transmitting the create UE context request to the new AMF in step S1503. The trigger condition includes: a TSN Domain ID, UL or DL TSN Synchronization, Activation, an S-NSSAI, a DNN, and a TSN Activation Time.

When the activation time is after X seconds, the time for transmission to the new AMF is not the time of initially receiving the TSN activation request, but a remaining time (that is, the time in the TSN activation request minus the elapsed time (a time that has elapsed after the TSN activation request is received by the old AMF)).

Referring back to FIG. 10, Step S1011 includes the UE initiates a PDU session establishment procedure. One embodiment of this step is similar to that of step S811 in FIG. 8.

Step S1012. The AMF feeds back a TSN activation response to the UDM. This may be optional in some embodiments. When the step exists, the AMF may indicate, by feeding back the TSN activation response to the UDM, whether the TSN time synchronization is activated successfully.

Step S1013a. When the TSN Domain ID is a TSN clock domain 1, the UPF/NW-TT transmits a gPTP message of the TSN clock domain 1 to the UE. Step S1013b. When the TSN Domain ID is a TSN clock domain 2, the UPF/NW-TT transmits a gPTP message of the TSN clock domain 2 to the UE. Step S1013c. When the TSN Domain ID indicates a 5G Time Domain, the UPF/NW-TT transmits a gPTP message of the 5G system clock domain to the UE.

In an embodiment of this application, for step S1013a to step S1013c, reference may be made to 3GPP protocol TR23.700-020. After the TSN time synchronization is activated successfully, the UPF/NW-TT forwards TSN synchronization related data in different directions according to the TSN Domain, to help the UE perform the TSN time synchronization processing.

Figure 11:
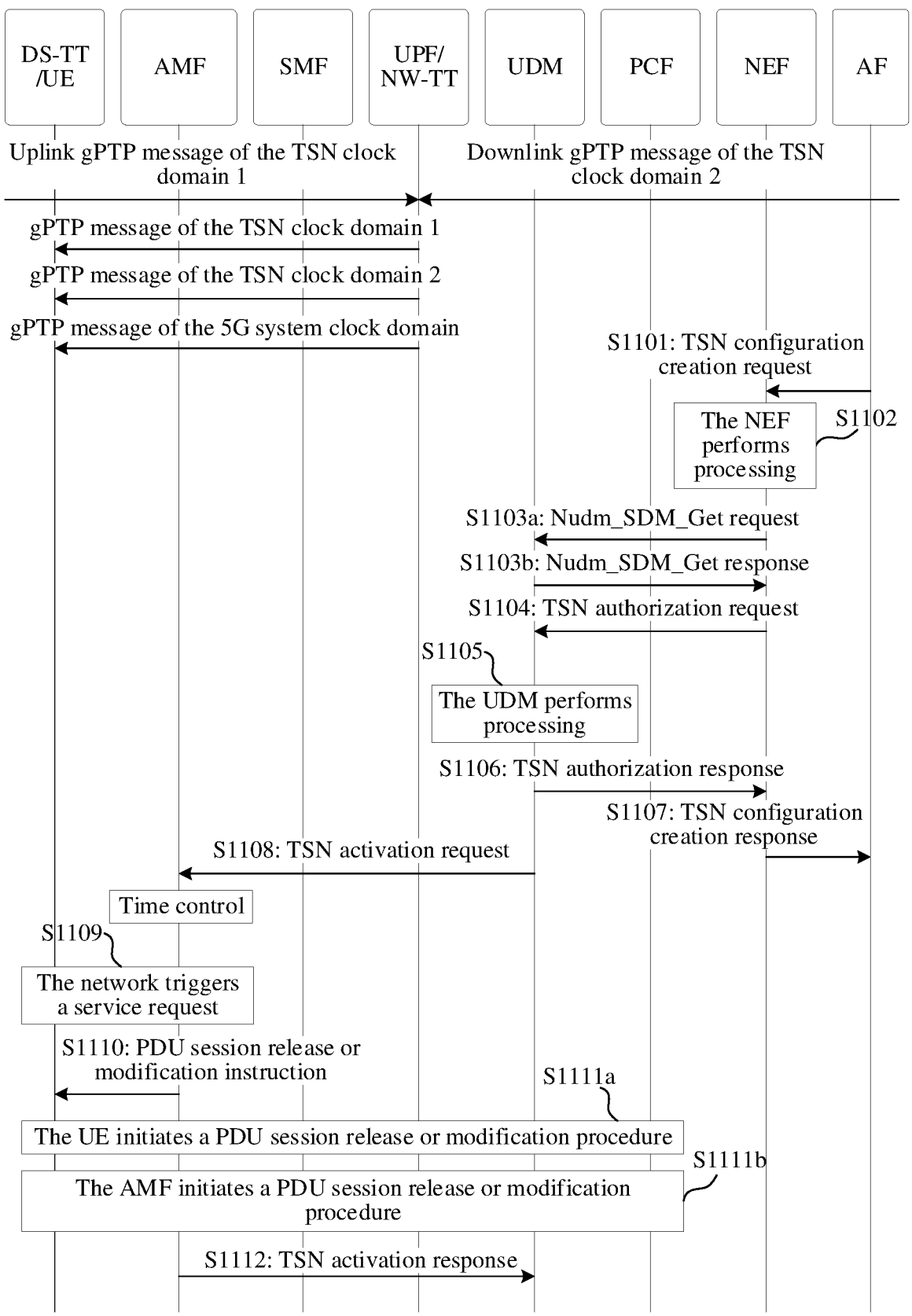
FIG. 11 is a flowchart of an AMF performing control to perform a TSN time synchronization deactivation operation according to an embodiment of this application.

As shown in FIG. 11, a procedure in which an AMF performs control to perform a TSN time synchronization deactivation operation according to an embodiment of this application includes the following steps:

Step S1101. An AF transmits a TSN configuration creation request to an NEF. Before this step, a master clock of a TSN domain 1 may transmit an uplink gPTP message of the TSN clock domain 1 to a UPF/NW-TT through a UE (the UE is not the DS-TT/UE shown in FIG. 11); a master clock of a TSN field 2 may transmit a downlink gPTP message of the TSN clock domain 2 to the UPF/NW-TT through a terminal device (for example, another UE). The UPF/NW-TT transmits a gPTP message of the TSN clock domain 1 to the UE. The UPF/NW-TT transmits a gPTP message of the TSN clock domain 2 to the UE. When synchronization of a 5G time domain is performed, the UPF/NW-TT transmits a gPTP message of the 5G system clock domain to the UE. These messages are respectively used for performing TSN time synchronization operations of different TSN time domains.

In one embodiment of step S1101 is similar to that of step S801 in FIG. 8, but the embodiment shown in FIG. 11 is the TSN time synchronization deactivation operation, and therefore a value of the Activation/Deactivation Indicator is Deactivation.

Step S1102. The NEF performs processing. One embodiment of this step is similar to that of step S802 in FIG. 8.

Step S1103a. The NEF transmits a Nudm_SDM_Get request to a UDM. A processing procedure of this step is similar to that of step S803a shown in FIG. 8.

Step S1103b. The UDM transmits a Nudm_SDM_Get response to the NEF. A processing procedure of this step is similar to that of step S803b shown in FIG. 8.

Similar to the foregoing embodiments, the Target ID may refer to a group of UEs. When the Target ID refers to a group of UEs, the Target ID is usually an External Group ID, and then a reply of step S1103b is an SUPI list and an optional MSISDN list. In one embodiment, in the following steps S1104 to S1112, a similar operation needs to be performed on each SUPI (that is, each UE) in the list.

Step S1104. The NEF transmits a TSN authorization request to the UDM. The TSN authorization request may include related parameters in the TSN configuration creation request, such as, the Target ID, the TSN Activation Time, the TSN Domain ID, the UL or DL TSN Synchronization, the Deactivation (indicating a deactivation operation), the S-NSSAI, and the DNN.

Step S1105. The UDM performs processing. A processing procedure of this step is similar to that of step S805 shown in FIG. 8.

Step S1106. The UDM returns a TSN authorization response to the NEF.

Step S1107. The NEF returns a TSN configuration creation response to the AF.

In one embodiment of step S1104 to step S1107, reference may be made to step 3 to step 6 in chapter 6.8.3.1 "procedure for AF Requested the TSN Synchronization Activation" in 3GPP protocol TS23.700-20V0.3.0.

Step S1108. The UDM transmits a TSN activation request to an AMF that an SUPI of a UE (only a single UE when the Target ID in step S1001 refers to a single UE; or each UE when the Target ID in step S1001 refers to a group identifier) registers with the UDM. The TSN activation request includes related parameters in the TSN authorization request, such as, the Target ID, the TSN Activation Time, the TSN Domain ID, the UL or DL TSN Synchronization, the Deactivation (indicating a deactivation operation), the S-NSSAI, and the DNN. Step S1008, step S1006, and step S1007 are not in sequential order.

One UE may register a plurality of AMFs (usually a maximum of two) with the UDM. In one embodiment, the UDM may first transmit the TSN activation request to the AMF whose RAT is 3GPP. When in step S1111a or step S1111b, a PDU session update context message transmitted by the SMF for the UE has not been received, or in step S1112, the TSN activation response fed back by the AMF to the UDM indicates unsuccessful deactivation (the AMF may transmit, when determining that the PDU session is not released or modified successfully, the TSN activation response indicating unsuccessful deactivation), a TSN activation request may be transmitted again to the corresponding AMF whose RAT is Non-3GPP. Certainly, the UDM may simultaneously transmit the TSN activation request to the plurality of AMFs, and then when a TSN activation response fed back by each of the plurality of AMFs indicates unsuccessful deactivation or a PDU session update context message fed back by an SMF for the UE is not received in a set time, transmit the TSN activation request to the plurality of AMFs again.

Step S1109. The AMF initiates a network triggered service request.

Step S1110. The AMF transmits a PDU session release or modification instruction to the UE. The PDU session release or modification instruction may include: the TSN Domain ID, the UL or DL TSN Synchronization, the Deactivation, the S-NSSAI, and the DNN.

In an embodiment of this application, when the TSN Activation Time in the TSN activation request received by the AMF indicates that the TSN time synchronization operation is performed immediately, the AMF immediately performs step S1009 and step S1010. When the TSN Activation Time indicates that the TSN time synchronization operation is performed after X seconds, the AMF performs step S1009 and step S1010 after X seconds after receiving the TSN activation request. When the TSN Activation Time indicates that the TSN time synchronization operation is performed at a particular time point, the AMF performs step S1009 and step S1010 at this particular time (when the particular time point is earlier than the current time point, the AMF immediately performs step S1009 and step S1010).

When the UE is in a CM-IDLE state, the AMF may initiate a network triggered service request procedure, to establish signaling connection between the UE and the AMF. When the UE is in a CM-CONNECTED state, step S1009 does not need to be performed.

In an embodiment of this application, when the TSN Activation Time indicates that deactivation is performed after X seconds or indicates that deactivation is performed at a particular time point, but when the deactivation time has not been reached, if the UE moves to a new AMF, the old AMF needs to transfer the trigger condition to the new AMF, for example, how much time is left before deactivation is performed, or what is the particular time point. In this way, the new AMF may continue to perform step S1109 and subsequent steps. For one embodiment, reference may be made to FIG. 14 and FIG. 15, but for the registration procedure shown in FIG. 14, the trigger condition in the UE context transfer response returned by the old AMF to the new AMF in step S1405 may include: a TSN Domain ID, UL or DL TSN Synchronization, Deactivation, an S-NSSAI, a DNN, and a TSN Activation Time. For the switching procedure shown in FIG. 15, the trigger condition in the create UE context request transmitted by the old AMF to the new AMF in step S1503 may include: a TSN Domain ID, UL or DL TSN Synchronization, Deactivation, an S-NSSAI, a DNN, and a TSN Activation Time.

Step S1111a. The UE initiates a PDU session release or modification procedure. A processing procedure of this step is similar to that of step S911a shown in FIG. 9.

Step S1111b. The AMF initiates a PDU session release or modification procedure. A processing procedure of this step is similar to that of step S911b shown in FIG. 9. When the AMF decides to let the AMF itself initiate the PDU session release or modification procedure, steps S1110 and S1111a shown in FIG. 11 do not need to be performed. When the AMF decides to let the UE initiate the PDU session release or modification procedure, steps S1110 and S1111a are performed, but step S1111b is not performed.

In an embodiment of this application, when the AMF initiates the PDU session release or modification procedure, a Nsmf_PDUSession_UpdateSMContext (PDU session-update session management context) message transmitted by the AMF to the SMF includes a new parameter, that is, deactivation of TSN Domain ID. After receiving this message of Deactivation of TSN Domain ID, the SMF instructs the UPF/the NW-TT not to forward the TSN synchronization data of this TSN Domain to this UE again. Step S1112. The AMF feeds back a TSN activation response to the UDM. This may be optional in some embodiments. When the step exists, the AMF may indicate, by feeding back the TSN activation response to the UDM, whether the TSN time synchronization is deactivated successfully.

Figure 12:
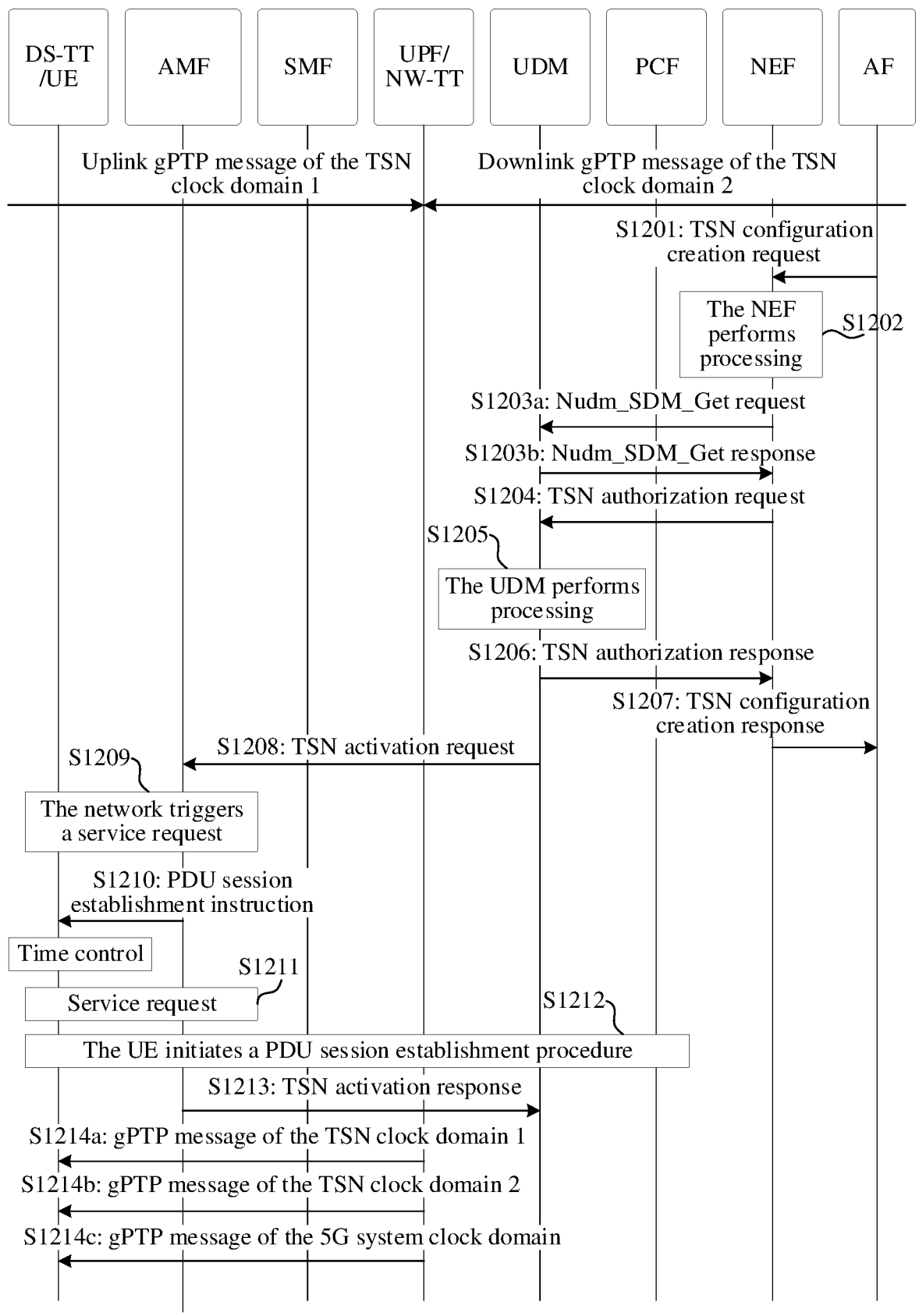
FIG. 12 is a flowchart of a UE performing control to perform a TSN time synchronization activation operation according to an embodiment of this application.

3. An embodiment in which the UE controls the occasion of performing the TSN time synchronization operation (divided into an activation procedure and a deactivation procedure):

As shown in FIG. 12, a procedure in which a UE performs control to perform a TSN time synchronization activation operation according to an embodiment of this application includes the following steps:

Step S1201. An AF transmits a TSN configuration creation request to an NEF. Before this step, a master clock of a TSN domain 1 may transmit an uplink gPTP message of the TSN clock domain 1 to a UPF/NW-TT through a UE (the UE is not the DS-TT/UE shown in FIG. 12), a master clock of a TSN field 2 may transmit a downlink gPTP message of the TSN clock domain 2 to the UPF/NW-TT through a terminal device (for example, another UE), and these messages are respectively used for performing TSN time synchronization operations of different TSN time domains.

In one embodiment, step S1201 is similar to that of step S801 in FIG. 8. Because the embodiment shown in FIG. 12 is the TSN time synchronization activation operation, a value of the Activation/Deactivation Indicator is Activation.

Step S1202. The NEF performs processing. One embodiment of this step is similar to that of step S802 in FIG. 8.

Step S1203a. The NEF transmits a Nudm_SDM_Get request to a UDM. One embodiment of this step is similar to that of step S803a in FIG. 8.

Step S1203b. The UDM transmits a Nudm_SDM_Get response to the NEF. One embodiment of this step is similar to that of step S803b in FIG. 8.

Similar to the foregoing embodiments, the Target ID may refer to a group of UEs. When the Target ID refers to a group of UEs, the Target ID is usually an External Group ID, and then a reply of step S1203b is an SUPI list and an optional MSISDN list. In one embodiment, in the following steps S1204 to S1214, a similar operation needs to be performed on each SUPI (that is, each UE) in the list.

Step S1204. The NEF transmits a TSN authorization request to the UDM. The TSN authorization request may include related parameters in the TSN configuration creation request, such as, the Target ID, the TSN Activation Time, the TSN Domain ID, the UL or DL TSN Synchronization, the Activation (indicating an activation operation), the S-NSSAI, and the DNN.

Step S1205. The UDM performs processing. One embodiment of this step is similar to that of step S805 in FIG. 8.

Step S1206. The UDM returns a TSN authorization response to the NEF.

Step S1207. The NEF returns a TSN configuration creation response to the AF.

In one embodiment of step S1204 to step S1207, reference may be made to step 3 to step 6 in chapter 6.8.3.1 "procedure for AF Requested the TSN Synchronization Activation" in 3GPP protocol TS23.700-20V0.3.0.

Step S1208. The UDM transmits a TSN activation request to an AMF that an SUPI of a UE (only a single UE when the Target ID in step S1201 refers to a single UE; or each UE when the Target ID in step S1201 refers to a group identifier) registers with the UDM. The TSN activation request includes related parameters in the TSN authorization request, such as, the Target ID, the TSN Activation Time, the TSN Domain ID, the UL or DL TSN Synchronization, the Activation (indicating an activation operation), the S-NSSAI, and the DNN. Step S1208, step S1206, and step S1207 are not in sequential order.

One UE may register a plurality of AMFs (usually a maximum of two) with the UDM. In one embodiment, the UDM may first transmit a message to the AMF whose RAT is 3GPP. When in step S1211, a PDU session registration message transmitted by the SMF for the UE has not been received, or in step S1212, the TSN activation response fed back by the AMF to the UDM indicates unsuccessful activation (the AMF may transmit, when determining that the PDU session is not established successfully, the TSN activation response indicating unsuccessful activation), the UDM may transmit a message again to the corresponding AMF whose RAT is Non-3GPP. Certainly, the UDM may simultaneously transmit the TSN activation request to the plurality of AMFs, and then when a TSN activation response fed back by each of the plurality of AMFs indicates unsuccessful activation or a PDU session registration message fed back by an SMF for the UE is not received in a set time, transmit the TSN activation request to the plurality of AMFs again.

Step S1209. The AMF initiates a network triggered service request.

In an embodiment of this application, when the UE is in a CM-IDLE state, the AMF may initiate a network triggered service request procedure, to establish signaling connection between the UE and the AMF. When the UE is in a CM-CONNECTED state, step S1209 does not need to be performed.

Step S1210. The AMF transmits a PDU session establishment instruction to the UE. The PDU session establishment instruction may include: the TSN Domain ID, the TSN Activation Time, the UL or DL TSN Synchronization, the Activation, the S-NSSAI, and the DNN.

Step S1211. The UE initiates a service request procedure.

In an embodiment of this application, when the TSN Activation Time in the PDU session establishment instruction received by the UE indicates that the TSN time synchronization operation is performed immediately. In one embodiment, because the UE is still in the connected state, step S1211 may be skipped, and subsequent steps are directly performed.

When the TSN Activation Time indicates that the TSN time synchronization operation is performed after X seconds, the UE determines, after X seconds after receiving the PDU session establishment instruction, whether the UE is in the CM-IDLE state, and if yes, step S1211 is performed, to establish signaling connection to the AMF, and then subsequent steps are performed; and if the UE is still in the connected state, step S1211 is skipped, and subsequent steps are directly performed.

When the TSN Activation Time indicates that the TSN time synchronization operation is performed at a particular time point, the UE determines, at the particular time point, whether the UE is in the CM-IDLE state, and if yes, step S1211 is performed, to establish signaling connection to the AMF, and then subsequent steps are performed; and if the UE is still in the connected state, step S1211 is skipped, and subsequent steps are directly performed.

In an embodiment of this application, when the TSN Activation Time indicates that the TSN time synchronization operation is performed after X seconds or indicates that the TSN time synchronization operation is performed at a particular time point, but when the activation time has not been reached, if the UE moves to a new AMF, the UE may continue to perform subsequent steps, and this method is not affected.

It is assumed herein that the time of the UE and the time of the 5G network are synchronous (this time synchronization is not the TSN time synchronization (synchronization precision is at the microsecond level, and a synchronization error is less than 1 ms), but the UE obtains a current local time from the network through NAS signaling, and the synchronization precision is usually in a range of 50 ms to 1 second).

Step S1212. The UE initiates a PDU session establishment procedure. One embodiment of this step is similar to that of step S811 in FIG. 8.

Step S1213. The AMF feeds back a TSN activation response to the UDM. This may be optional in some embodiments. When the step exists, the AMF may indicate, by feeding back the TSN activation response to the UDM, whether the TSN time synchronization is activated successfully.

Step S1214a. When the TSN Domain ID is a TSN clock domain 1, the UPF/NW-TT transmits a gPTP message of the TSN clock domain 1 to the UE. Step S1214b. When the TSN Domain ID is a TSN clock domain 2, the UPF/NW-TT transmits a gPTP message of the TSN clock domain 2 to the UE. Step S1214c. When the TSN Domain ID indicates a 5G Time Domain, the UPF/NW-TT transmits a gPTP message of the 5G system clock domain to the UE.

In an embodiment of this application, for step S1214a to step S1214c, reference may be made to 3GPP protocol TR23.700-020. After the TSN time synchronization is activated successfully, the UPF/NW-TT forwards TSN synchronization related data in different directions according to the TSN Domain, to help the UE perform the TSN time synchronization processing.

Figure 13:
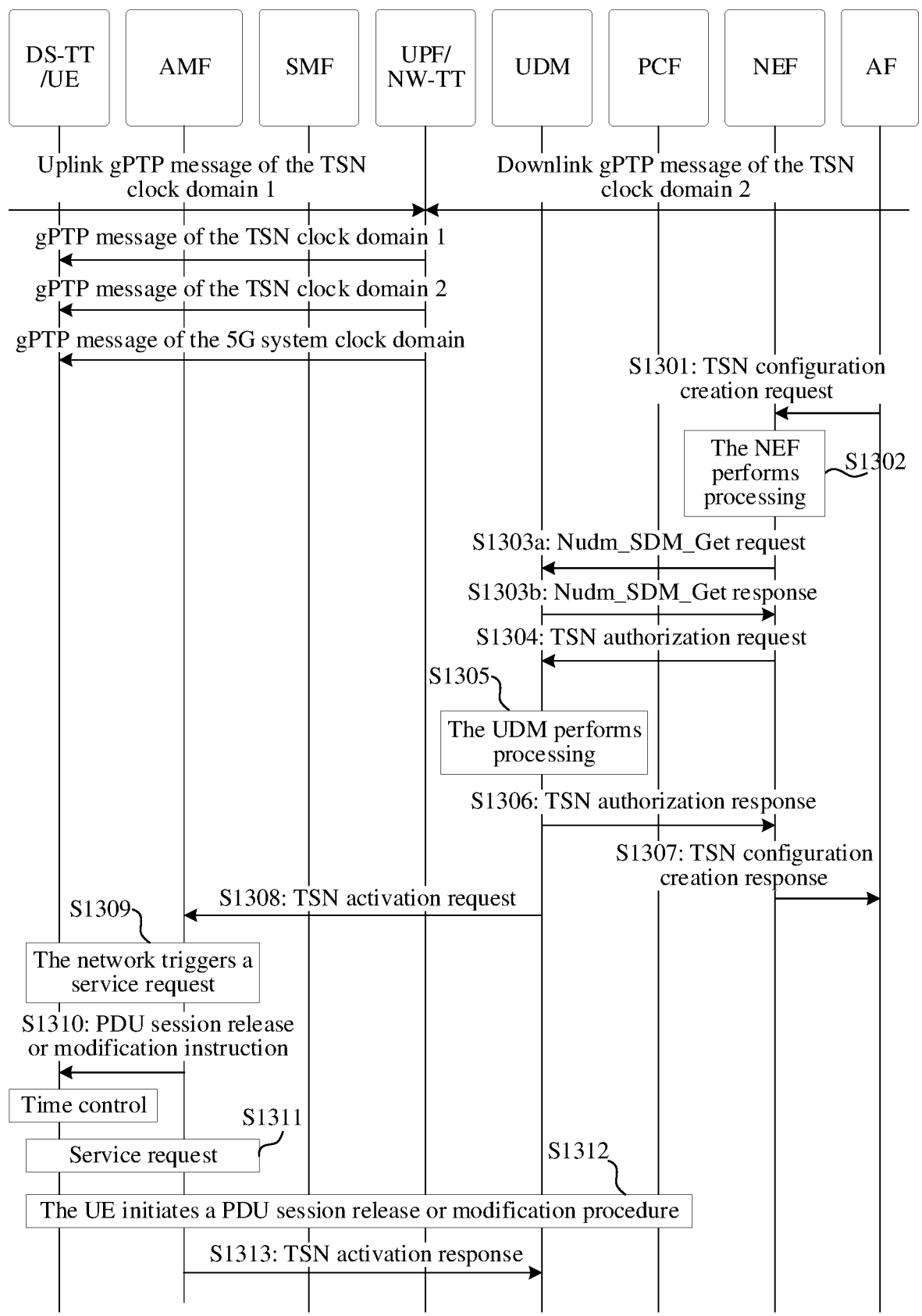
FIG. 13 is a flowchart of a UE performing control to perform a TSN time synchronization deactivation operation according to an embodiment of this application.

As shown in FIG. 13, a procedure in which a UE performs control to perform a TSN time synchronization deactivation operation according to an embodiment of this application includes the following steps:

Step S1301. An AF transmits a TSN configuration creation request to an NEF. Before this step, a master clock of a TSN domain 1 may transmit an uplink gPTP message of the TSN clock domain 1 to a UPF/NW-TT through a UE (the UE is not the DS-TT/UE shown in FIG. 13); a master clock of a TSN field 2 may transmit a downlink gPTP message of the TSN clock domain 2 to the UPF/NW-TT through a terminal device (for example, another UE). The UPF/NW-TT transmits a gPTP message of the TSN clock domain 1 to the UE. The UPF/NW-TT transmits a gPTP message of the TSN clock domain 2 to the UE. When synchronization of a 5G time domain is performed, the UPF/NW-TT transmits a gPTP message of the 5G system clock domain to the UE. These messages are respectively used for performing TSN time synchronization operations of different TSN time domains.

In one embodiment, step S1301 is similar to that of step S801 in FIG. 8, but the embodiment shown in FIG. 13 is the TSN time synchronization deactivation operation, and therefore a value of the Activation/Deactivation Indicator is Deactivation.

Step S1302. The NEF performs processing. One embodiment of this step is similar to that of step S802 in FIG. 8.

Step S1303a. The NEF transmits a Nudm_SDM_Get request to a UDM. A processing procedure of this step is similar to that of step S803a shown in FIG. 8.

Step S1303b. The UDM transmits a Nudm_SDM_Get response to the NEF. A processing procedure of this step is similar to that of step S803b shown in FIG. 8.

Similar to the foregoing embodiments, the Target ID may refer to a group of UEs. When the Target ID refers to a group of UEs, the Target ID is usually an External Group ID, and then a reply of step S1303b is an SUPI list and an optional MSISDN list. In one embodiment, in the following steps S1304 to S1313, a similar operation needs to be performed on each SUPI (that is, each UE) in the list.

Step S1304. The NEF transmits a TSN authorization request to the UDM. The TSN authorization request may include related parameters in the TSN configuration creation request, such as, the Target ID, the TSN Activation Time, the TSN Domain ID, the UL or DL TSN Synchronization, the Deactivation (indicating a deactivation operation), the S-NSSAI, and the DNN.

Step S1305. The UDM performs processing. One embodiment of this step is similar to that of step S805 in FIG. 8.

Step S1306. The UDM returns a TSN authorization response to the NEF.

Step S1307. The NEF returns a TSN configuration creation response to the AF.

In one embodiment of step S1304 to step S1307, reference may be made to step 3 to step 6 in chapter 6.8.3.1 "procedure for AF Requested the TSN Synchronization Activation" in 3GPP protocol TS23.700-20V0.3.0.

Step S1308. The UDM transmits a TSN activation request to an AMF that an SUPI of a UE (only a single UE when the Target ID in step S1001 refers to a single UE; or each UE when the Target ID in step S1001 refers to a group identifier) registers with the UDM. The TSN activation request includes related parameters in the TSN authorization request, such as, the Target ID, the TSN Activation Time, the TSN Domain ID, the UL or DL TSN Synchronization, the Deactivation (indicating a deactivation operation), the S-NSSAI, and the DNN. Step S1008, step S1006, and step S1007 are not in sequential order.

One UE may register a plurality of AMFs (usually a maximum of two) with the UDM. In one embodiment, the UDM may first transmit the TSN activation request to the AMF whose RAT is 3GPP. When in step S1311a or step S1311b, a PDU session update context message transmitted by the SMF for the UE has not been received, or in step S1312, the TSN activation response fed back by the AMF to the UDM indicates unsuccessful deactivation (the AMF may transmit, when determining that the PDU session is not released or modified successfully, the TSN activation response indicating unsuccessful deactivation), the UDM may transmit a TSN activation request again to the corresponding AMF whose RAT is Non-3GPP. Certainly, the UDM may simultaneously transmit the TSN activation request to the plurality of AMFs, and then when a TSN activation response fed back by each of the plurality of AMFs indicates unsuccessful deactivation or a PDU session update context message fed back by an SMF for the UE is not received in a set time, transmit the TSN activation request to the plurality of AMFs again.

Step S1309. The AMF initiates a network triggered service request. A processing procedure of this step is similar to that of step S1209 shown in FIG. 12.

Step S1310. The AMF transmits a PDU session release or modification instruction to the UE. The PDU session release or modification instruction may include: the TSN Domain ID, the TSN Activation Time, the UL or DL TSN Synchronization, the Deactivation, the S-NSSAI, and the DNN.

Step S1311. The UE initiates a service request procedure.

In an embodiment of this application, when the TSN Activation Time in the PDU session release or modification instruction received by the UE indicates that the TSN time synchronization operation is performed immediately. In one embodiment, because the UE is still in the connected state, step S1311 may be skipped, and subsequent steps are directly performed.

When the TSN Activation Time indicates that the TSN time synchronization operation is performed after X seconds, the UE determines, after X seconds after receiving the PDU session release or modification instruction, whether the UE is in the CM-IDLE state, and if yes, step S1311 is performed, to establish signaling connection to the AMF, and then subsequent steps are performed; and if the UE is still in the connected state, step S1311 is skipped, and subsequent steps are directly performed.

When the TSN Activation Time indicates that the TSN time synchronization operation is performed at a particular time point, the UE determines, at the particular time point, whether the UE is in the CM-IDLE state, and if yes, step S1211 is performed, to establish signaling connection to the AMF, and then subsequent steps are performed; and if the UE is still in the connected state, step S1311 is skipped, and subsequent steps are directly performed.

In an embodiment of this application, when the TSN Activation Time indicates that the TSN time synchronization operation is performed after X seconds or indicates that the TSN time synchronization operation is performed at a particular time point, but when the deactivation time has not been reached, if the UE moves to a new AMF, the UE may continue to perform subsequent steps, and this method is not affected.

It is assumed herein that the time of the UE and the time of the network are synchronous (this time synchronization is not the TSN time synchronization, but synchronization in which the UE obtains time from the network through NAS signaling, and the synchronization precision is in a range of 1 second).

Step S1312. The UE initiates a PDU session release or modification procedure. A processing procedure of this step is similar to that of step S911a shown in FIG. 9.

Step S1313. The AMF feeds back a TSN activation response to the UDM. This may be optional in some embodiments. When the step exists, the AMF may indicate, by feeding back the TSN activation response to the UDM, whether the TSN time synchronization is deactivated successfully.

Figure 16:
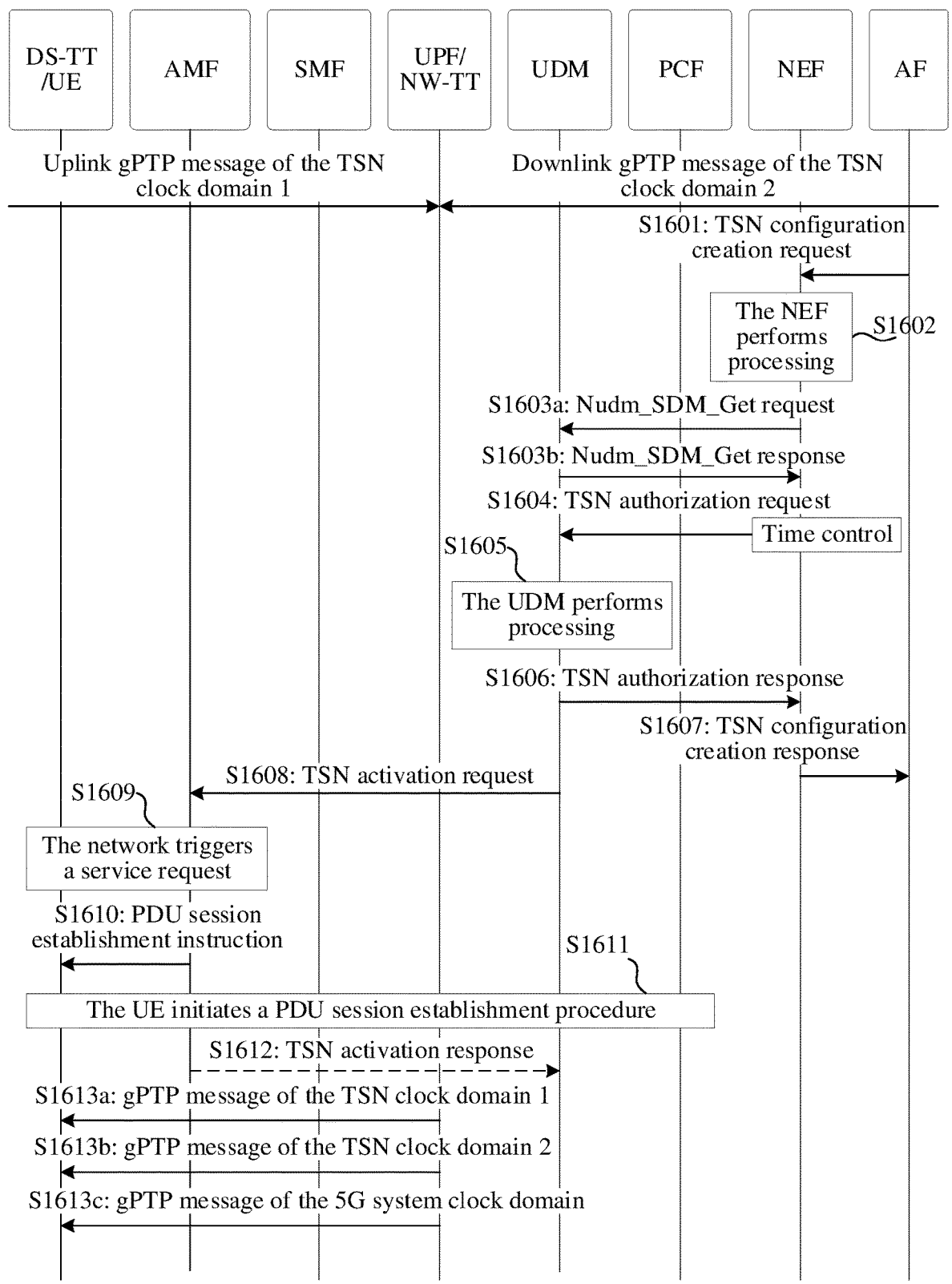
FIG. 16 is a flowchart of an NEF performing control to perform a TSN time synchronization activation operation according to an embodiment of this application.

In the foregoing embodiments, the solutions in which the UDM, the AMF, and the UE control the occasion on which the UE performs the TSN time synchronization operation are respectively described. In other embodiments of this application, the NEF may alternatively control the occasion on which the UE performs the TSN time synchronization operation. There may be multiple embodiments:

1. An embodiment in which the NEF controls the occasion of performing the TSN time synchronization operation (divided into an activation procedure and a deactivation procedure):

As shown in FIG. 16, a procedure in which an NEF performs control to perform a TSN time synchronization activation operation according to an embodiment of this application includes the following steps:

Step S1601. An AF transmits a TSN configuration creation request to an NEF. Before this step, a master clock of a TSN domain 1 may transmit an uplink gPTP message of the TSN clock domain 1 to a UPF/NW-TT through a UE (the UE is not the DS-TT/UE shown in FIG. 16), a master clock of a TSN field 2 may transmit a downlink gPTP message of the TSN clock domain 2 to the UPF/NW-TT through a terminal device (for example, another UE), and these messages are respectively used for performing TSN time synchronization operations of different TSN time domains.

In one embodiment, step S1601 is similar to that of step S801 in FIG. 8. Because the embodiment shown in FIG. 16 is the TSN time synchronization activation operation, a value of the Activation/Deactivation Indicator is Activation.

Step S1602. The NEF performs processing. One embodiment of this step is similar to that of step S802 in FIG. 8.

Step S1603a. The NEF transmits a Nudm_SDM_Get request to a UDM. One embodiment of this step is similar to that of step S803a in FIG. 8.

Step S1603b. The UDM transmits a Nudm_SDM_Get response to the NEF. One embodiment of this step is similar to that of step S803b in FIG. 8.

Similar to the foregoing embodiments, the Target ID may refer to a group of UEs. When the Target ID refers to a group of UEs, the Target ID is usually an External Group ID, and then a reply of step S1603b is an SUPI list and an optional MSISDN list. In one embodiment, in the following steps S1604 to S1613, a similar operation needs to be performed on each SUPI (that is, each UE) in the list.

Step S1604. The NEF transmits a TSN authorization request to the UDM.

In an embodiment of this application, when the TSN Activation Time included in the TSN configuration creation request indicates that the TSN time synchronization operation is performed immediately, the NEF immediately transmits the TSN authorization request to the UDM; When the TSN Activation Time indicates that the TSN time synchronization operation is performed after X seconds, the NEF transmits, after X seconds after receiving the TSN configuration creation request, the TSN authorization request to the UDM; and when the TSN Activation Time indicates that the TSN time synchronization operation is performed at a designated time point, the NEF transmits the TSN authorization request to the UDM at the designated time point (when the particular time point is earlier than the current time point, the NEF immediately transmits the TSN authorization request).

The TSN authorization request may include related parameters in the TSN configuration creation request, such as, the Target ID, the TSN Domain ID, the UL or DL TSN Synchronization, the Activation (indicating an activation operation), the S-NSSAI, and the DNN.

Step S1605. The UDM performs processing. One embodiment of this step is similar to that of step S805 in FIG. 8.

Step S1606. The UDM returns a TSN authorization response to the NEF.

Step S1607. The NEF returns a TSN configuration creation response to the AF.

In one embodiment of step S1604 to step S1607, reference may be made to step 3 to step 6 in chapter 6.8.3.1 "procedure for AF Requested the TSN Synchronization Activation" in 3GPP protocol TS23.700-20V0.3.0.

Step S1608. The UDM transmits a TSN activation request to an AMF that an SUPI of a UE (only a single UE when the Target ID in step S1601 refers to a single UE; or each UE when the Target ID in step S1601 refers to a group identifier) registers with the UDM. The TSN activation request includes related parameters in the TSN authorization request, such as, the Target ID, the TSN Domain ID, the UL or DL TSN Synchronization, the Activation (indicating an activation operation), the S-NSSAI, and the DNN. Step S1608, step S1606, and step S1607 are not in sequential order. When a UE registers a plurality of AMFs with the UDM, for a specific transmitting procedure, reference may be made to a detailed description part of step S808 in FIG. 8.

Step S1609. The AMF initiates a network triggered service request.

In an embodiment of this application, when the UE is in a CM-IDLE state, the AMF may initiate a network triggered service request procedure, to establish signaling connection between the UE and the AMF. When the UE is in a CM-CONNECTED state, the step does not need to be performed.

Step S1610. The AMF transmits a PDU session establishment instruction to the UE.

In an embodiment of this application, the AMF may transmit an NAS message to the UE, to request the UE to establish a PDU session. The PDU session establishment instruction may include: the TSN Domain ID, the UL or DL TSN Synchronization, the Activation, the S-NSSAI, and the DNN.

Step S1611. The UE initiates a PDU session establishment procedure. One embodiment of this step is similar to that of step S811 in FIG. 8.

Step S1612. The AMF feeds back a TSN activation response to the UDM. This may be optional in some embodiments. When the step exists, the AMF may indicate, by feeding back the TSN activation response to the UDM, whether the TSN time synchronization is activated successfully.

Step S1613a. When the TSN Domain ID is a TSN clock domain 1, the UPF/NW-TT transmits a gPTP message of the TSN clock domain 1 to the UE. Step S1613b. When the TSN Domain ID is a TSN clock domain 2, the UPF/NW-TT transmits a gPTP message of the TSN clock domain 2 to the UE. Step S1613c. When the TSN Domain ID indicates a 5G Time Domain, the UPF/NW-TT transmits a gPTP message of the 5G system clock domain to the UE.

In an embodiment of this application, for step S1613a to step S1613c, reference may be made to 3GPP protocol TR23.700-020. After the TSN time synchronization is activated successfully, the UPF/NW-TT forwards TSN synchronization related data in different directions according to the TSN Domain, to help the UE perform the TSN time synchronization processing.

Figure 17:
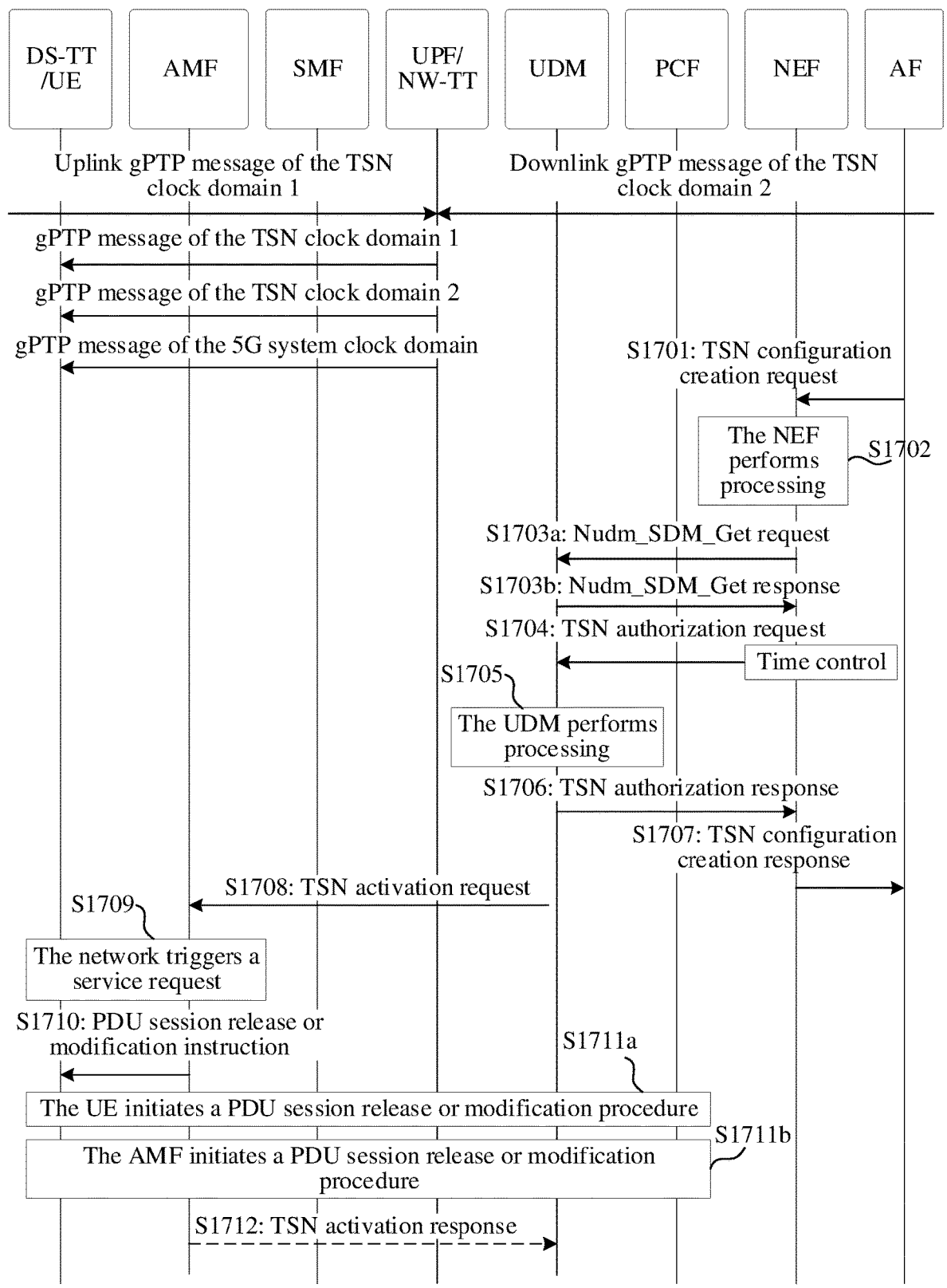
FIG. 17 is a flowchart of an NEF performing control to perform a TSN time synchronization deactivation operation according to an embodiment of this application.

As shown in FIG. 17, a procedure in which an NEF performs control to perform a TSN time synchronization deactivation operation according to an embodiment of this application includes the following steps:

Step S1701. An AF transmits a TSN configuration creation request to an NEF. Before this step, a master clock of a TSN domain 1 may transmit an uplink gPTP message of the TSN clock domain 1 to a UPF/NW-TT through a UE (the UE is not the DS-TT/UE shown in FIG. 17); a master clock of a TSN field 2 may transmit a downlink gPTP message of the TSN clock domain 2 to the UPF/NW-TT through a terminal device (for example, another UE). The UPF/NW-TT transmits a gPTP message of the TSN clock domain 1 to the UE. The UPF/NW-TT transmits a gPTP message of the TSN clock domain 2 to the UE. When synchronization of a 5G time domain is performed, the UPF/NW-TT transmits a gPTP message of the 5G system clock domain to the UE. These messages are respectively used for performing TSN time synchronization operations of different TSN time domains.

In one embodiment, step S1701 is similar to that of step S801 in FIG. 8, but the embodiment shown in FIG. 17 is the TSN time synchronization deactivation operation, and therefore a value of the Activation/Deactivation Indicator is Deactivation.

Step S1702. The NEF performs processing. One embodiment of this step is similar to that of step S802 in FIG. 8.

Step S1703a. The NEF transmits a Nudm_SDM_Get request to a UDM. A processing procedure of this step is similar to that of step S803a shown in FIG. 8.

Step S1703b. The UDM transmits a Nudm_SDM_Get response to the NEF. A processing procedure of this step is similar to that of step S803b shown in FIG. 8.

Similar to the foregoing embodiments, the Target ID may refer to a group of UEs. When the Target ID refers to a group of UEs, the Target ID is usually an External Group ID, and then a reply of step S1703b is an SUPI list and an optional MSISDN list. In one embodiment, in the following steps S1704 to S1712, a similar operation needs to be performed on each SUPI (that is, each UE) in the list.

Step S1704. The NEF transmits a TSN authorization request to the UDM.

In an embodiment of this application, when the TSN Activation Time included in the TSN configuration creation request indicates that the TSN time synchronization operation is performed immediately, the NEF immediately transmits the TSN authorization request to the UDM; When the TSN Activation Time indicates that the TSN time synchronization operation is performed after X seconds, the NEF transmits, after X seconds after receiving the TSN configuration creation request, the TSN authorization request to the UDM; and when the TSN Activation Time indicates that the TSN time synchronization operation is performed at a designated time point, the NEF transmits the TSN authorization request to the UDM at the designated time point (when the particular time point is earlier than the current time point, the NEF immediately transmits the TSN authorization request).

The TSN authorization request may include related parameters in the TSN configuration creation request, such as, the Target ID, the TSN Domain ID, the UL or DL TSN Synchronization, the Deactivation (indicating a deactivation operation), the S-NSSAI, and the DNN.

Step S1705. The UDM performs processing. A processing procedure of this step is similar to that of step S805 shown in FIG. 8.

Step S1706. The UDM returns a TSN authorization response to the NEF.

Step S1707. The NEF returns a TSN configuration creation response to the AF.

In one embodiment of step S1704 to step S1707, reference may be made to step 3 to step 6 in chapter 6.8.3.1 "procedure for AF Requested the TSN Synchronization Activation" in 3GPP protocol TS23.700-20V0.3.0.

Step S1708. The UDM transmits a TSN activation request to an AMF that an SUPI of a UE (only a single UE when the Target ID in step S1701 refers to a single UE; or each UE when the Target ID in step S1701 refers to a group identifier) registers with the UDM. The TSN activation request includes related parameters in the TSN authorization request, such as, the Target ID, the TSN Domain ID, the UL or DL TSN Synchronization, the Deactivation (indicating a deactivation operation), the S-NSSAI, and the DNN. Step S1708, step S1706, and step S1707 are not in sequential order. When a UE registers a plurality of AMFs with the UDM, for a specific transmitting procedure, reference may be made to a detailed description part of step S808 in FIG. 8.

Step S1709. The AMF initiates a network triggered service request.

In an embodiment of this application, when the UE is in a CM-IDLE state, the AMF may initiate a network triggered service request procedure, to establish signaling connection between the UE and the AMF. When the UE is in a CM-CONNECTED state, the step does not need to be performed.

Step S1710. The AMF transmits a PDU session release or modification instruction to the UE.

In an embodiment of this application, the AMF may transmit an NAS message to the UE, to request the UE to release or modify a PDU session. The PDU session release or modification instruction may include: the TSN Domain ID, the UL or DL TSN Synchronization, the Deactivation, the S-NSSAI, and the DNN.

Step S1711a. The UE initiates a PDU session release or modification procedure. A processing procedure of this step is similar to that of step S911a shown in FIG. 9.

Step S1711b. The AMF initiates a PDU session release or modification procedure. A processing procedure of this step is similar to that of step S911b shown in FIG. 9. When the AMF decides to let the AMF itself initiate the PDU session release or modification procedure, steps S1710 and S1711a shown in FIG. 17 do not need to be performed. When the AMF decides to let the UE initiate the PDU session release or modification procedure, steps S1710 and S1711a are performed, but step S1711b is not performed.

Step S1712. The AMF feeds back a TSN activation response to the UDM. This may be optional in some embodiments. When the step exists, the AMF may indicate, by feeding back the TSN activation response to the UDM, whether the TSN time synchronization is deactivated successfully.

Figure 18:
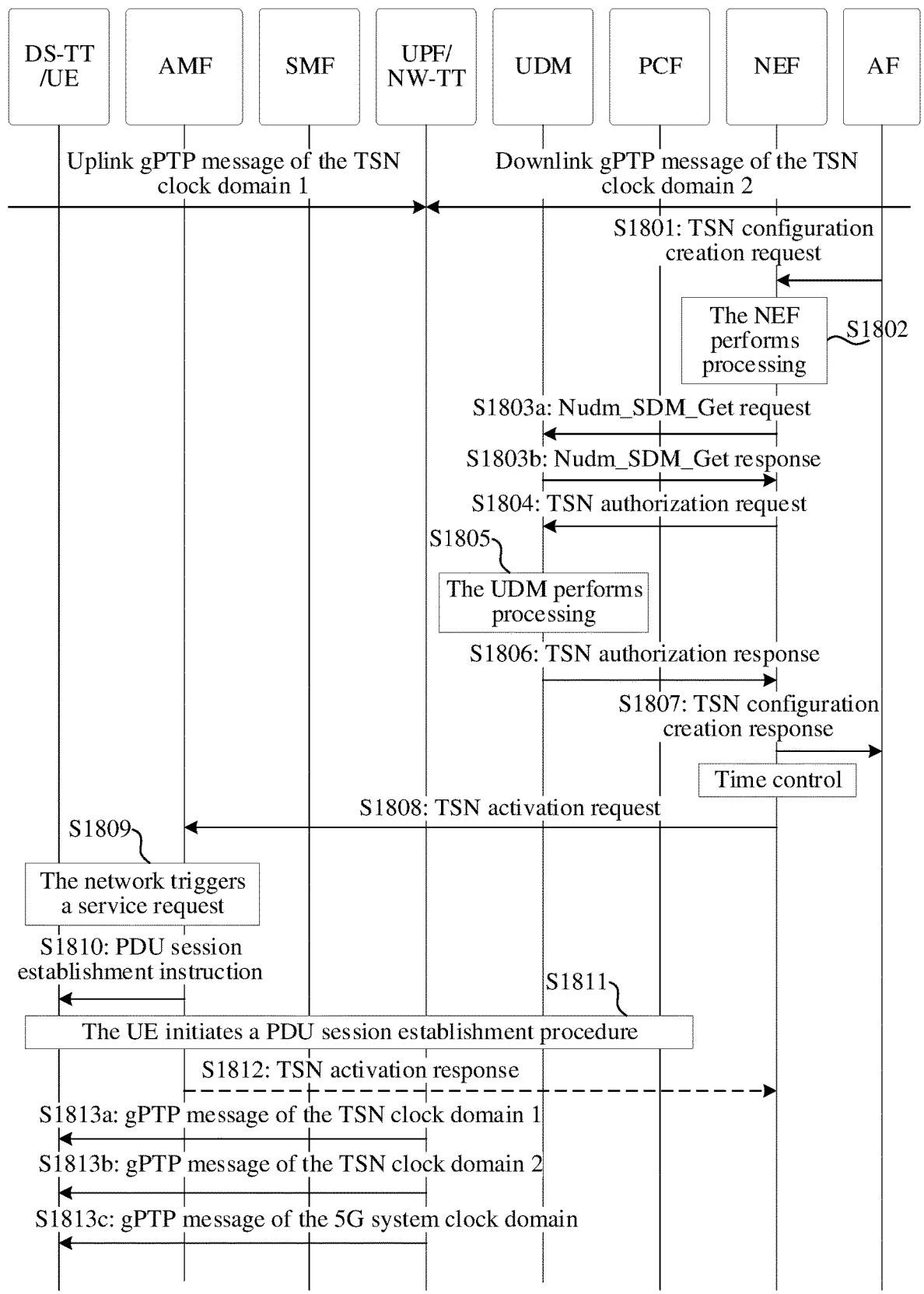
FIG. 18 is a flowchart of an NEF performing control to perform a TSN time synchronization activation operation according to an embodiment of this application.

2. Another embodiment in which the NEF controls the occasion of performing the TSN time synchronization operation (divided into an activation procedure and a deactivation procedure):

As shown in FIG. 18, a procedure in which an NEF performs control to perform a TSN time synchronization activation operation according to an embodiment of this application includes the following steps:

Step S1801. An AF transmits a TSN configuration creation request to an NEF. Before this step, a master clock of a TSN domain 1 may transmit an uplink gPTP message of the TSN clock domain 1 to a UPF/NW-TT through a UE (the UE is not the DS-TT/UE shown in FIG. 18), a master clock of a TSN field 2 may transmit a downlink gPTP message of the TSN clock domain 2 to the UPF/NW-TT through a terminal device (for example, another UE), and these messages are respectively used for performing TSN time synchronization operations of different TSN time domains.

In one embodiment, step S1801 is similar to that of step S801 in FIG. 8. Because the embodiment shown in FIG. 18 is the TSN time synchronization activation operation, a value of the Activation/Deactivation Indicator is Activation.

Step S1802. The NEF performs processing. One embodiment of this step is similar to that of step S802 in FIG. 8.

Step S1803a. The NEF transmits a Nudm_SDM_Get request to a UDM. One embodiment of this step is similar to that of step S803a in FIG. 8.

Step S1803b. The UDM transmits a Nudm_SDM_Get response to the NEF. One embodiment of this step is similar to that of step S803b in FIG. 8.

Similar to the foregoing embodiments, the Target ID may refer to a group of UEs. When the Target ID refers to a group of UEs, the Target ID is usually an External Group ID, and then a reply of step S1803b is an SUPI list and an optional MSISDN list. In one embodiment, in the following steps S1804 to S1813, a similar operation needs to be performed on each SUPI (that is, each UE) in the list.

Step S1804. The NEF transmits a TSN authorization request to the UDM.

In an embodiment of this application, The TSN authorization request may include related parameters in the TSN configuration creation request, such as, the Target ID, the TSN Domain ID, the UL or DL TSN Synchronization, the Activation (indicating an activation operation), the S-NSSAI, and the DNN. The TSN authorization request may alternatively include the TSN Activation Time.

Step S1805. The UDM performs processing. One embodiment of this step is similar to that of step S805 in FIG. 8.

Step S1806. The UDM returns a TSN authorization response to the NEF. The TSN authorization response includes information about an AMF that the UE registers with the UDM.

Step S1807. The NEF returns a TSN configuration creation response to the AF.

In one embodiment of step S1804 to step S1807, reference may be made to step 3 to step 6 in chapter 6.8.3.1 "procedure for AF Requested the TSN Synchronization Activation" in 3GPP protocol TS23.700-20V0.3.0.

Step S1808. The NEF transmits a TSN activation request to the AMF.

In an embodiment of this application, when the NEF transmits a TSN activation request to the AMF, when the TSN Activation Time included in the TSN configuration creation request received by the NEF indicates that the TSN time synchronization operation is performed immediately, the NEF immediately transmits the TSN activation request to an AMF that an SUPI of a UE (only a single UE when the Target ID in step S1801 refers to a single UE; or each UE when the Target ID in step S1801 refers to a group identifier) registers with the UDM, where this TSN activation request includes the TSN Domain ID, the UL or DL TSN Synchronization, the Activation, the S-NSSAI, the DNN, and the like. When a UE registers a plurality of AMFs with the UDM, for a specific transmitting procedure, reference may be made to a detailed description part of step S808 in FIG. 8.

When the TSN Activation Time indicates that the TSN time synchronization operation is performed after X seconds, the NEF transmits the TSN activation request after X seconds after receiving the TSN configuration creation request.

When the TSN Activation Time indicates that the TSN time synchronization operation is performed at a particular time point, the NEF transmits the TSN activation request at this particular time (when the particular time point is earlier than the current time point, the NEF immediately transmits the TSN activation request).

In step S1808, the UDM may alternatively transmit the TSN activation request to the AMF, this procedure is similar to that in which the NEF transmits the TSN activation request to the AMF Step S1809. The AMF initiates a network triggered service request.

In an embodiment of this application, when the UE is in a CM-IDLE state, the AMF may initiate a network triggered service request procedure, to establish signaling connection between the UE and the AMF. When the UE is in a CM-CONNECTED state, the step does not need to be performed.

Step S1810. The AMF transmits a PDU session establishment instruction to the UE.

In an embodiment of this application, the AMF may transmit an NAS message to the UE, to request the UE to establish a PDU session. The PDU session establishment instruction may include: the TSN Domain ID, the UL or DL TSN Synchronization, the Activation, the S-NSSAI, and the DNN.

Step S1811. The UE initiates a PDU session establishment procedure. One embodiment of this step is similar to that of step S811 in FIG. 8.

Step S1812. The AMF feeds back a TSN activation response to the NEF. Step S1812 is an optional step. When the step exists, the AMF may indicate, by feeding back the TSN activation response to the NEF, whether the TSN time synchronization is activated successfully. In step S1812, the AMF may alternatively feed back a TSN activation response to the UDM.

Step S1813a. When the TSN Domain ID is a TSN clock domain 1, the UPF/NW-TT transmits a gPTP message of the TSN clock domain 1 to the UE. Step S1813b. When the TSN Domain ID is a TSN clock domain 2, the UPF/NW-TT transmits a gPTP message of the TSN clock domain 2 to the UE. Step S1813c. When the TSN Domain ID indicates a 5G Time Domain, the UPF/NW-TT transmits a gPTP message of the 5G system clock domain to the UE.

In an embodiment of this application, for step S1813a to step S1813c, reference may be made to 3GPP protocol TR23.700-020. After the TSN time synchronization is activated successfully, the UPF/NW-TT forwards TSN synchronization related data in different directions according to the TSN Domain, to help the UE perform the TSN time synchronization processing.

Figure 19:
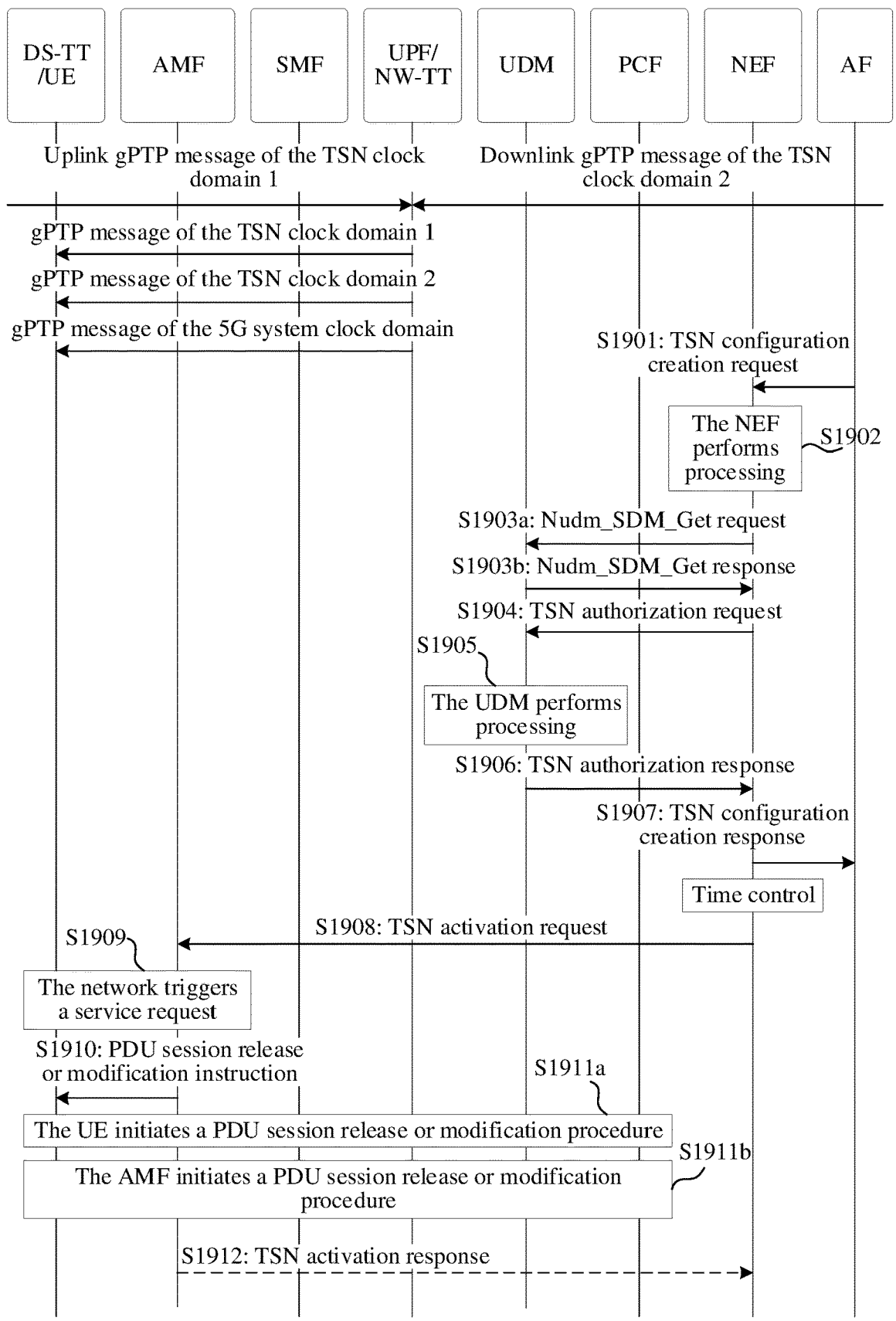
FIG. 19 is a flowchart of an NEF performing control to perform a TSN time synchronization deactivation operation according to an embodiment of this application.

As shown in FIG. 19, a procedure in which an NEF performs control to perform a TSN time synchronization deactivation operation according to an embodiment of this application includes the following steps:

Step S1901. An AF transmits a TSN configuration creation request to an NEF. Before this step, a master clock of a TSN domain 1 may transmit an uplink gPTP message of the TSN clock domain 1 to a UPF/NW-TT through a UE (the UE is not the DS-TT/UE shown in FIG. 19); a master clock of a TSN field 2 may transmit a downlink gPTP message of the TSN clock domain 2 to the UPF/NW-TT through a terminal device (for example, another UE). The UPF/NW-TT transmits a gPTP message of the TSN clock domain 1 to the UE. The UPF/NW-TT transmits a gPTP message of the TSN clock domain 2 to the UE. When synchronization of a 5G time domain is performed, the UPF/NW-TT transmits a gPTP message of the 5G system clock domain to the UE. These messages are respectively used for performing TSN time synchronization operations of different TSN time domains.

In one embodiment, step S1901 is similar to that of step S801 in FIG. 8, but the embodiment shown in FIG. 19 is the TSN time synchronization deactivation operation, and therefore a value of the Activation/Deactivation Indicator is Deactivation.

Step S1902. The NEF performs processing. One embodiment of this step is similar to that of step S802 in FIG. 8.

Step S1903a. The NEF transmits a Nudm_SDM_Get request to a UDM. A processing procedure of this step is similar to that of step S803a shown in FIG. 8.

Step S1903b. The UDM transmits a Nudm_SDM_Get response to the NEF. A processing procedure of this step is similar to that of step S803b shown in FIG. 8.

Similar to the foregoing embodiments, the Target ID may refer to a group of UEs. When the Target ID refers to a group of UEs, the Target ID is usually an External Group ID, and then a reply of step S1903b is an SUPI list and an optional MSISDN list. In one embodiment, in the following steps S1904 to S1912, a similar operation needs to be performed on each SUPI (that is, each UE) in the list.

Step S1904. The NEF transmits a TSN authorization request to the UDM.

The TSN authorization request includes related parameters in the TSN configuration creation request, such as, the Target ID, the TSN Domain ID, the UL or DL TSN Synchronization, the Deactivation (indicating a deactivation operation), the S-NSSAI, and the DNN.

Step S1905. The UDM performs processing. A processing procedure of this step is similar to that of step S805 shown in FIG. 8.

Step S1906. The UDM returns a TSN authorization response to the NEF. The TSN authorization response includes information about an AMF that the UE registers with the UDM.

Step S1907. The NEF returns a TSN configuration creation response to the AF.

In one embodiment of step S1904 to step S1907, reference may be made to step 3 to step 6 in chapter 6.8.3.1 "procedure for AF Requested the TSN Synchronization Activation" in 3GPP protocol TS23.700-20V0.3.0.

Step S1908. The NEF transmits a TSN activation request to the AMF.

In an embodiment of this application, when the NEF transmits a TSN activation request to the AMF, when the TSN Activation Time included in the TSN configuration creation request received by the NEF indicates that the TSN time synchronization operation is performed immediately, the NEF immediately transmits the TSN activation request to an AMF that an SUPI of a UE (only a single UE when the Target ID in step S1901 refers to a single UE; or each UE when the Target ID in step S1901 refers to a group identifier) registers with the UDM, where this TSN activation request may include the TSN Domain ID, the UL or DL TSN Synchronization, the Activation, the S-NSSAI, the DNN, and the like. When a UE registers a plurality of AMFs with the UDM, for a specific transmitting procedure, reference may be made to a detailed description part of step S808 in FIG. 8.

When the TSN Activation Time indicates that the TSN time synchronization operation is performed after X seconds, the NEF transmits the TSN activation request after X seconds after receiving the TSN configuration creation request.

When the TSN Activation Time indicates that the TSN time synchronization operation is performed at a particular time point, the NEF transmits the TSN activation request at this particular time (when the particular time point is earlier than the current time point, the NEF immediately transmits the TSN activation request).

In step S1908, the UDM may alternatively transmit the TSN activation request to the AMF, this procedure is similar to that in which the NEF transmits the TSN activation request to the AMF Step S1909. The AMF initiates a network triggered service request.

In an embodiment of this application, when the UE is in a CM-IDLE state, the AMF may initiate a network triggered service request procedure, to establish signaling connection between the UE and the AMF. When the UE is in a CM-CONNECTED state, the step does not need to be performed.

Step S1910. The AMF transmits a PDU session release or modification instruction to the UE.

In an embodiment of this application, the AMF may transmit an NAS message to the UE, to request the UE to release or modify a PDU session. The PDU session release or modification instruction may include: the TSN Domain ID, the UL or DL TSN Synchronization, the Deactivation, the S-NSSAI, and the DNN.

Step S1911a. The UE initiates a PDU session release or modification procedure. A processing procedure of this step is similar to that of step S911a shown in FIG. 9.

Step S1911b. The AMF initiates a PDU session release or modification procedure. A processing procedure of this step is similar to that of step S911b shown in FIG. 9. When the AMF decides to let the AMF itself initiate the PDU session release or modification procedure, steps S1910 and S1911a shown in FIG. 19 do not need to be performed. When the AMF decides to let the UE initiate the PDU session release or modification procedure, steps S1910 and S1911a are performed, but step S1911b is not performed.

Step S1912. The AMF feeds back a TSN activation response to the NEF. Step S1912 is an optional step. When the step exists, the AMF may indicate, by feeding back the TSN activation response to the NEF, whether the TSN time synchronization is deactivated successfully. In step S1912, the AMF may alternatively feed back a TSN activation response to the UDM.

The technical solutions of the foregoing embodiments of this application can effectively control a time synchronization operation (including the TSN synchronization activation and deactivation) of a UE or a group of UEs, and can support uplink and downlink TSN time synchronization, and 5G network time domain synchronization. Because TSC communication is applicable to the field of real-time industrial production, the technical solutions of the embodiments of this application have significant market value.

The following describes apparatus embodiments of this application, which may be used for performing the time synchronization methods in the foregoing embodiments of this application. For details not disclosed in the apparatus embodiments of this application, reference may be made to the foregoing time synchronization method embodiments of this application.

Figure 20:
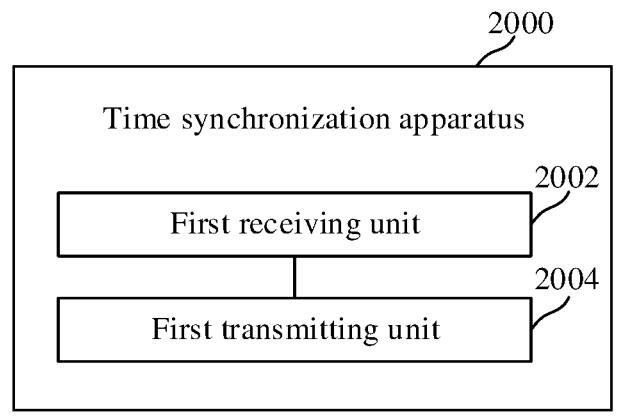
FIG. 20 is a block diagram of a time synchronization apparatus according to an embodiment of this application.

FIG. 20 is a block diagram of a time synchronization apparatus according to an embodiment of this application. The communication apparatus may be disposed in an NEF entity.

Referring to FIG. 20, a time synchronization apparatus 2000 according to an embodiment of this application includes: a first receiving unit 2002 and a first transmitting unit 2004.

The first receiving unit 2002 is configured to receive a time sensitive network (TSN) configuration creation request transmitted by an application function entity (AF), the TSN configuration creation request including an identifier of a target UE and first information used for indicating a TSN time synchronization trigger condition; and the first transmitting unit 2004 is configured to transmit a TSN authorization request to a unified data management entity (UDM), the TSN authorization request being used for requesting the UDM to transmit, after confirming authorization, a TSN activation request including the first information to an access and mobility management function entity (AMF) registered by the target UE, to transmit, through the AMF, control signaling used for performing a TSN time synchronization operation to the target UE.

In some embodiments of this application, based on the foregoing solutions, the first transmitting unit 2004 is further configured to: before transmitting the TSN authorization request to the UDM, translate the identifier of the target UE from an external identifier into a network identifier, where when the identifier of the target UE includes an external identifier of a single UE, the external identifier of the single UE is translated into a network identifier of the single UE; and when the identifier of the target UE includes an external group identifier corresponding to a plurality of UEs, the external group identifier is translated into a network identifier list of the plurality of UEs.

In some embodiments of this application, based on the foregoing solutions, when the identifier of the target UE includes an external group identifier corresponding to a plurality of UEs, the first transmitting unit 2004 is configured to transmit the TSN authorization request to the UDM for each UE in the network identifier list.

In some embodiments of this application, based on the foregoing solutions, the first information used for indicating the TSN time synchronization trigger condition includes: a TSN clock domain identifier, first field information used for indicating uplink TSN synchronization or downlink TSN synchronization, second field information used for indicating an activation operation or a deactivation operation, network slice information, and a data network name, when the first information further includes TSN activation time information, the TSN activation time information is used for indicating that a TSN time synchronization operation is performed immediately, or used for indicating that a TSN time synchronization operation is performed after a predetermined time, or used for indicating that a TSN time synchronization operation is performed at a designated time point; and when the first information does not include the TSN activation time information, the first information is used for indicating that a TSN time synchronization operation is performed immediately.

Figure 21:
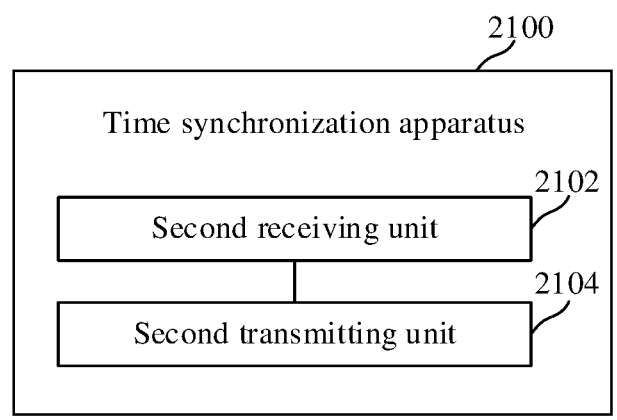
FIG. 21 is a block diagram of a time synchronization apparatus according to an embodiment of this application.

FIG. 21 is a block diagram of a time synchronization apparatus according to an embodiment of this application. The communication apparatus may be disposed in a UDM.

Referring to FIG. 21, a time synchronization apparatus 2100 according to an embodiment of this application includes: a second receiving unit 2102 and a second transmitting unit 2104.

The second receiving unit 2102 is configured to receive a TSN authorization request, the TSN authorization request being used for requesting to transmit a TSN activation request including first information to an AMF registered by a target UE, and the first information being used for indicating a TSN time synchronization trigger condition; and the second transmitting unit 2104 is configured to generate the TSN activation request, and transmit the TSN activation request to the AMF registered by the target UE, to instruct the AMF to transmit control signaling used for performing a TSN time synchronization operation to the target UE.

In some embodiments of this application, based on the foregoing solutions, the second transmitting unit 2104 is configured to: when TSN activation time information included in the TSN authorization request indicates that a TSN time synchronization operation is performed immediately or the TSN authorization request does not include the TSN activation time information, immediately transmit the TSN activation request to the AMF registered by the target UE; when TSN activation time information included in the TSN authorization request indicates that a TSN time synchronization operation is performed after a predetermined time, transmit, after the predetermined time after receiving the TSN authorization request, the TSN activation request to the AMF registered by the target UE; when TSN activation time information included in the TSN authorization request indicates that a TSN time synchronization operation is performed at a designated time point, transmit, when a current time reaches the designated time point, the TSN activation request to the AMF registered by the target UE; or when TSN activation time information included in the TSN authorization request indicates that a TSN time synchronization operation is performed after a predetermined time but a current time has exceeded the designated time point, immediately transmit the TSN activation request to the AMF registered by the target UE.

In some embodiments of this application, based on the foregoing solutions, the second transmitting unit 2104 is configured to transmit the TSN activation request including TSN activation time information to the AMF registered by the target UE.

In some embodiments of this application, based on the foregoing solutions, when a first target UE registering a plurality of AMFs is detected, the second transmitting unit 2104 is configured to: transmit the TSN activation request to a first AMF of the plurality of AMFs whose access network conforms to the 3GPP standards, and transmit, when an activation response fed back by the first AMF indicates unsuccessful activation or a PDU session registration message fed back by a session management function entity (SMF) for the first target UE is not received, the TSN activation request to a second AMF of the plurality of AMFs whose access network does not conform to the 3GPP standards; or simultaneously transmit the TSN activation request to the plurality of AMFs, and transmit, when an activation response fed back by each of the plurality of AMFs indicates unsuccessful activation or a PDU session registration message fed back by an SMF for the first target UE is not received in a set time, the TSN activation request to the plurality of AMFs again.

Figure 22:
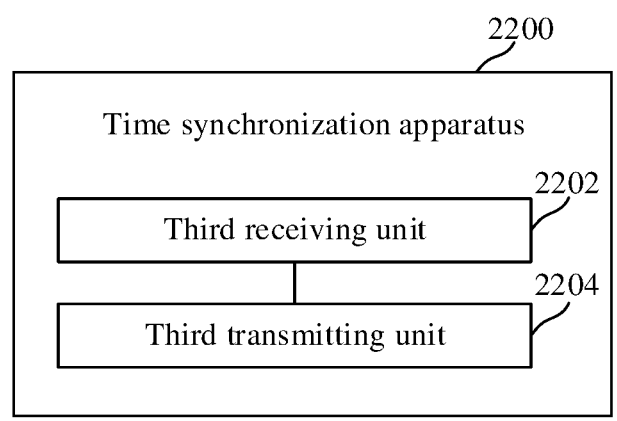
FIG. 22 is a block diagram of a time synchronization apparatus according to an embodiment of this application.

FIG. 22 is a block diagram of a time synchronization apparatus according to an embodiment of this application. The communication apparatus may be disposed in an AMF.

Referring to FIG. 22, a time synchronization apparatus 2200 according to an embodiment of this application includes: a third receiving unit 2202 and a third transmitting unit 2204.

The third receiving unit 2202 is configured to receive a TSN activation request transmitted by a UDM, the TSN activation request including first information used for indicating a TSN time synchronization trigger condition; and the third transmitting unit 2204 is configured to transmit control signaling to a target UE corresponding to a current AMF based on the first information, to control the target UE to perform a TSN time synchronization operation.

In some embodiments of this application, based on the foregoing solutions, the third transmitting unit 2204 is configured to: detect whether the target UE is in a connection management idle state; and when detecting that the target UE is in the connection management idle state, initiate a network triggered service request procedure, to establish a signaling connection to the target UE; or when detecting that the target UE is in a connection management connected state, perform the procedure of transmitting control signaling to a target UE corresponding to a current AMF.

In some embodiments of this application, based on the foregoing solutions, the first information includes second field information used for indicating an activation operation or a deactivation operation; and the third transmitting unit 2204 is configured to: when the second field information indicates an activation operation and TSN activation time information included in the first information indicates that a TSN time synchronization operation is performed immediately, immediately transmit a PDU session establishment instruction to the target UE, to instruct the target UE to establish a PDU session; when the second field information indicates an activation operation and TSN activation time information included in the first information indicates that a TSN time synchronization operation is performed after a predetermined time, transmit a PDU session establishment instruction to the target UE after the predetermined time after receiving the TSN activation request, to instruct the target UE to establish a PDU session; when the second field information indicates an activation operation and TSN activation time information included in the first information indicates that a TSN time synchronization operation is performed at a designated time point, transmit a PDU session establishment instruction to the target UE when a current time reaches the designated time point, to instruct the target UE to establish a PDU session; when the second field information indicates an activation operation and TSN activation time information included in the first information indicates that a TSN time synchronization operation is performed at a designated time point but a current time has exceeded the designated time point, immediately transmit a PDU session establishment instruction to the target UE, to instruct the target UE to establish a PDU session; or when the first information does not include TSN activation time information and the second field information indicates an activation operation, immediately transmit a PDU session establishment instruction to the target UE, to instruct the target UE to establish a PDU session.

In some embodiments of this application, based on the foregoing solutions, when the second field information indicates an activation operation and TSN activation time information included in the first information indicates that a TSN time synchronization operation is performed after a predetermined time, the third transmitting unit 2204 is configured to: transmit, when a time after the TSN activation request is received has not reached the predetermined time and the target UE registers a new AMF or a new AMF is selected for the target UE in a network switching procedure, context information of TSN synchronization activation to the new AMF, to cause the new AMF to transmit a PDU session establishment instruction to the target UE after a TSN remaining activation time is reached; and the context information includes: a TSN clock domain identifier, first field information used for indicating uplink TSN synchronization or downlink TSN synchronization, second field information used for indicating an activation operation, network slice information, a data network name, and the TSN activation time information indicating that a time value is the TSN remaining activation time, and the TSN remaining activation time is a difference between the predetermined time and an elapsed time (a time that has elapsed after the TSN activation request is received by the original AMF).

In some embodiments of this application, based on the foregoing solutions, when the second field information indicates an activation operation and TSN activation time information included in the first information indicates that a TSN time synchronization operation is performed at a designated time point, the third transmitting unit 2204 is further configured to: when the current time has not reached the designated time point and the target UE registers a new AMF or a new AMF is selected for the target UE in a network switching procedure, transmit context information of TSN synchronization activation to the new AMF, to cause the new AMF to transmit a PDU session establishment instruction to the target UE after the current time reaches the designated time point; and the context information includes: a TSN clock domain identifier, first field information used for indicating uplink TSN synchronization or downlink TSN synchronization, second field information used for indicating an activation operation, network slice information, a data network name, and the TSN activation time information indicating that a time value is the designated time point.

In some embodiments of this application, based on the foregoing solutions, the third transmitting unit 2204 is configured to: when the target UE registers a new AMF, transmit the context information of TSN synchronization activation to the new AMF through a UE context transfer message; or when a new AMF is selected for the target UE in a network switching procedure, transmit the context information of TSN synchronization activation to the new AMF through a create UE context request.

In some embodiments of this application, based on the foregoing solutions, the first information includes second field information used for indicating an activation operation or a deactivation operation; and the third transmitting unit 2204 is configured to: when the second field information indicates an activation operation, transmit a PDU session establishment instruction including TSN activation time information to the target UE, where the TSN activation time information comes from the first information.

In some embodiments of this application, based on the foregoing solutions, the PDU session establishment instruction includes the following parameters, and the following parameters and values of the parameters come from the first information: a TSN clock domain identifier, first field information used for indicating uplink TSN synchronization or downlink TSN synchronization, second field information used for indicating an activation operation, network slice information, and a data network name.

In some embodiments of this application, based on the foregoing solutions, the first information includes second field information used for indicating an activation operation or a deactivation operation; and the third transmitting unit 2204 is configured to: when the second field information indicates a deactivation operation and TSN activation time information included in the first information indicates that a TSN time synchronization operation is performed immediately, immediately transmit a PDU session release instruction or PDU session modification instruction to the target UE, to instruct the target UE to initiate a PDU session release procedure or a PDU session modification procedure; when the second field information indicates a deactivation operation and TSN activation time information included in the first information indicates that a TSN time synchronization operation is performed after a predetermined time, transmit a PDU session release instruction or PDU session modification instruction to the target UE after the predetermined time after receiving the TSN activation request, to instruct the target UE to initiate a PDU session release procedure or a PDU session modification procedure; when the second field information indicates a deactivation operation and TSN activation time information included in the first information indicates that a TSN time synchronization operation is performed at a designated time point, transmit a PDU session release instruction or PDU session modification instruction to the target UE when a current time reaches the designated time point, to instruct the target UE to initiate a PDU session release procedure or a PDU session modification procedure; when the second field information indicates a deactivation operation and TSN activation time information included in the first information indicates that a TSN time synchronization operation is performed at a designated time point but a current time has exceeded the designated time point, immediately transmit a PDU session release instruction or PDU session modification instruction to the target UE, to instruct the target UE to initiate a PDU session release procedure or a PDU session modification procedure; or when the first information does not include TSN activation time information and the second field information indicates a deactivation operation, immediately transmit a PDU session release instruction or PDU session modification instruction to the target UE, to instruct the target UE to initiate a PDU session release procedure or a PDU session modification procedure.

In some embodiments of this application, based on the foregoing solutions, the first information includes second field information used for indicating an activation operation or a deactivation operation; and the third transmitting unit 2204 is configured to: when the second field information indicates a deactivation operation and TSN activation time information included in the first information indicates that a TSN time synchronization operation is performed immediately, immediately initiate a PDU session release procedure or a PDU session modification procedure; when the second field information indicates a deactivation operation and TSN activation time information included in the first information indicates that a TSN time synchronization operation is performed after a predetermined time, initiate a PDU session release procedure or a PDU session modification procedure after the predetermined time after receiving the TSN activation request; when the second field information indicates a deactivation operation and TSN activation time information included in the first information indicates that a TSN time synchronization operation is performed at a designated time point, initiate a PDU session release procedure or a PDU session modification procedure when a current time reaches the designated time point; when the second field information indicates a deactivation operation and TSN activation time information included in the first information indicates that a TSN time synchronization operation is performed at a designated time point but a current time has exceeded the designated time point, immediately initiate a PDU session release procedure or a PDU session modification procedure; or when the first information does not include TSN activation time information and the second field information indicates a deactivation operation, immediately initiate a PDU session release procedure or a PDU session modification procedure.

In some embodiments of this application, based on the foregoing solutions, the initiating, by the third transmitting unit 2204, a PDU session release procedure or a PDU session modification procedure includes: generating PDU session update information, where the PDU session update information includes an identifier of a to-be-deactivated target TSN clock domain; and transmitting the PDU session update information to an SMF, to cause the SMF to instruct a user plane function entity to stop forwarding TSN time synchronization data of the target TSN clock domain to the target UE.

In some embodiments of this application, based on the foregoing solutions, a PDU session established by the UE supports a time synchronization operation of a plurality of TSN clock domains; and when a to-be-deactivated target TSN clock domain, network slice information, and a data network name that are included in the first information are respectively matched with a TSN clock domain, network slice information, and a data network name of the PDU session established by the target UE and the to-be-deactivated target TSN clock domain is not a last TSN clock domain in the PDU session, a PDU session modification procedure is initiated; or when a to-be-deactivated target TSN clock domain, network slice information, and a data network name that are included in the first information are respectively matched with a TSN clock domain, network slice information, and a data network name of the PDU session established by the target UE and the to-be-deactivated target TSN clock domain is a last TSN clock domain in the PDU session, a PDU session release procedure is initiated.

In some embodiments of this application, based on the foregoing solutions, when the second field information indicates a deactivation operation and TSN activation time information included in the first information indicates that a TSN time synchronization operation is performed after a predetermined time, the third transmitting unit 2204 is configured to: transmit, when a time after the TSN activation request is received has not reached the predetermined time and the target UE registers a new AMF or a new AMF is selected for the target UE in a network switching procedure, context information of TSN synchronization activation to the new AMF; and the context information includes: a TSN clock domain identifier, first field information used for indicating uplink TSN synchronization or downlink TSN synchronization, second field information used for indicating a deactivation operation, network slice information, a data network name, and the TSN activation time information indicating that a time value is the TSN remaining activation time, and the TSN remaining activation time is a difference between the predetermined time and an elapsed time (a time that has elapsed after the TSN activation request is received by the original AMF).

In some embodiments of this application, based on the foregoing solutions, when the second field information indicates an activation operation and TSN activation time information included in the first information indicates that a TSN time synchronization operation is performed at a designated time point, the third transmitting unit 2204 is further configured to: transmit, when the current time has not reached the designated time point and the target UE registers a new AMF or a new AMF is selected for the target UE in a network switching procedure, context information of TSN synchronization activation to the new AMF; and the context information includes: a TSN clock domain identifier, first field information used for indicating uplink TSN synchronization or downlink TSN synchronization, second field information used for indicating a deactivation operation, network slice information, a data network name, and the TSN activation time information indicating that a time value is the designated time point.

In some embodiments of this application, based on the foregoing solutions, the first information includes second field information used for indicating an activation operation or a deactivation operation; and the third transmitting unit 2204 is configured to: when the second field information indicates a deactivation operation, transmit a PDU session release instruction or PDU session modification instruction including TSN activation time information to the target UE, where the TSN activation time information comes from the first information.

In some embodiments of this application, based on the foregoing solutions, the PDU session release instruction or PDU session modification instruction includes the following parameters, and the following parameters and values of the parameters come from the first information: a TSN clock domain identifier, first field information used for indicating uplink TSN synchronization or downlink TSN synchronization, second field information used for indicating a deactivation operation, network slice information, and a data network name.

Figure 23:
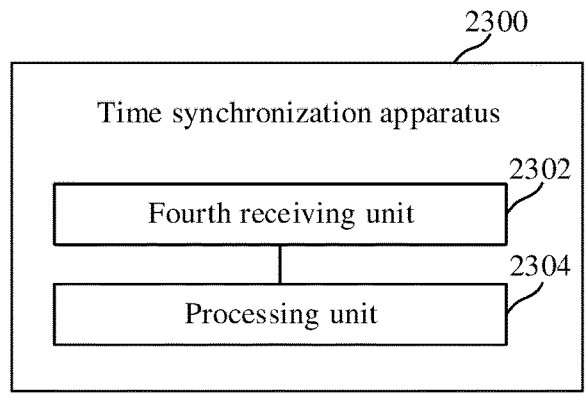
FIG. 23 is a block diagram of a time synchronization apparatus according to an embodiment of this application.

FIG. 23 is a block diagram of a time synchronization apparatus according to an embodiment of this application. The communication apparatus may be disposed in a UE.

Referring to FIG. 23, a time synchronization apparatus 2300 according to an embodiment of this application includes: a fourth receiving unit 2302 and a processing unit 2304.

The fourth receiving unit 2302 is configured to receive control signaling transmitted by an AMF, the control signaling including first information used for indicating a TSN time synchronization trigger condition; and the processing unit 2304 is configured to perform a TSN time synchronization operation based on the control signaling and the first information.

In some embodiments of this application, based on the foregoing solutions, the control signaling includes a PDU session establishment instruction, and the first information includes second field information used for indicating an activation operation; and the processing unit 2304 is configured to: when the first information does not include TSN activation time information and the PDU session establishment instruction is received, immediately establish a PDU session to perform a TSN time synchronization operation; when the first information includes TSN activation time information and the TSN activation time information instructs a UE to immediately perform a TSN time synchronization operation after receiving the PDU session establishment instruction, immediately establish a PDU session to perform the TSN time synchronization operation; when the first information includes TSN activation time information and the TSN activation time information instructs a UE to perform a TSN time synchronization operation after a predetermined time after receiving the PDU session establishment instruction, establish a PDU session after the predetermined time after receiving the PDU session establishment instruction to perform the TSN time synchronization operation; when the first information includes TSN activation time information and the TSN activation time information instructs a UE to perform a TSN time synchronization operation at a designated time point, establish a PDU session when a current time reaches the designated time point to perform the TSN time synchronization operation; or when the first information includes TSN activation time information and the TSN activation time information instructs a UE to perform a TSN time synchronization operation at a designated time point, but a current time has exceeded the designated time point, immediately establish a PDU session to perform the TSN time synchronization operation.

In some embodiments of this application, based on the foregoing solutions, the establishing, by the processing unit 2304, a PDU session after the predetermined time after receiving the PDU session establishment instruction to perform the TSN time synchronization operation includes: detecting, after the predetermined time after receiving the PDU session establishment instruction, whether the UE is in a connection management idle state; and performing a service request procedure when detecting that the UE is in the connection management idle state, and establishing the PDU session after establishing a signaling connection to the AMF to perform the TSN time synchronization operation; or when detecting that the UE is in a connection management connected state, directly establishing the PDU session to perform the TSN time synchronization operation.

In some embodiments of this application, based on the foregoing solutions, the establishing, by the processing unit 2304, a PDU session when a current time reaches the designated time point to perform the TSN time synchronization operation includes: detecting, when the current time reaches the designated time point, whether the UE is in a connection management idle state; and performing a service request procedure when detecting that the UE is in the connection management idle state, and establishing the PDU session after establishing a signaling connection to the AMF to perform the TSN time synchronization operation; or when detecting that the UE is in a connection management connected state, directly establishing the PDU session to perform the TSN time synchronization operation.

In some embodiments of this application, based on the foregoing solutions, a PDU session establishment request transmitted when establishing the PDU session includes the following parameters, and the following parameters and values of the parameters come from the first information: a TSN clock domain identifier, first field information used for indicating uplink TSN synchronization or downlink TSN synchronization, second field information used for indicating an activation operation, network slice information, and a data network name.

In some embodiments of this application, based on the foregoing solutions, the processing unit 2304 is further configured to: when the first information includes TSN activation time information and the TSN activation time information instructs a UE to perform a TSN time synchronization operation after a predetermined time after receiving the PDU session establishment instruction, establish, when a time of receiving the PDU session establishment instruction has not reached the predetermined time and the target UE registers a new AMF or a new AMF is selected for the target UE in a network switching procedure, a PDU session based on the new AMF after the predetermined time after receiving the PDU session establishment instruction to perform the TSN time synchronization operation.

In some embodiments of this application, based on the foregoing solutions, the processing unit 2304 is further configured to: when the first information includes TSN activation time information and the TSN activation time information instructs a UE to perform a TSN time synchronization operation at a designated time point, establish, when the current time has not reached the designated time point and the target UE registers a new AMF or a new AMF is selected for the target UE in a network switching procedure, a PDU session based on the new AMF when the current time reaches the designated time point to perform the TSN time synchronization operation.

In some embodiments of this application, based on the foregoing solutions, the control signaling includes a PDU session release instruction or PDU session modification instruction, and the first information includes second field information used for indicating a deactivation operation; and the processing unit 2304 is configured to: when the first information does not include TSN activation time information and the PDU session release instruction or PDU session modification instruction is received, immediately initiate a PDU session release procedure or a PDU session modification procedure; when the first information includes TSN activation time information and the TSN activation time information instructs a UE to immediately perform the TSN time synchronization operation after receiving the PDU session release instruction or PDU session modification instruction, immediately initiate a PDU session release procedure or a PDU session modification procedure; when the first information includes TSN activation time information and the TSN activation time information instructs a UE to immediately perform the TSN time synchronization operation after a predetermined time after receiving the PDU session release instruction or PDU session modification instruction, initiate a PDU session release procedure or a PDU session modification procedure after the predetermined time after receiving the PDU session release instruction or PDU session modification instruction; when the first information includes TSN activation time information and the TSN activation time information instructs a UE to perform a TSN time synchronization operation at a designated time point, initiate a PDU session release procedure or PDU session modification procedure when a current time reaches the designated time point; or when the first information includes TSN activation time information and the TSN activation time information instructs a UE to perform a TSN time synchronization operation at a designated time point, but a current time has exceeded the designated time point, immediately initiate a PDU session release procedure or PDU session modification procedure.

In some embodiments of this application, based on the foregoing solutions, the initiating, by the processing unit 2304, a PDU session modification procedure includes: generating a PDU session modification request, where the PDU session modification request includes an identifier of a to-be-deactivated target TSN clock domain; and transmitting the PDU session modification request to a session management function entity (SMF), to cause the SMF to instruct a user plane function entity to stop forwarding TSN time synchronization data of the target TSN clock domain to the UE transmitting the PDU session modification request.

In some embodiments of this application, based on the foregoing solutions, a PDU session established by the UE supports a time synchronization operation of a plurality of TSN clock domains; and when a to-be-deactivated target TSN clock domain, network slice information, and a data network name that are included in the first information are respectively matched with a TSN clock domain, network slice information, and a data network name of the PDU session established by the target UE and the to-be-deactivated target TSN clock domain is not a last TSN clock domain in the PDU session, a PDU session modification procedure is initiated; or when a to-be-deactivated target TSN clock domain, network slice information, and a data network name that are included in the first information are respectively matched with a TSN clock domain, network slice information, and a data network name of the PDU session established by the target UE and the to-be-deactivated target TSN clock domain is a last TSN clock domain in the PDU session, a PDU session release procedure is initiated.

In some embodiments of this application, based on the foregoing solutions, the processing unit 2304 is further configured to: when the first information includes TSN activation time information and the TSN activation time information instructs a UE to perform a TSN time synchronization operation after a predetermined time after receiving the PDU session release instruction or PDU session modification instruction, initiate, when a time of receiving the PDU session release instruction or PDU session modification instruction has not reached the predetermined time and the target UE registers a new AMF or a new AMF is selected for the target UE in a network switching procedure, the PDU session release procedure or PDU session modification procedure based on the new AMF after the predetermined time after receiving the PDU session release instruction or PDU session modification instruction; or when the first information includes TSN activation time information and the TSN activation time information instructs a UE to perform a TSN time synchronization operation at a designated time point, initiate, when the current time has not reached the designated time point and the target UE registers a new AMF or a new AMF is selected for the target UE in a network switching procedure, the PDU session release procedure or PDU session modification procedure based on the new AMF when the current time reaches the designated time point.

Figure 24:
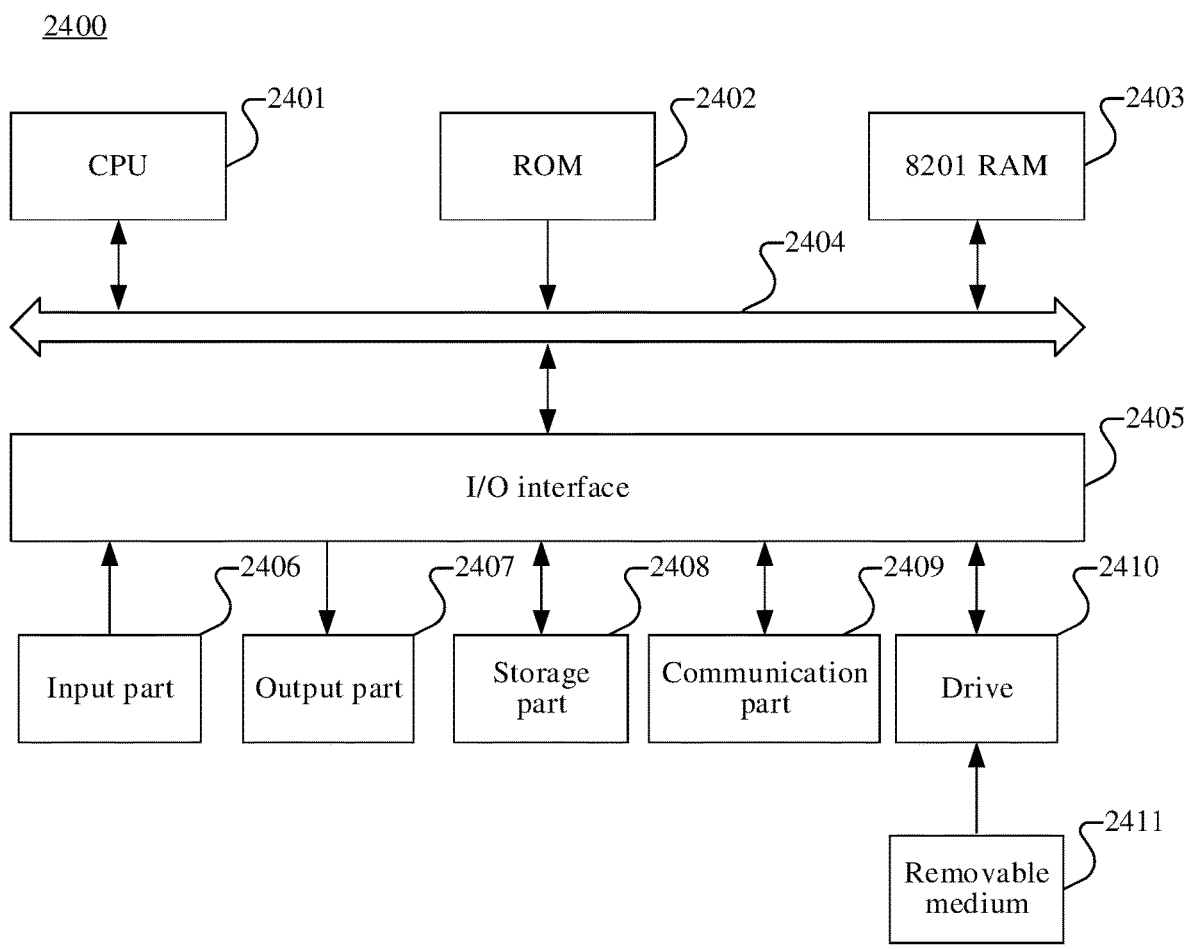
FIG. 24 is a schematic structural diagram of a computer system adapted to implement an electronic device according to an embodiment of this application.

FIG. 24 is a schematic structural diagram of a computer system adapted to implement an electronic device according to an embodiment of this application.

A computer system 2400 of the electronic device shown in FIG. 24 is merely one example, and does not limit functions and use ranges of the embodiments of this application.

As shown in FIG. 24, the computer system 2400 includes a central processing unit (CPU) 2401, which may perform various suitable actions and processing based on a program stored in a read-only memory (ROM) 2402 or a program loaded from a storage part 2408 into a random access memory (RAM) 2403, for example, perform the method described in the foregoing embodiments. The RAM 2403 further stores various programs and data required for system operations. The CPU 2401, the ROM 2402, and the RAM 2403 are connected to each other through a bus 2404. An input/output (I/O) interface 2405 is also connected to the bus 2404.

The following components are connected to the I/O interface 2405: an input part 2406 including a keyboard, a mouse, or the like; an output part 2407 including a cathode ray tube (CRT), a liquid crystal display (LCD), a speaker, or the like; a storage part 2408 including a hard disk, or the like; and a communication part 2409 including a network interface card such as a local area network (LAN) card or a modem. The communication part 2409 performs communication processing by using a network such as the Internet. A drive 2410 is also connected to the I/O interface 2405 as required. A removable medium 2411, such as a magnetic disk, an optical disc, a magneto-optical disk, or a semiconductor memory, is installed on the drive 2410 as required, so that a computer program read from the removable medium is installed into the storage part 2408 as required.

Particularly, according to an embodiment of this application, the processes described in the following by referring to the flowcharts may be implemented as computer software programs. For example, an embodiment of this application includes a computer program product. The computer program product includes a computer program stored in a computer-readable medium. The computer program includes a computer program used for performing a method shown in the flowchart. In such an embodiment, by using the communication part 2409, the computer program may be downloaded and installed from a network, and/or installed from the removable medium 2411. When the computer program is executed by the CPU 2401, the various functions defined in the system of this application are executed.

The computer-readable medium shown in the embodiments of this application may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, the computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the implementations of the present disclosure, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application.

It is to be understood that this application is not limited to the precise structures described above and shown in the accompanying drawings, and various modifications and changes can be made without departing from the scope of this application. The scope of this application is subject only to the appended claims.

What is claimed is:

1. A time synchronization method, comprising:
   receiving a time sensitive network (TSN) activation request transmitted by a unified data management entity (UDM), the TSN activation request comprising a first information used for indicating a TSN time synchronization trigger condition;
   detecting whether a target user equipment (UE) is in a connection management idle state;
   initiating a network triggered service request procedure in response to detecting that the target UE is in the connection management idle state, so as to establish a signal connection to the target UE; and
   in response to detecting that the target UE is in a connection management connected state, transmitting a control signal to the target UE corresponding to a current access and mobility management function entity (AMF) based on the first information, so as to control the target UE to perform a TSN time synchronization operation.

2. The time synchronization method according to claim 1, wherein the first information comprises a second field information used for indicating an activation operation or a deactivation operation, wherein the transmitting a control signaling to a target UE corresponding to a current AMF based on the first information further comprises:
   when the second field information indicates the activation operation and a TSN activation time information comprised in the first information indicates that the TSN time synchronization operation is performed, immediately transmitting a protocol data unit (PDU) session establishment instruction to the target UE, so as to instruct the target UE to establish a PDU session;
   when the second field information indicates the activation operation and the TSN activation time information comprised in the first information indicates that the TSN time synchronization operation is performed after a predetermined time, transmitting a PDU session establishment instruction to the target UE following the predetermined time after receiving the TSN activation request, so as to instruct the target UE to establish the PDU session;
   when the second field information indicates the activation operation and the TSN activation time information comprised in the first information indicates that the TSN time synchronization operation is performed at a designated time point, transmitting the PDU session establishment instruction to the target UE when a current time reaches the designated time point, so as to instruct the target UE to establish the PDU session;

when the second field information indicates the activation operation and the TSN activation time information comprised in the first information indicates that the TSN time synchronization operation is performed at a designated time point but the current time has exceeded the designated time point, immediately transmitting the PDU session establishment instruction to the target UE, so as to instruct the target UE to establish the PDU session; or when the first information does not comprise the TSN activation time information and the second field information indicates the activation operation, immediately transmitting the PDU session establishment instruction to the target UE, so as to instruct the target UE to establish the PDU session.

3. The time synchronization method according to claim 2, wherein when the second field information indicates the activation operation and the TSN activation time information comprised in the first information indicates that the TSN time synchronization operation is performed after the predetermined time, and wherein when a time after the TSN activation request is received has not reached the predetermined time and the target UE registers a new AMF or a new AMF is selected for the target UE in a network switching procedure, context information of a TSN synchronization activation is transmitted to the new AMF, so as to cause the new AMF to transmit the PDU session establishment instruction to the target UE after a TSN remaining activation time is reached; and the context information further comprises:
a TSN time domain identifier;
a first field information used for indicating uplink TSN synchronization or downlink TSN synchronization;
a second field information used for indicating the activation operation, network slice information;
a data network name; and
the TSN activation time information indicating that a time value is the TSN remaining activation time, and the TSN remaining activation time is a difference between the predetermined time and a time that has elapsed after the TSN activation request is received.

4. The time synchronization method according to claim 2, wherein when the second field information indicates the activation operation and the TSN activation time information comprised in the first information indicates that the TSN time synchronization operation is performed at the designated time point, wherein when the current time has not reached the designated time point and the target UE registers a new AMF or a new AMF is selected for the target UE in a network switching procedure, context information of a TSN synchronization activation is transmitted to the new AMF, so as to cause the new AMF to transmit the PDU session establishment instruction to the target UE after the current time reaches the designated time point; and the context information further comprises:
a TSN time domain identifier;
a first field information used for indicating uplink TSN synchronization or downlink TSN synchronization;
a second field information used for indicating the activation operation;
network slice information;
a data network name; and
the TSN activation time information indicating that a time value is the designated time point.

5. The time synchronization method according to claim 1, wherein the first information comprises a second field information used for indicating an activation operation or a deactivation operation, and wherein the transmitting the control signal to a target UE corresponding to a current AMF based on the first information further comprises:

when the second field information indicates the activation operation, transmitting a PDU session establishment instruction comprising TSN activation time information to the target UE, wherein the TSN activation time information comes from the first information.

6. The time synchronization method according to claim 1, wherein the first information comprises a second field information used for indicating an activation operation or a deactivation operation, and the transmitting the control signal to a target UE corresponding to a current AMF based on the first information further comprises:

when the second field information indicates the deactivation operation and TSN activation time information comprised in the first information indicates that the TSN time synchronization operation is performed, immediately transmitting a PDU session release instruction or PDU session modification instruction to the target UE, so as to instruct the target UE to initiate a PDU session release procedure or a PDU session modification procedure; or when the second field information indicates the deactivation operation and the TSN activation time information comprised in the first information indicates that the TSN time synchronization operation is performed after a predetermined time, transmitting the PDU session release instruction or PDU session modification instruction to the target UE after the predetermined time after receiving the TSN activation request, to instruct the target UE to initiate the PDU session release procedure or the PDU session modification procedure; or when the second field information indicates the deactivation operation and the TSN activation time information comprised in the first information indicates that the TSN time synchronization operation is performed at a designated time point, transmitting the PDU session release instruction or PDU session modification instruction to the target UE when a current time reaches the designated time point, to instruct the target UE to initiate the PDU session release procedure or the PDU session modification procedure; or when the second field information indicates the deactivation operation and the TSN activation time information comprised in the first information indicates that the TSN time synchronization operation is performed at a designated time point but the current time has exceeded the designated time point, immediately transmitting the PDU session release instruction or PDU session modification instruction to the target UE, to instruct the target UE to initiate the PDU session release procedure or the PDU session modification procedure; or when the first information does not comprise the TSN activation time information and the second field information indicates the deactivation operation, immediately transmitting the PDU session release instruction or PDU session modification instruction to the target UE, to instruct the target UE to initiate the PDU session release procedure or the PDU session modification procedure.

7. The time synchronization method according to claim 6, wherein the PDU session release instruction or PDU session modification instruction further comprises:
   a TSN time domain identifier;
   a first field information used for indicating uplink TSN synchronization or downlink TSN synchronization;
   a second field information used for indicating the deactivation operation;
   a network slice information; and
   a data network name,
   wherein each of the TSN time domain identifier, the first field information, the second field information, the network slice information, and the data network name are from the first information.

8. The time synchronization method according to claim 1, wherein the first information comprises second field information used for indicating an activation operation or a deactivation operation, wherein the transmitting a control signal to a target UE corresponding to a current AMF based on the first information further comprises:
   when the second field information indicates the deactivation operation and TSN activation time information comprised in the first information indicates that the TSN time synchronization operation is performed, immediately initiating a PDU session release procedure or a PDU session modification procedure; or
   when the second field information indicates the deactivation operation and the TSN activation time information comprised in the first information indicates that the TSN time synchronization operation is performed after a predetermined time, initiating the PDU session release procedure or the PDU session modification procedure after the predetermined time after receiving the TSN activation request; or
   when the second field information indicates the deactivation operation and the TSN activation time information comprised in the first information indicates that the TSN time synchronization operation is performed at a designated time point, initiating the PDU session release procedure or the PDU session modification procedure when a current time reaches the designated time point; or
   when the second field information indicates the deactivation operation and the TSN activation time information comprised in the first information indicates that the TSN time synchronization operation is performed at a designated time point but the current time has exceeded the designated time point, immediately initiating the PDU session release procedure or the PDU session modification procedure; or
   when the first information does not comprise the TSN activation time information and the second field information indicates the deactivation operation, immediately initiating the PDU session release procedure or the PDU session modification procedure.

9. The time synchronization method according to claim 8, wherein the initiating the PDU session release procedure or the PDU session modification procedure comprises:
   generating PDU session update information, wherein the PDU session update information comprises an identifier of a to-be-deactivated target TSN time domain; and
   transmitting the PDU session update information to a session management function entity (SMF), to cause the SMF to instruct a user plane function entity to stop forwarding TSN time synchronization data of the target TSN time domain to the target UE.

10. The time synchronization method according to claim 1, wherein the first information comprises second field information used for indicating an activation operation or a deactivation operation, wherein the transmitting a control signal to a target UE corresponding to a current AMF based on the first information further comprises:
   when the second field information indicates the deactivation operation, transmitting a PDU session release instruction or PDU session modification instruction comprising TSN activation time information to the target UE, wherein the TSN activation time information comes from the first information.

* * * * *